United States Patent [19]

Geus

[11] 4,113,658

[45] Sep. 12, 1978

[54] PROCESS FOR HOMOGENEOUS DEPOSITION PRECIPITATION OF METAL COMPOUNDS ON SUPPORT OR CARRIER MATERIALS

[75] Inventor: John W. Geus, Geleen, Netherlands

[73] Assignee: Stamicarbon, N.V., Geleen, Netherlands

[21] Appl. No.: 663,106

[22] Filed: Mar. 2, 1976

Related U.S. Application Data

[63] Continuation of Ser. No. 361,492, May 18, 1973, abandoned, which is a continuation of Ser. No. 108,081, Jan. 20, 1971, abandoned, and a continuation-in-part of Ser. No. 721,051, Apr. 12, 1968, abandoned, Ser. No. 743,000, Jul. 8, 1968, abandoned, Ser. No. 814,703, Apr. 9, 1969, abandoned, Ser. No. 858,318, Sep. 16, 1969, abandoned, Ser. No. 886,693, Dec. 19, 1969, abandoned, Ser. No. 879,625, Nov. 24, 1969, abandoned, and Ser. No. 577, Jan. 5, 1970, Pat. No. 3,654,161.

[30] Foreign Application Priority Data

Apr. 14, 1967 [NL] Netherlands ................. 6705259
Aug. 31, 1967 [NL] Netherlands ................. 6712004

[51] Int. Cl.² .................. B01J 21/08; B01J 21/06; B01J 21/04; C04B 35/00
[52] U.S. Cl. .................. 252/454; 252/62.55; 252/62.56; 252/62.59; 252/410; 252/447; 252/458; 252/459; 252/461; 252/463; 252/464; 252/466 PT; 252/466 J; 252/466 B; 252/467; 252/468; 252/469; 252/470; 252/471; 252/472; 252/473; 252/475; 252/477 R; 428/128; 428/215; 427/404
[58] Field of Search .............. 252/62.51, 62.55, 62.56, 252/410, 430, 431 H, 438, 454, 459, 465, 470, 467, 472, 476, 477, 455 R, 456, 458, 460, 461, 463, 464, 465, 466; 423/633, 634; 428/128, 215; 427/404

[56] References Cited

U.S. PATENT DOCUMENTS

| | | | |
|---|---|---|---|
| 1,830,705 | 11/1931 | Marx et al. | 252/472 |
| 2,258,111 | 10/1941 | Engel | 252/470 |
| 2,400,709 | 5/1946 | Patrick, Jr. | 252/430 |
| 2,847,475 | 8/1958 | Voge et al. | 252/467 |
| 3,042,543 | 7/1962 | Schuele | 117/62 |
| 3,046,158 | 7/1962 | Fukuda et al. | 252/62.56 |
| 3,186,957 | 6/1965 | Stiles | 252/466 |
| 3,198,743 | 8/1965 | MacCallum et al. | 423/633 |
| 3,235,515 | 2/1966 | Taylor | 252/472 |
| 3,376,106 | 4/1968 | Gring et al. | 252/466 B |
| 3,382,174 | 5/1968 | Hund | 423/634 |
| 3,443,886 | 5/1969 | Taylor et al. | 252/454 |
| 3,448,059 | 6/1969 | Den Hollander | 252/472 |
| 3,615,217 | 10/1971 | O'Brien | 252/475 |

FOREIGN PATENT DOCUMENTS

| | | | |
|---|---|---|---|
| 740,634 | 10/1943 | Fed. Rep. of Germany | 252/459 |
| 1,220,105 | 1/1971 | United Kingdom | 252/472 |

*Primary Examiner*—P. E. Konopka
*Attorney, Agent, or Firm*—Cushman, Darby & Cushman

[57] ABSTRACT

This specification discloses a process wherein by applying certain controlled homogeneous precipitation techniques in the presence of a homogeneously distributed finely divided particulate supporting material, there is effected a deposition precipitation of a metal or metal compound on the surfaces of the support particles. This deposition precipitation process may be effected in a number of ways, such as by homogeneous changes in the pH of the solution, or decomplexation to an insolubilizable metal ion, or introduction of the metal component to be precipitated, or oxidation or reduction techniques, or by introduction of precipitating ions, etc. The process requires compliance with conditions to substantially avoid any stable free nucleation and crystal development in the solution phase per se, and to cause nucleation and particle formation substantially only at or on the supporting surfaces, which must, therefore, be selected so as to provide a nucleating surface for the component to be precipitated, under the conditions of the reaction. The deposited metal or metal compound is obtained in the form of a thin layer or in the form of discrete very small particles, and, in either form is substantially homogeneously distributed over the said surface, and is further either crystallographically or electrostatically adhered to the support particle. The resulting products may be used as such, or may be treated by subsequent heating, oxidation, or reduction steps to be converted into still further useful products. The materials thus provided are especially valuable for their catalytic activity, and, where ferromagnetic deposited particles are obtained, for their highly advantageous properties derived from the magnetocrystalline anisotropy.

5 Claims, 27 Drawing Figures

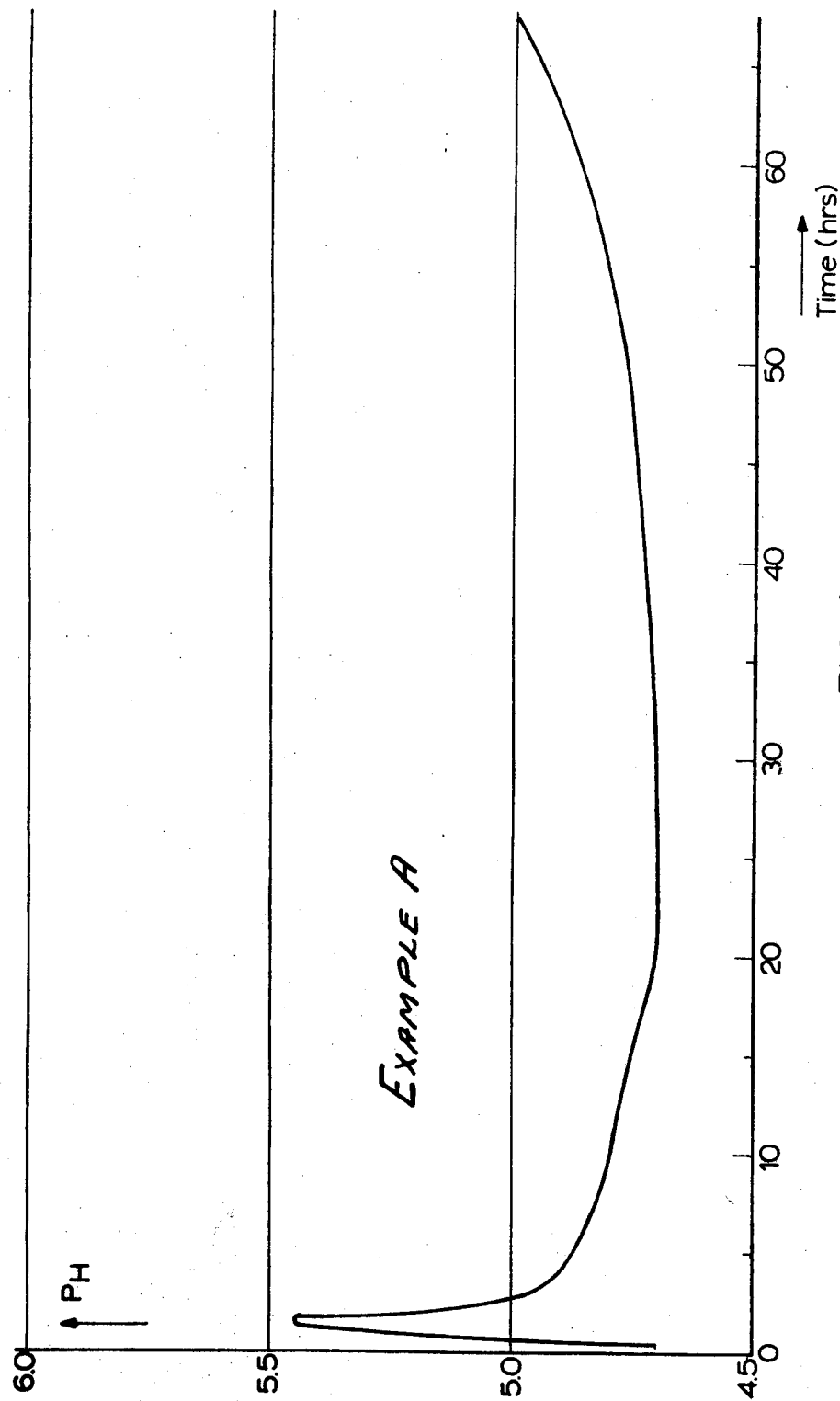

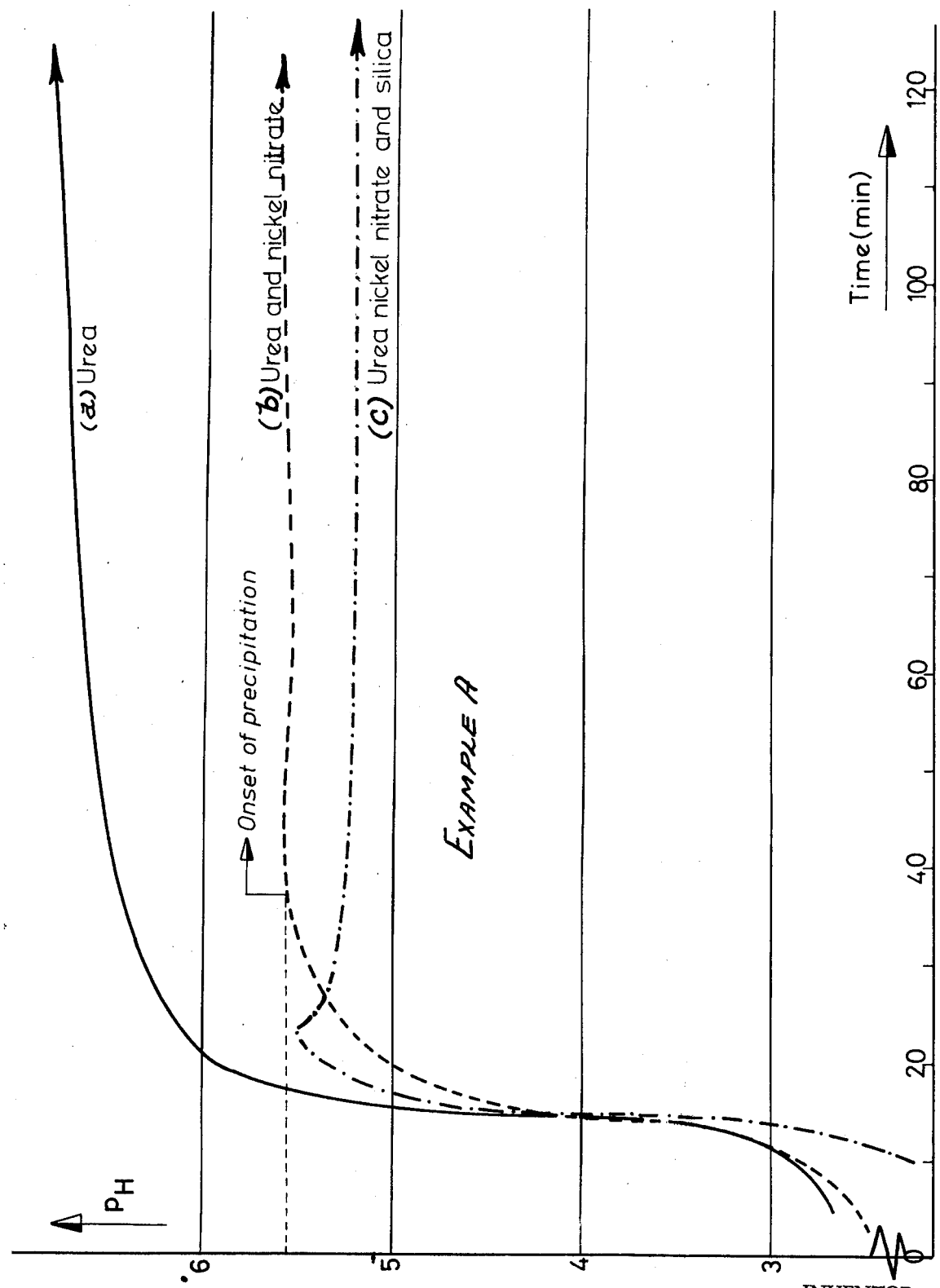

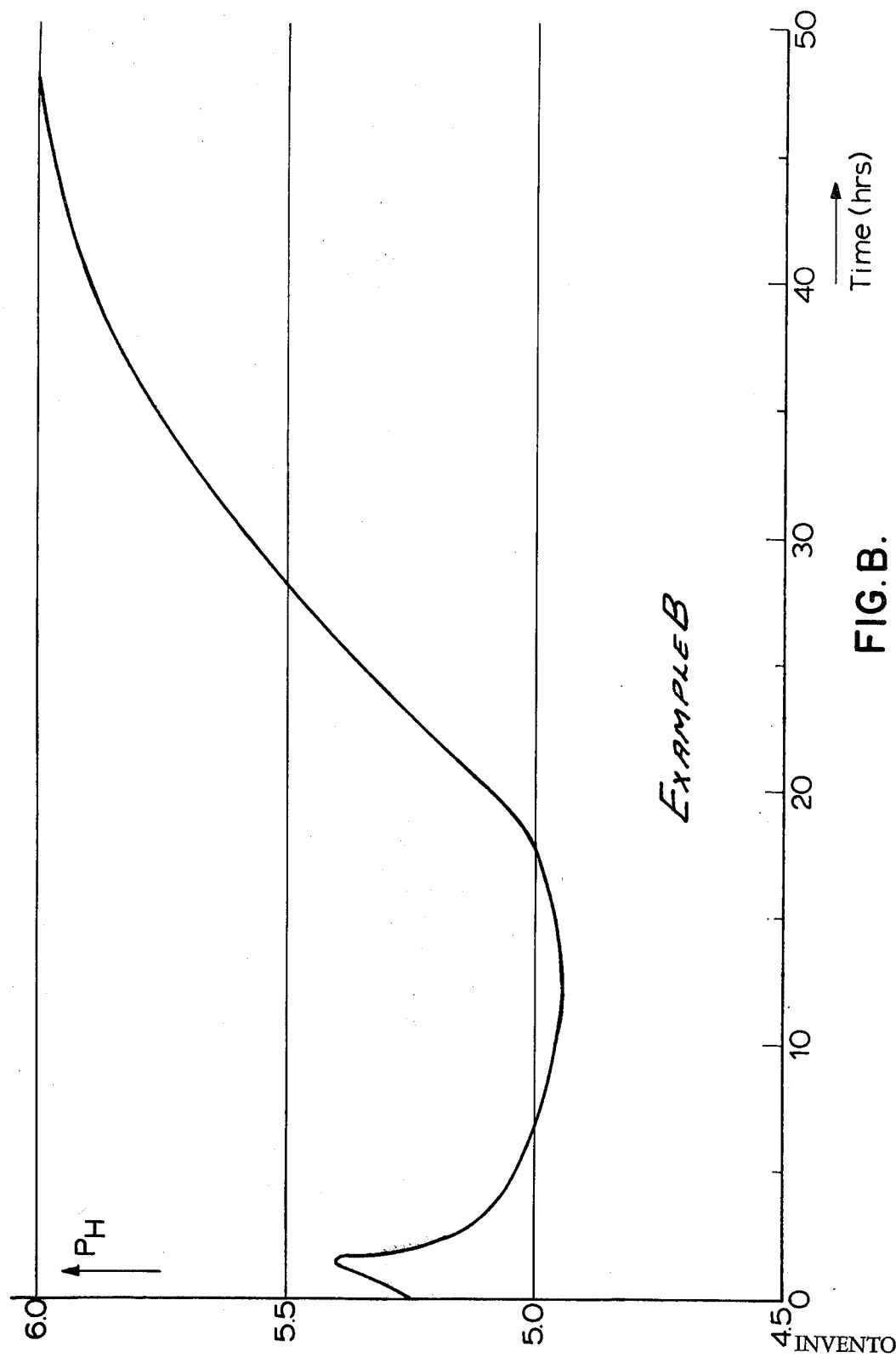
FIG. B.

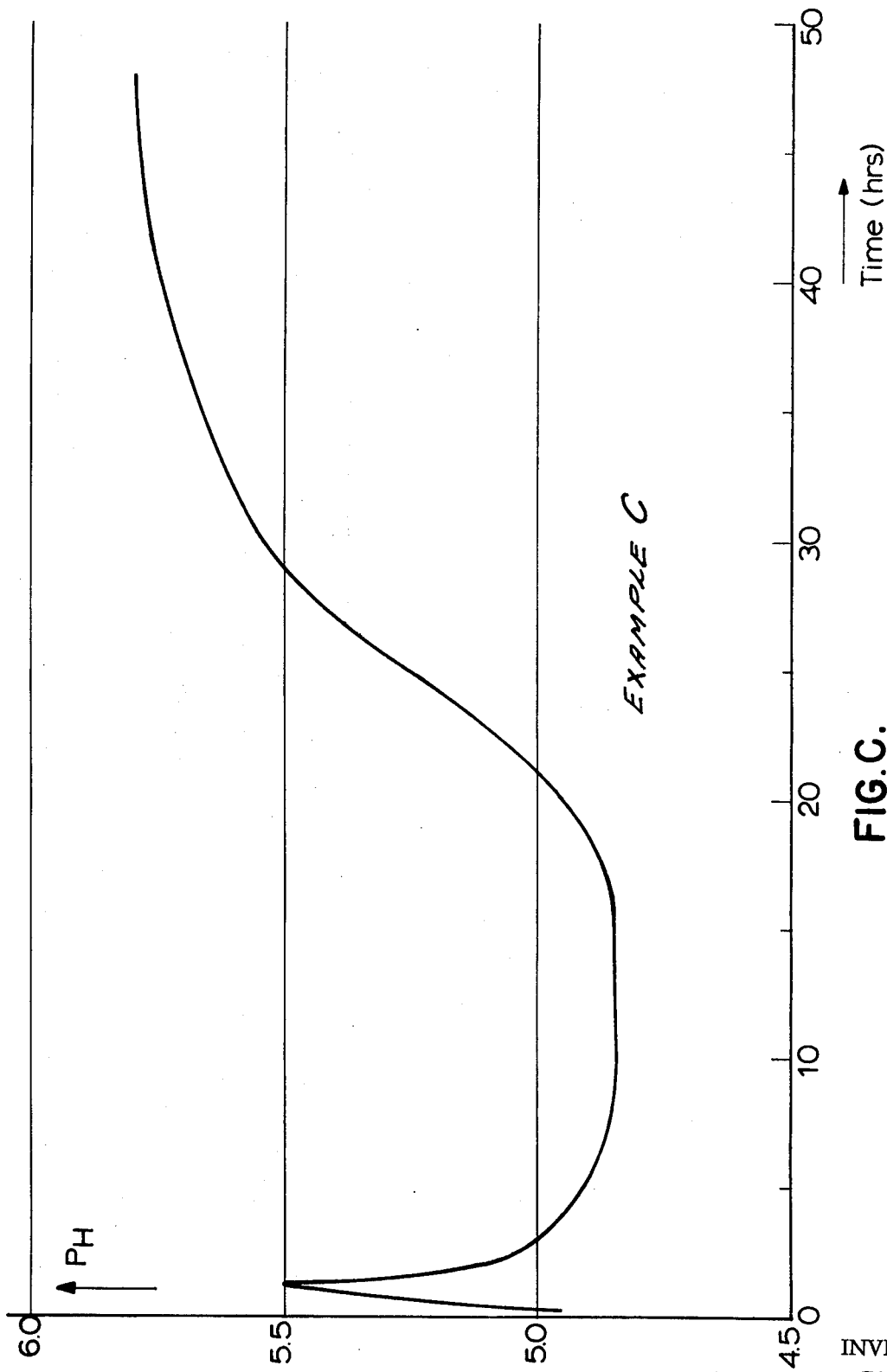

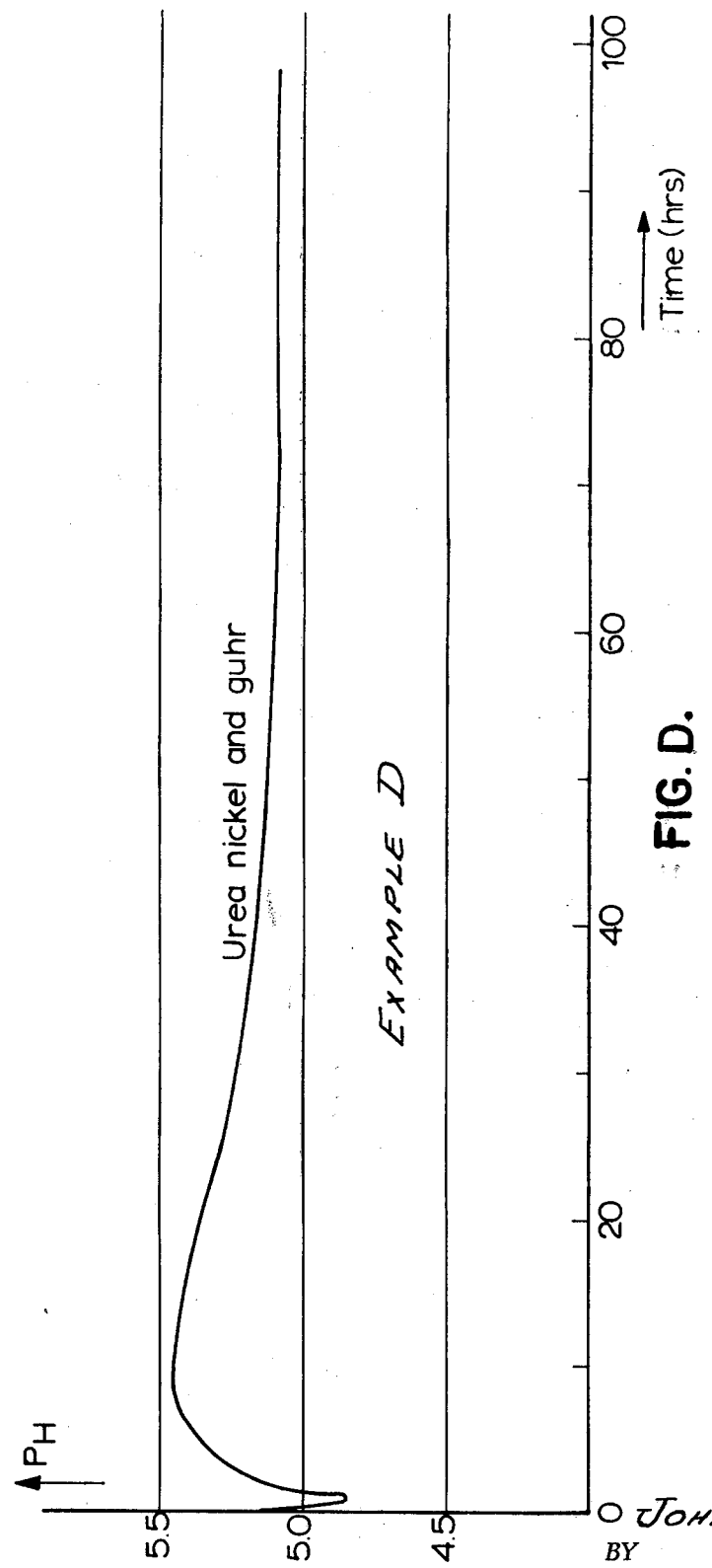

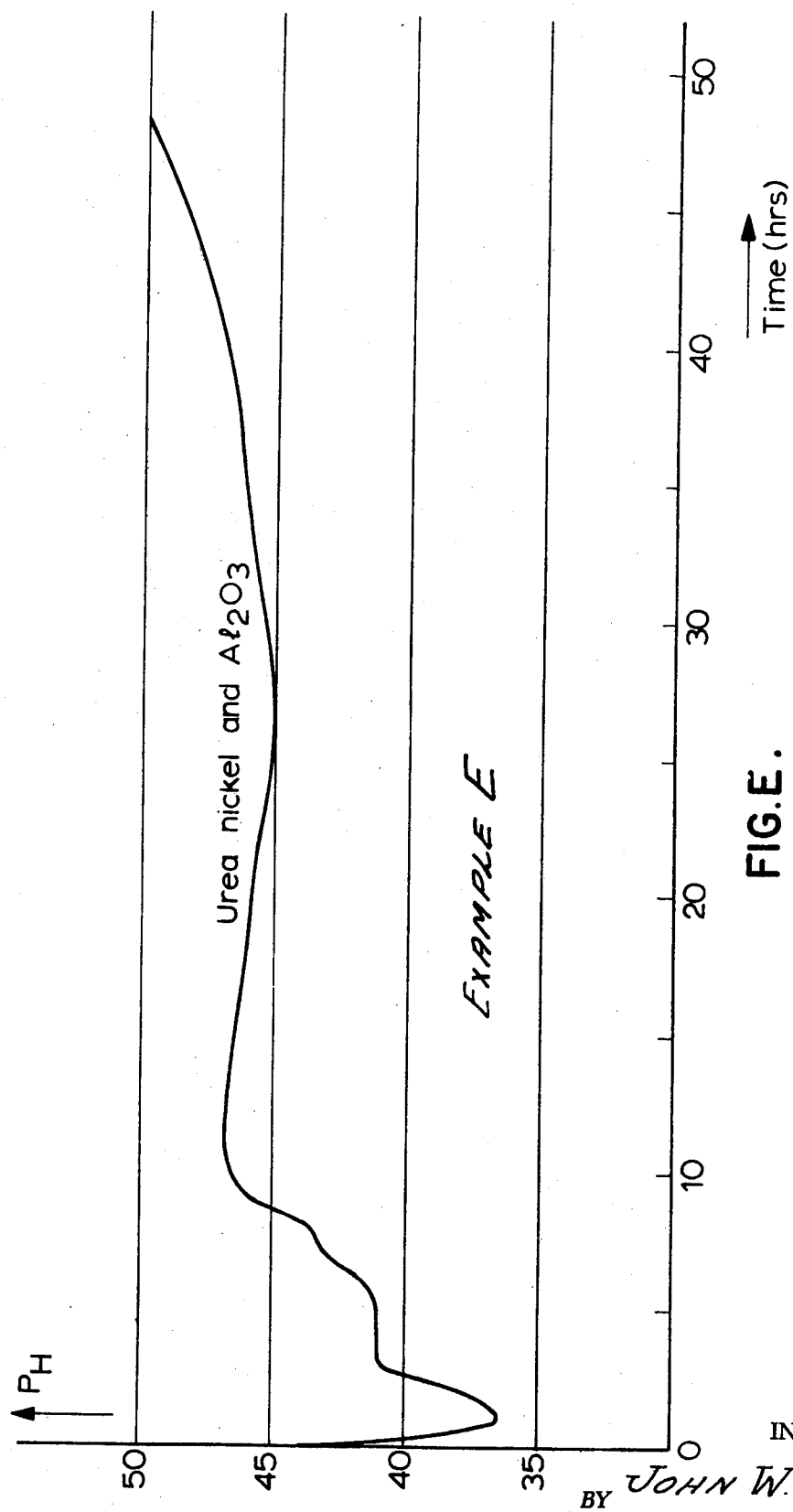

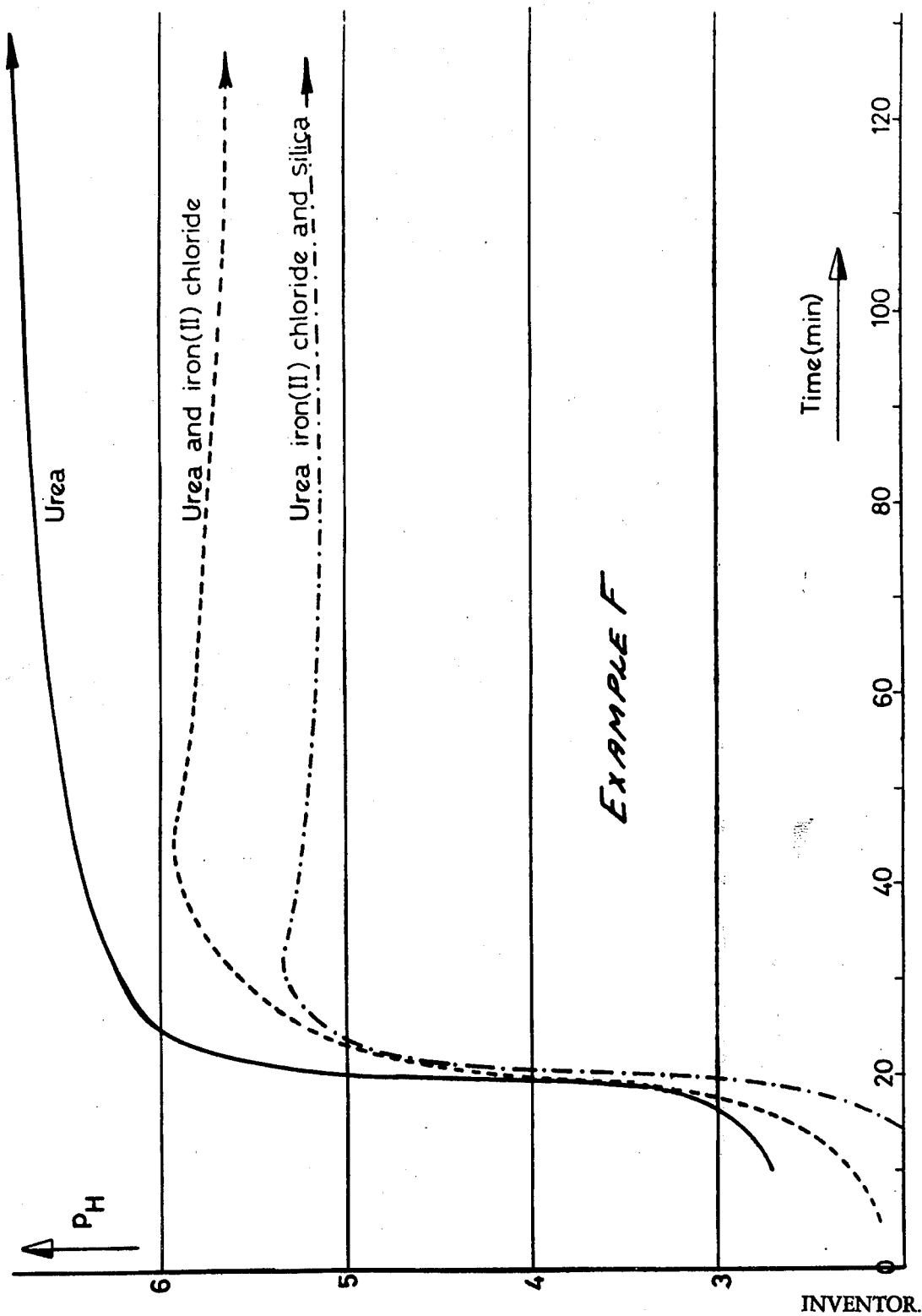

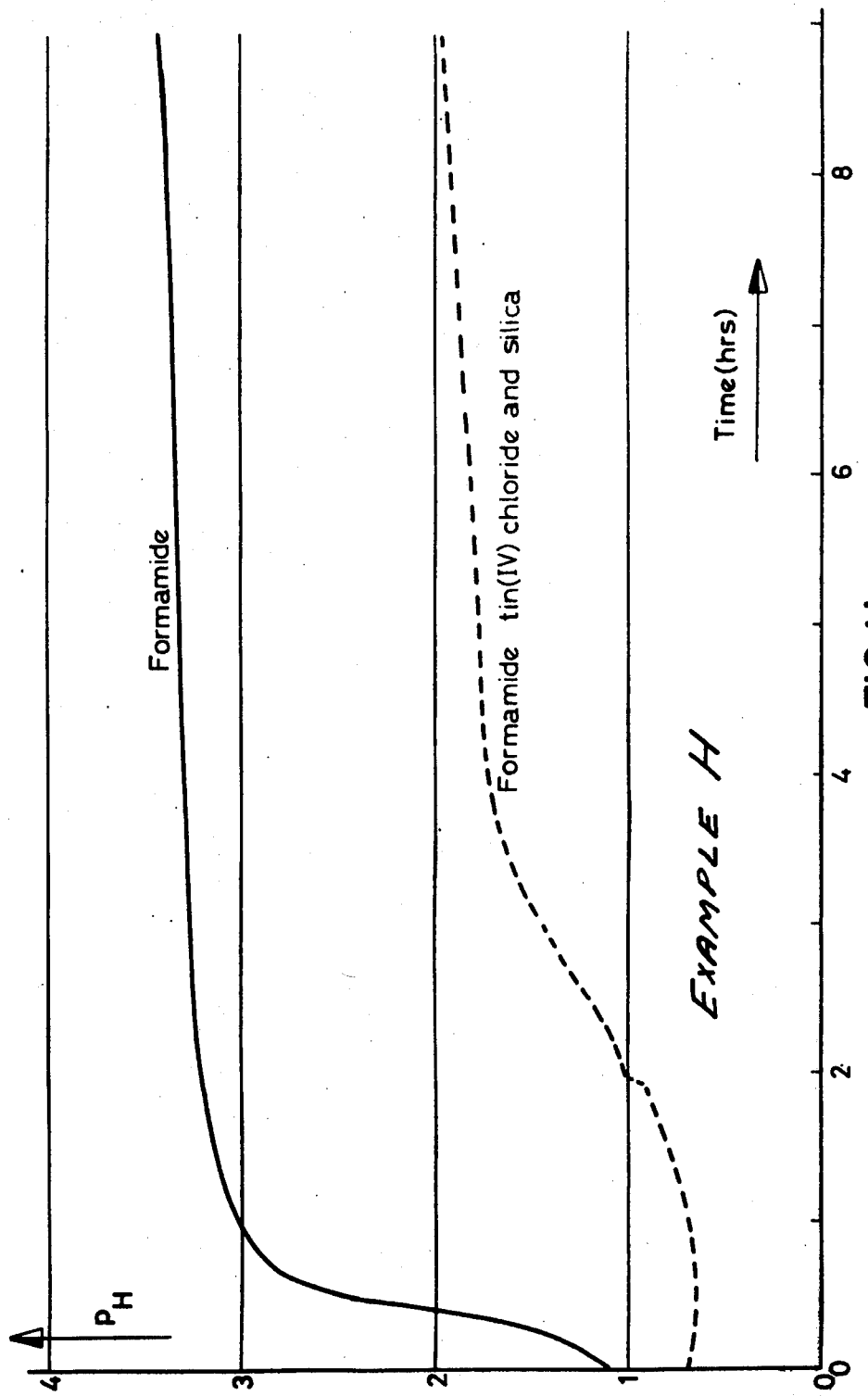

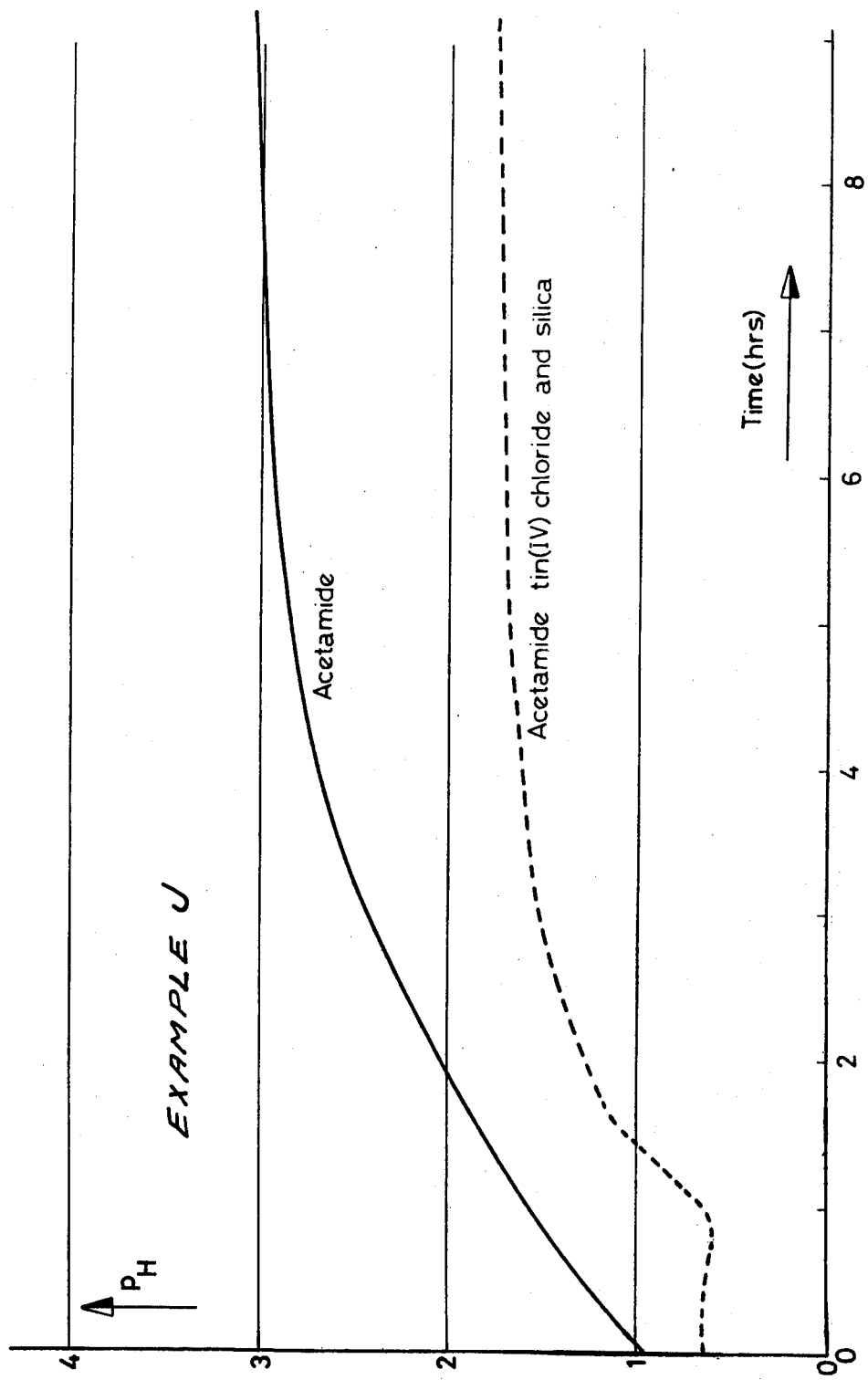
FIG. J.

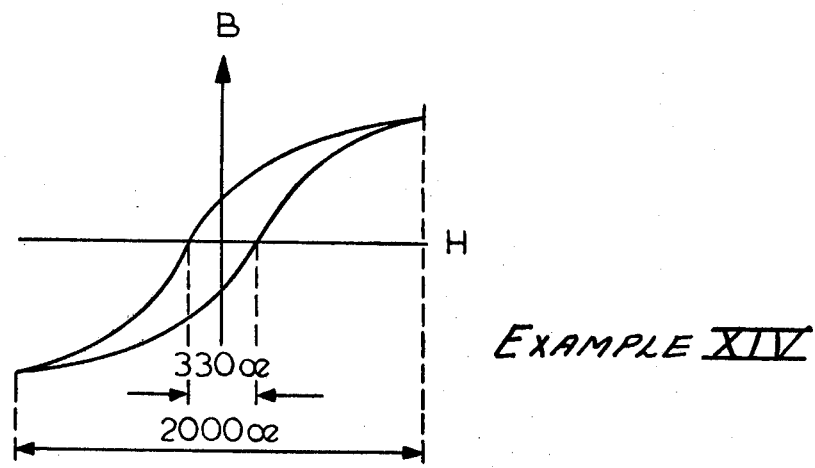
FIG. K.
EXAMPLE XIV

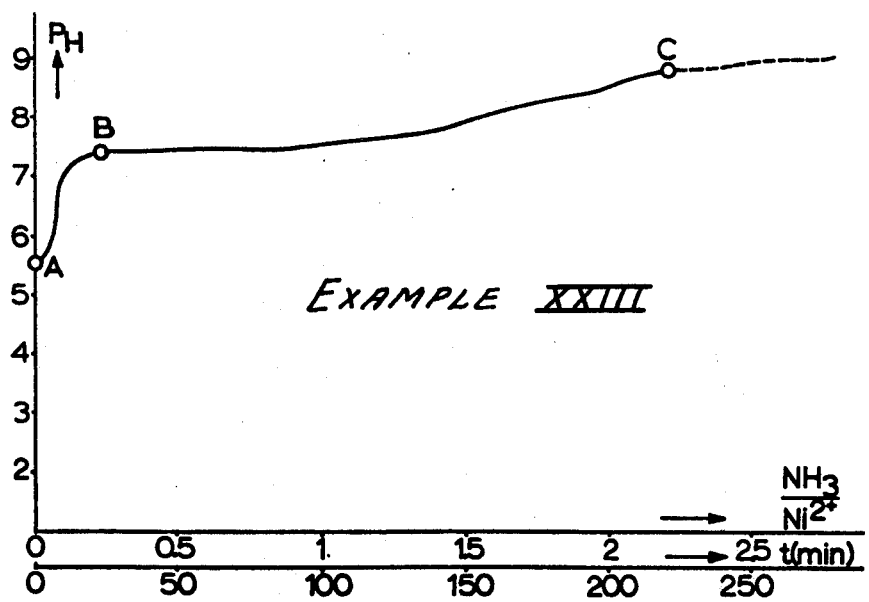
FIG. L.
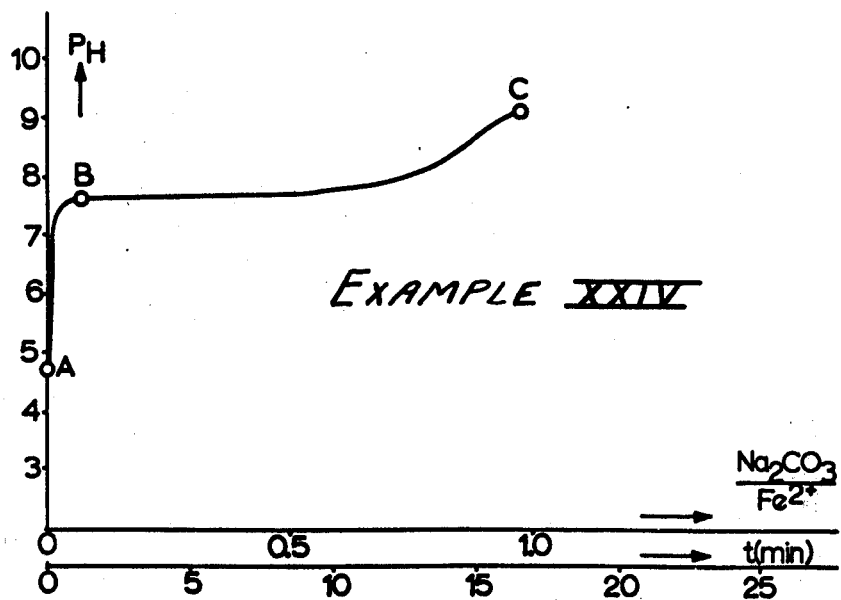
FIG. M.

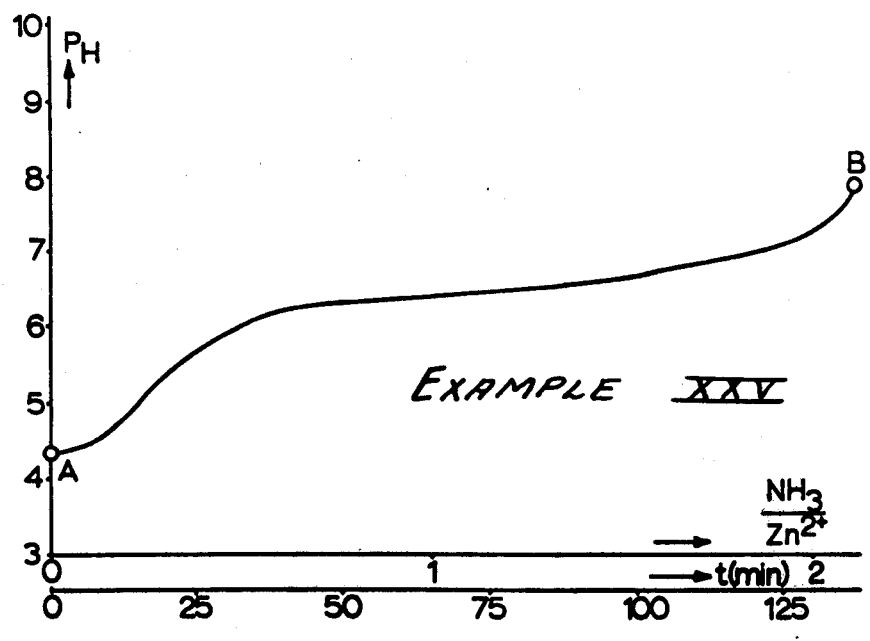
FIG. N.
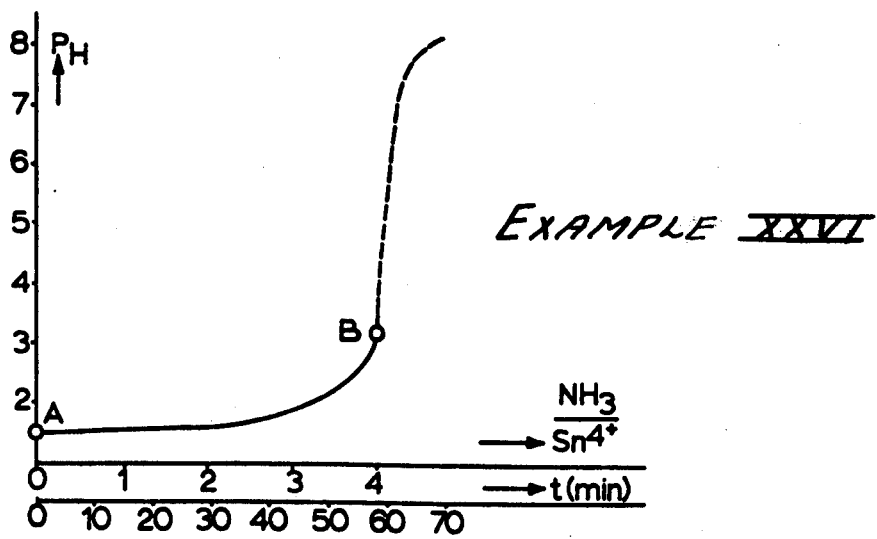
FIG. O.

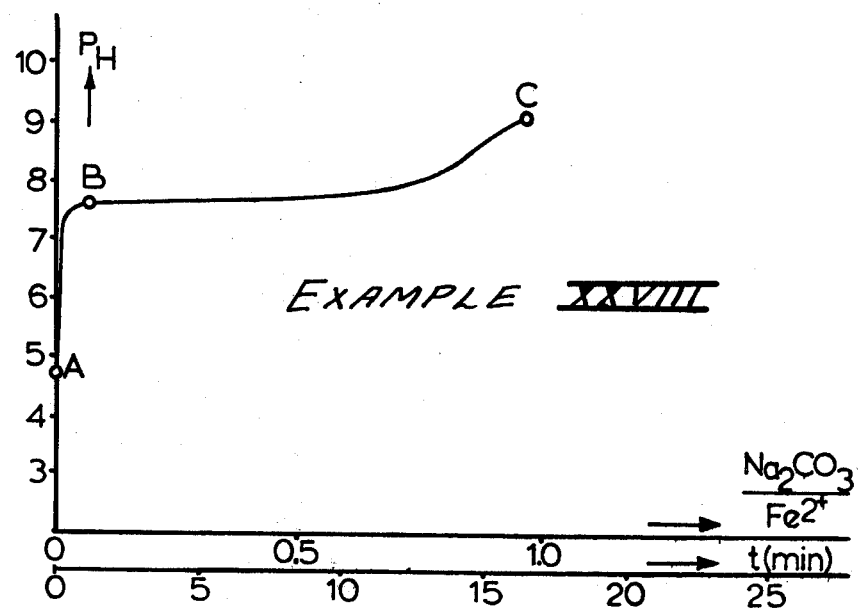
FIG. P.

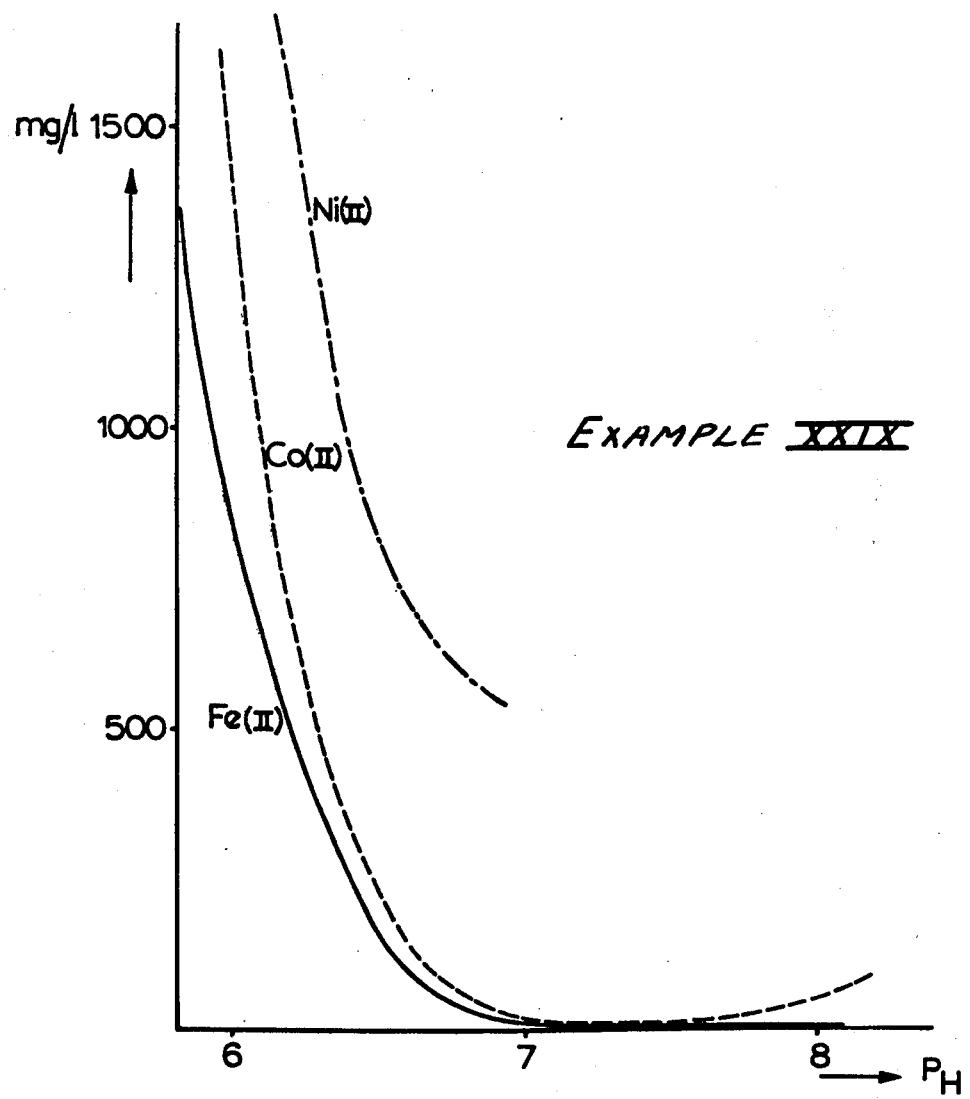
FIG.Q.

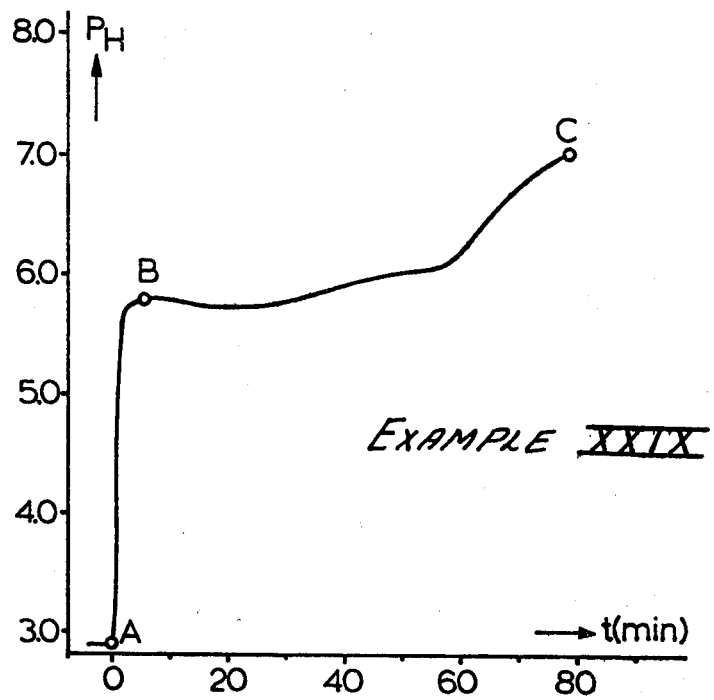
FIG. R.
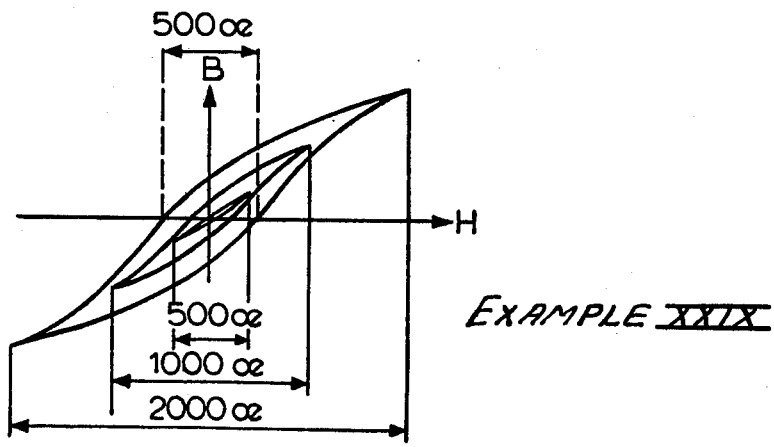
FIG. S.

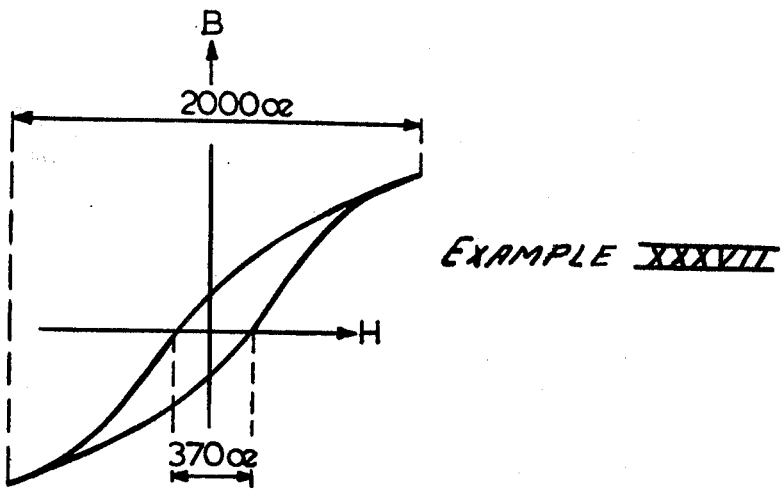
FIG. T.
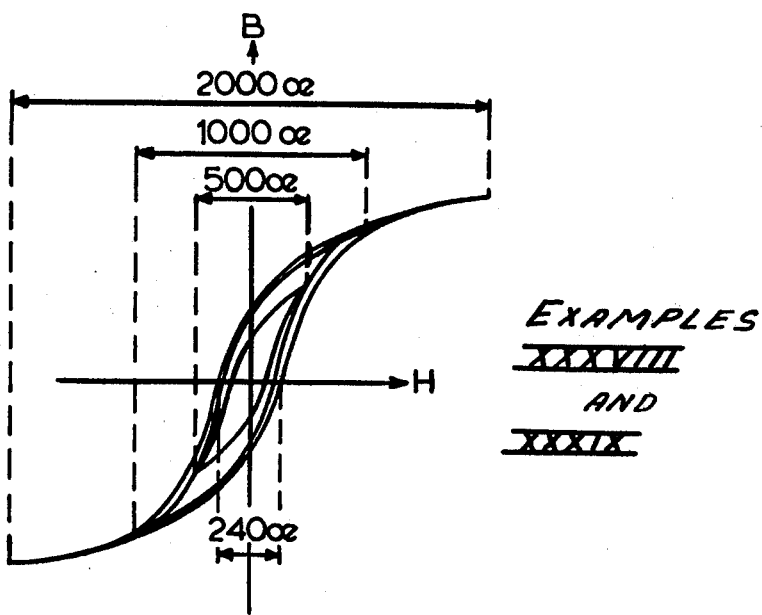
FIG. U.

FIG. V-1

500 A
FIG. V-2

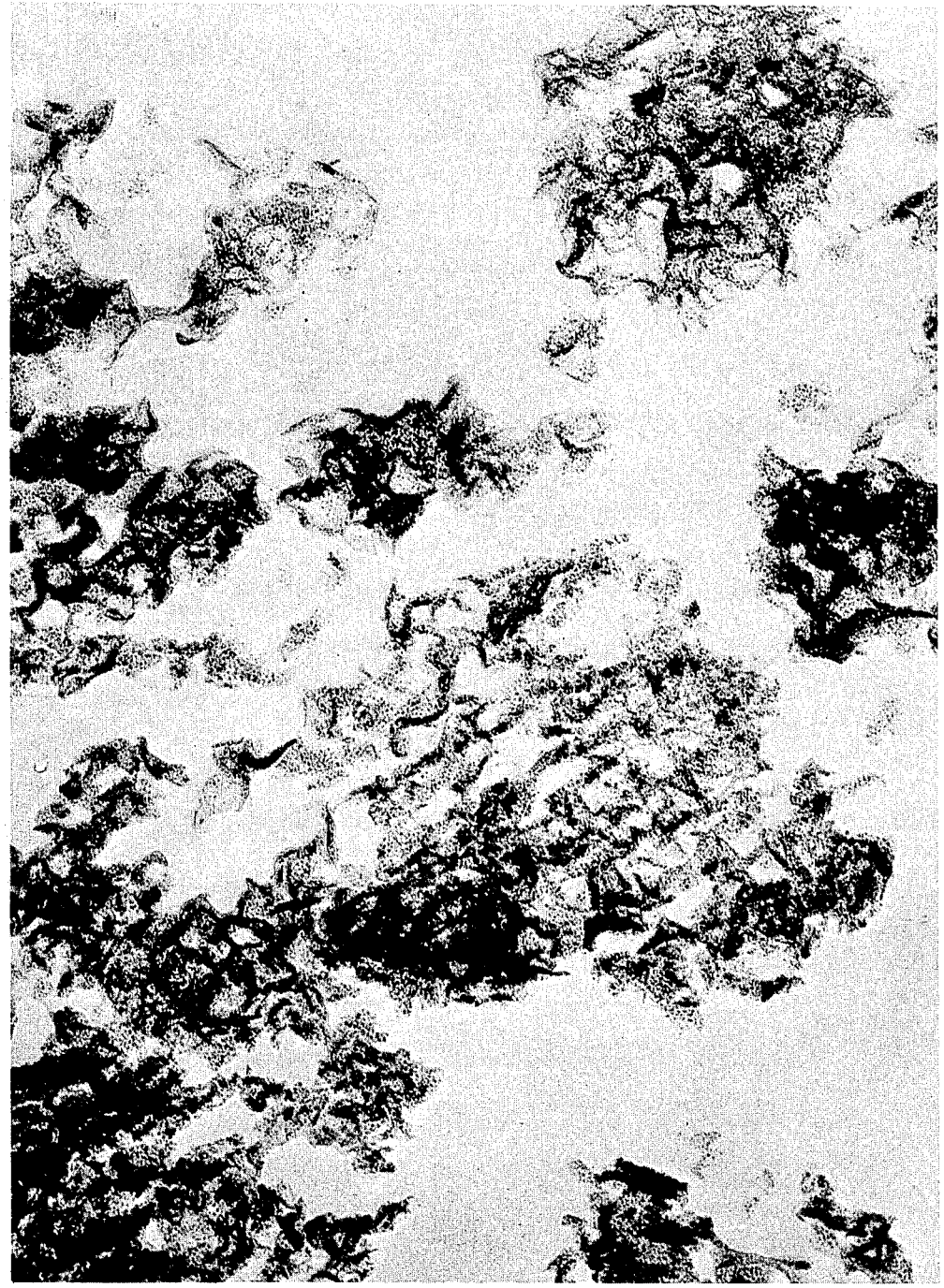
FIG. W.

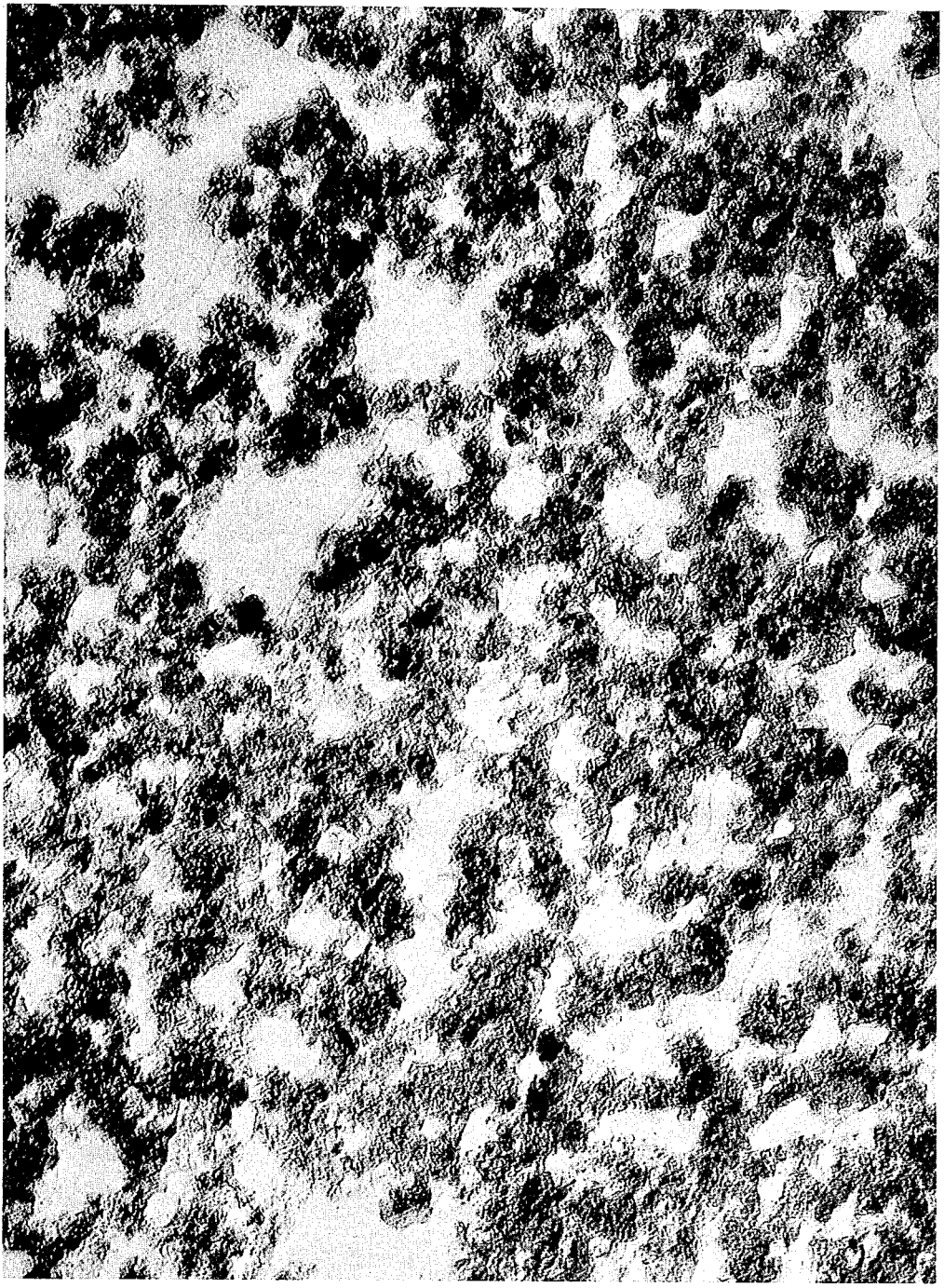
500 Å
FIG. X-1

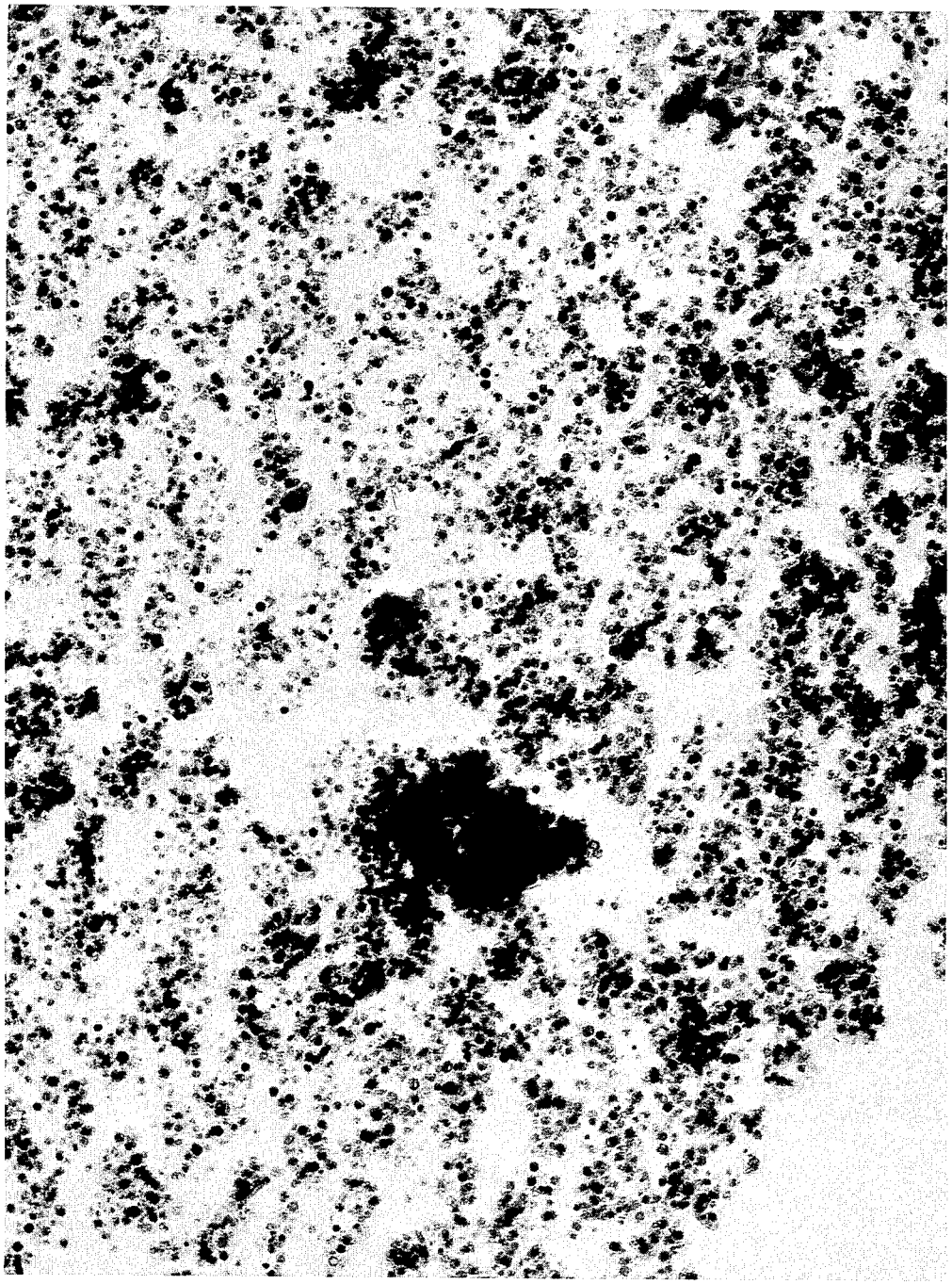
500Å
FIG.X-2.

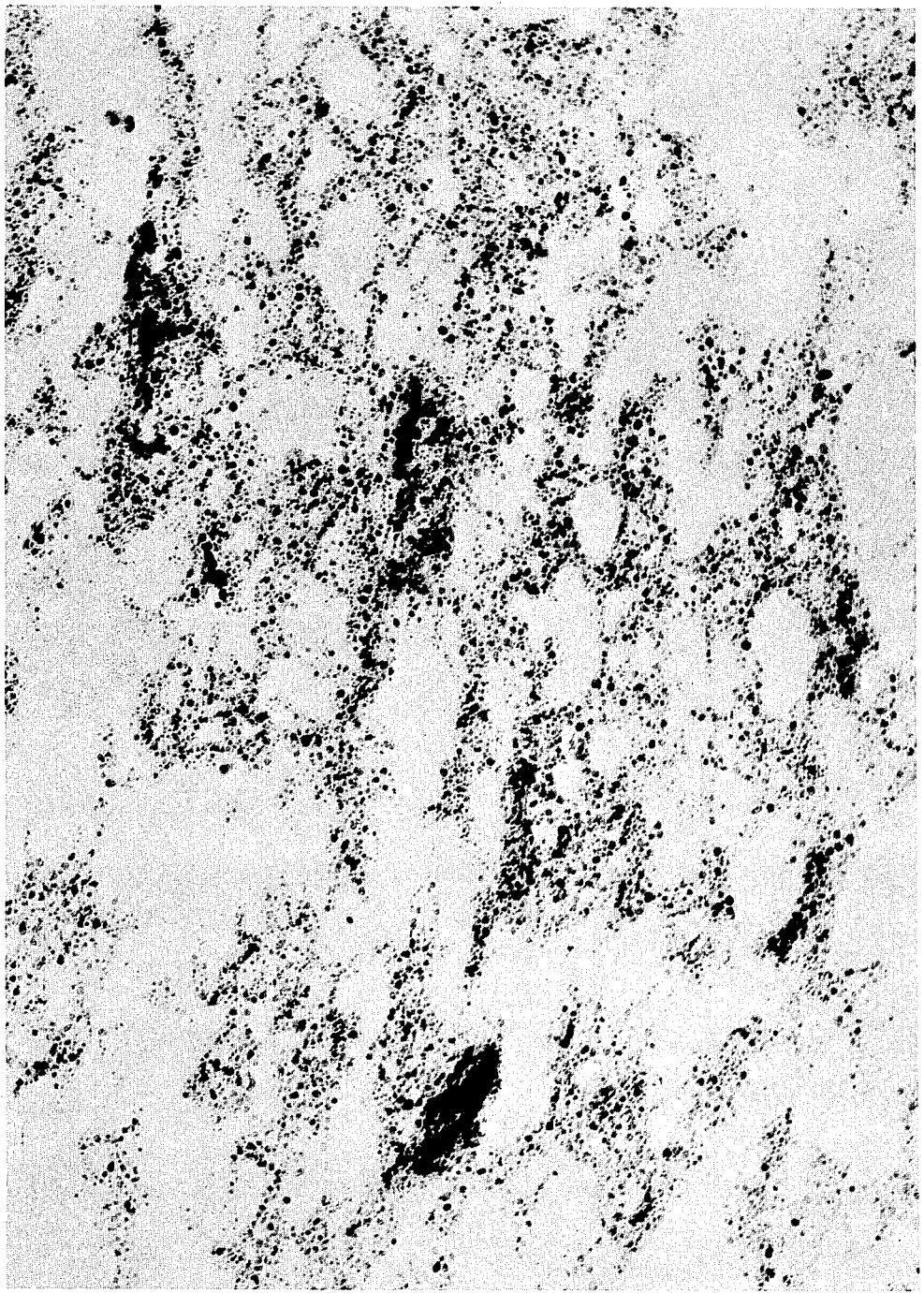
500 Å
FIG. Y.

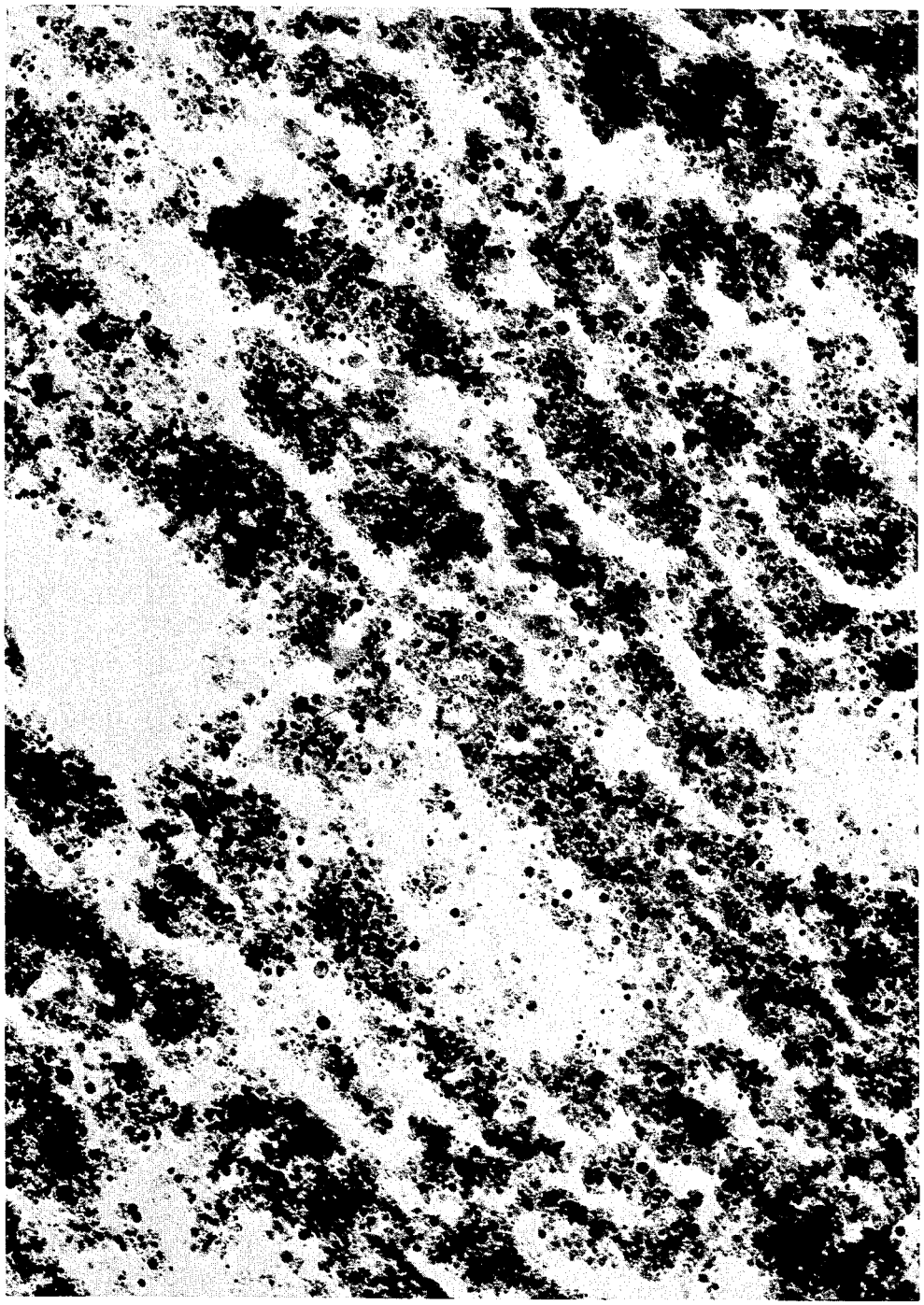
500 Å
FIG. Z.

PROCESS FOR HOMOGENEOUS DEPOSITION PRECIPITATION OF METAL COMPOUNDS ON SUPPORT OR CARRIER MATERIALS

This is a continuation of application Ser. No. 361,492, filed May 18, 1973, which in turn is a Rule 60 continuation of Ser. No. 108,081, filed Jan. 20, 1971; each now abandoned, and a C-I-P of the following copending applications, the disclosure of each of which are incorporated herein by reference: Ser. No. 721,051, filed 4-12-68; Ser. No. 743,000, filed 7-8-68; Ser. No. 814,703, filed Apr. 9, 1969; Ser. No. 858,318, filed Sept. 16, 1969; Ser. No. 886,693, filed Dec. 19, 1969, and Ser. No. 879,625 filed Nov. 24, 1969, each of the above applications now being abandoned, and Ser. No. 577, filed Jan. 5, 1970, now U.S. Pat. No. 3,654,161, issued Apr. 4, 1972.

INTRODUCTION

This invention relates to the preparation of novel compositions of matter useful as, or for conversion into, for instance, valuable catalytic and magnetic materials.

According to some of the embodiments of this invention, catalytic compositions are provided which are useful in various chemical processes which presently employ metallic or metal compound-containing catalysts. In other embodiments of this invention, compositions are provided which are useful in the preparation of magnetic impulse record materials, such as magnetic tapes, sheets, belts, records or wires, for the storage and the reproduction of information, and also as being suitable to be molded to form shaped ferro-magnetic bodies.

The compositions of these embodiments of this invention may generally be prepared by essentially similar process techniques, as are described hereinafter, and such processes comprise further aspects of this invention, as claimed hereinafter.

Accordingly, it will be understood that the general objects of this invention are to provide certain novel processes for the preparation of new compositions of matter, and also to provide such compositions themselves. Specific objects and features of this invention will be discussed more fully hereinafter.

Stated most generally, the compositions of matter provided by this invention comprise very finely divided particles of metallic materials substantially homogeneously deposited upon, and adhered to, a supporting or carrier material (the terms "metallic material" or "metallic particles" as generally used herein refer to the elemental metal itself or to a compound thereof). The carrier material is generally a finely divided, particulate, preferably thermally stable substance, and may be typified by silica, or other suitable materials, as are named hereinafter.

The deposited finely divided metallic material particles are generally of a non-acicular form, as is more fully related hereinafter, and are generally considered to be adhered to the carrier through a transition boundary layer lying between the crystal structure of the metallic particle and that of the supporting or carrier material.

Generally, the size of the metallic particles is substantially less than that of the supporting material, and a plurality of metallic particles, dimensionally independent (e.g. spaced apart) of each other, will be disposed on each such supporting particle. Further, the metallic particles are substantially completely arranged on surfaces of the supporting particles (as opposed to being distributed throughout the lattice structure of such supporting particles).

As also brought out hereinafter, the metallic particles have certain specific dimensional and other characteristics which contribute to the value of the compositions provided by this invention.

The novel processes provided by this invention for producing these compositions may generally be described as involving a special method of precipitation from a homogeneous solution of the metallic particles onto the surface of the supporting particles. While this special precipitation technique may be effected by various chemical and physical means, it generally comprises forming an agitated suspension of the supporting particles in an aqueous medium containing a dissolved compound of the metal to be deposited and then inducing a very gradual and controlled change in the ambient chemical or physical conditions of the aqueous solution so as to cause formation of an insoluble compound of the metal with nucleation and the deposition thereof occurring substantially exclusively on the surface of the supporting particles. The conditions of the process are so controlled as to avoid any substantial nucleation of the insoluble metal compound in the solution phase per se — that is, nucleation thereof is effected substantially exclusively at, and/or on, the surface of the supporting particles.

By means of such process, homogeneous deposition precipitation of very small particles of the metal compound, adhered to the support, can be achieved e.g. of a size of the order of 10 to 100 A units, preferably. It is possible that even smaller, and also somewhat larger, particles can be prepared for participation purposes of this invention, and according to the method described herein. This result is in contrast to the frequent observation that known precipitations from the homogeneous solution, of an insoluble compound within a solution phase, generally leads to rather large crystal particles of the precipitated compound.

As a result of the process of this invention, very finely divided metallic particles may be formed on the surface of a particulate supporting material, and by virtue of their fixed, generally spaced apart, positioning thereon, the fine division and separation of the metallic particles can be maintained during subsequent operations such as calcining, or other heat treatments, and, e.g. oxidation or reduction treatments. Such subsequent operations are frequently necessary to convert the initially deposited material, generally a compound of the metal, to a form useful for the ultimate intended purpose. These features, and specific embodiments thereof will also be described more fully hereinafter.

DESCRIPTION OF THE PROCESS OF THE INVENTION

As stated, one of the objects of this invention is to provide a novel process for the preparation of improved catalytic and magnetic compositions. This feature and object of the invention will now be described.

GENERAL DISCUSSION

According to the process of this invention, a body of an aqueous medium is formed, with a vigorously agitated suspension of the finely divided solid particulate stable, preferably thermally stable, nucleating-surface providing supporting or carrier material which is insoluble under the conditions of the deposition precipitation, and generally at most weakly magnetic. It is important to the practice of the invention that distribution of the suspension be essentially "homogeneous" throughout the "body" of said aqueous medium. In fact, the entire composition of the "body" should be substantially homogeneous throughout the practice of the process, within the limitations described hereinafter.

Where the word "homogeneous" is used in describing the process of this invention, it has a specific meaning. Of course, because at least two different "phases" are present (the solution or liquid phase and the solid phase of the suspended particles) absolute submicroscopic homogeneity is not theoretically possible. But, by homogeneous distribution there is meant herein that substantially all increments of the body of the aqueous medium having sufficient dimension to contain representatives of all components in the body of the aqueous medium will be of a substantially identical composition through that body.

The term "nucleating surface" as used herein refers to a surface having the characteristic of inducing crystallization of the insoluble metal compound, which is formed during the process, by stabilizing the initial nuclei thereof on such surface for crystal development, as further described hereafter.

One of the objects of the invention is a process wherein the crystallization formation of the insoluble metal compound can occur and does occur as an event closely associated with the surface of the supporting material. It is by this means that deposited particles of the insoluble metal compound develop substantially exclusively upon the surface of this supporting material.

A prerequisite for this method is that the metal compound to be deposited not only be formed homogeneously and gradually, but more is required.

It is known that the specific free energy of free nuclei of the compound being precipitated, i.e., nuclei formed within the solution phase itself, is considerably higher than that of a correspondingly larger particle or crystallite of such compound in contact with the same solution under the same conditions. This is due to the larger surface energy of the said small free nuclei. Accordingly, the solubility product of very small particles of an insoluble compound is larger than that of extended particles of the same compound. In effect any small free nuclei in such a situation are unstable against re-dissolation.

Consequently, the free nuclei have a higher solubility than larger crystallites, so that in the presence of larger crystals no new nuclei can be formed and the larger crystals grow only still larger provided that the metal compound to be deposited is formed so homogeneously and gradually throughout the "body" of the solution, that the concentration of the compound remains below the concentration whereat spontaneous nucleation in the "body" of the liquid can occur.

However, according to this invention it has been found that in the presence of a supporting or carrier material conditions can be established where growth of the solid phase of the compound to be deposited proceeds exclusively on the surface of the supporting or carrier material. The above conditions are first that the specific free energy of nuclei formed at the surface of the carrier material is significantly lower than that of free nuclei formed within the solution phase itself, owing to interaction of the deposited nuclei with the surface of the supporting or carrier material. Moreover, to obtain nucleation over the complete surface area of the carrier or supporting material the interaction of such nuclei with the carrier surface should be at least as large as that of such nuclei with surfaces of crystals of the compound already deposited.

Accordingly, by practice of the process of this invention stable small deposited nuclei can be formed on the carrier or supporting surface at concentration levels whereat small free nuclei, if formed within the solution phase, would re-dissolve.

The interaction of nuclei with the carrier surface must be at least equal to that of nuclei with surfaces of extended crystals of the compound to be precipitated in order to cause deposition all over the surface of the carrier, and to avoid mere growth of previously deposited isolated nuclei already adhering to the carrier or supporting surface. With this condition existing, formation of additional unstable nuclei in the solution phase will not preferentially lead to increased crystal growth of an existing, already deposited, particle on the surface of the carrier material; rather, additional sites for crystal development at other locations on the carrier surface can and will be utilized.

The result is that a homogeneous distribution of small particles, or a substantially continuous very thin layer of the metal compound, on the surface of the supporting or carrier material will be formed.

The process according to the invention requires a homogeneous and gradual increase of the concentration of the compound to be deposited. If locally, in the solution phase, a higher concentration is intermediately established, that affords nucleation and development of isolated free larger crystals such larger crystals will not readily re-dissolve at the low degree of undersaturation which can be obtained on homogenation of the solution. Hence according to the practice of the present invention the increasing concentration of the compound to be deposited is raised only to levels below the level whereat spontaneous nucleation of free nuclei within the solution can occur.

The process of this invention thus requires the conditions of a precipiation from a homogeneous solution of a metal compound onto the suspended particles of the supporting or carrier material. The term "precipitation" as used herein has thus a special meaning. As stated it specifically refers to the formation of the insoluble metal compound, and its removal from the solution, through the phenomenon of nucleation and formation of the crystals of the insoluble metal compound upon the surface of the supporting material. It does not refer to "precipitation" of an insoluble compound from a solution, wherein the insoluble crystals, nucleated within the solution phase, merely "fall down" upon the surface of the supporting material. In order to distinguish the particular kind of "precipitation" which is contemplated in this invention from more general references to "precipitation", the term "deposition precipitation" will be employed hereinafter — such term having herein specific reference to the above-mentioned nucleation of the insoluble metal compound upon or at the surface of the supporting material.

As mentioned above, the "body" of the aqueous medium should be homogeneous throughout as to all components of the liquid and solid phases. Similarly, during the precipitation stage of the process, the aqueous solution itself should absolutely be maintained "homogeneous". This means, again, that as precipitation is induced in the course of the process, the nuclei of the very fine particles of the precipitating insoluble metal compound are also distributed homogeneously throughout the body of the aqueous medium — but with such nuclei forming substantially solely upon the surface of the supporting material, as described. In effect, this means that the change in the chemical or physical condition of the body of aqueous medium which causes such nucleation and homogeneous deposition precipitation to occur must be a change which is induced substantially homogeneously throughout the body of the aqueous medium wherein this condition is being changed.

In general, any metal which will form a soluble compound, and which can then be caused to form an insoluble compound, by a change in the condition of the aqueous medium, and which insoluble compound will also "nucleate" on the surface of the supporting material in use, may be employed in the practice of the process of this invention.

There is formed, in the process according to the invention a solution of a soluble compound of the desired metal to be precipitated within the body of the aqueous medium. The process of the invention is then carried out by inducing the homogeneous formation of an insoluble compound of such metal in such a way that the insoluble metal compound particles are formed solely by, or at least substantially solely by, nucleation and crystal growth on the surface of the supporting material. As a practical matter, the metal compounds or metals which are employed according to this invention are advantageously those which form compositions which have either catalytic or magnetic utility, or which can be converted to a form having such catalytic or magnetic activity by suitable subsequent treatment. These are more fully described hereinafter.

The supporting or carrier materials used in this invention are illustrated by such thermally stable inorganic compositions as: silicon dioxide, aluminum oxide, aluminum silicates, graphite, titanium dioxide, chromium oxide, manganese oxide, zinc oxide, cadmium oxide, or other suitable metal oxides or other water-suspendable compounds. Generally the useful principle size range for the particular of these materials is between about 100 Å to about 3000 Å — it being appreciated that some portion of the particles will typically be somewhat larger or smaller, depending upon the mode of manufacture.

Other supporting materials which may be used include asbestos, paper pulp or suspendable insoluble synthetic materials, and other materials mentioned hereinafter. Where reference is made to "weakly magnetic" carrier materials, there is meant a substance which has a magnetic susceptibility of the order of $10^{-6}$ per gram or less, and in any event, the magnetic susceptibility of the carrier material should be at most $10^{-3}$ of the magnetic susceptibility of the magnetic particles formed from the deposite on said carrier in those embodiments of this invention wherein magnetic applications are most important.

The carrier material is preferably used in the form of particles not larger than 200 Å. Highly suited is a silicon dioxide preparation made from silicon-tetrachloride, trade name "Aerosil", by means of flame hydrolysis. The average particle size of one grade of such product is about 140 Å, the specific surface area 150 m²/g.

To summarize, fundamentally then the present process requires causing or inducing a change in the composition of the above described solution or suspension to cause a gradual and homogeneous increase in the concentration of at least one ion in said solution. But beyond this the process further requires that this increase in said concentration is brought to a level at which deposition nucleation of the metal compound to be precipitated, will occur on or at the surface of the supporting or carrier material but is kept at a level below that at which free nucleation of said compound would occur within the solution phase itself, whereby said last-mentioned free nucleation will be at least substantially avoided.

The said changes in the composition of the said solution phase are not such as to cause any substantial dissolution of the supporting or carrier material itself. Then the process requires continuing homogeneous and gradual further change in said composition to cause additional increases in at least the total concentration of said ion (in solid and liquid phases together) at a rate approximately the same as the rate of transportion of the metal ions to be precipitated from the solution phase to the solid phase. Still further, the metal compound to be precipitated must be selected in combination with the suspension of said supporting or carrier material such that (a) deposition nucleation of said compound on or at the surface of said supporting or carrier material will occur (i.e., said surface is a nucleating surface for the compound in question), with (b) formation of a deposited particle of said compound on said surface, with the further condition (c) that the interaction energies of the deposition nuclei with the surface of said supporting or carrier material particles is not substantially less than said interaction energy with the surface of the already deposited particles whereby further deposition of said compound, as the process proceeds, will occur at new sites on the said nucleating surface, and whereby the precipitated metal compound is distributed over at least a large plurality of small deposited particles.

As will be made clear hereinafter, this "nucleating surface" will in general have, under the deposition precipitation conditions, an electrostatic charge of the opposite sign as compared to the charge of the unstable metal compound nuclei being precipitated, or the nucleating surface will have the capability of forming a compound with the precipitating metal strongly interacting with the compound being precipitated.

Generally, the supporting or carrier materials used in this invention have very large surface areas, e.g., in excess at least about 12 m²/g., and most significant results are achieved with supporting materials having surface areas above about 18–20 m²/g., and especially in the range of from about 150 to 500 m²/g. For substantially symmetrical particles of the supporting material, the dimensions should hence not be greater than about 2,500 Å.

In effecting the deposition precipitation according to this invention the deposited compound when deposited in discrete particulate form, will generally have a mean diameter of less than about 500 Å, and when deposited in a layer form, the thickness of the layer, in general, averages less than about 100 Å.

There are a number of process techniques whereby the deposition precipitation of the metallic material onto the carrier may be effected in accordance with the practice of this invention. These include, inter alia, homogeneous change of hydroxyl ion concentration, as by either an in situ generation or injection of hydroxyl ions; homogeneous oxidation or reduction of a soluble metal compound to form an insoluble precipitatable metal component, either a compound or the metal itself, using an appropriate redox agent; homogeneous decomplexation of a complexed metal ion, to form an insoluble precipitatable metal compound; homogeneous introduction of an insolubilizing ion to precipitate the insoluble metal compound; or homogeneously increasing the concentration of the metal ion to be precipitated; and in some embodiments, in situ generation of the carrier material and/or deposition of more than one insoluble metal components. These various techniques will now be described.

The principles of the practice of this invention will generally be similar, and in accord with the above discussion. The following discussions, however, for convenience and clarity, illustrate the application of those principles to certain general and specific embodiments of this invention.

THE PROCESS BY HOMOGENEOUS CHANGE IN HYDROXYL ION CONCENTRATION

In one generally useful embodiment of the invention the deposition precipitation of the desired metal may be caused by simply gradually and homogeneously changing the pH of the solution in a controlled fashion. In turn, this change in the pH of the solution may be affected in various ways. For instance, there can be a gradual in situ homogeneous generation of hydroxyl ions in the solution, or there may be a gradual homogeneous injection of hydroxyl ions by adding an alkaline solution to the body of the aqueous medium under controlled conditions. According to either of these procedures, the pH of the aqueous medium is gradually increased from a more acidic level to a more alkaline level until precipitation starts. With many of the metals of important utility for the production of both catalytic and magnetic compositions, deposition precipitation will occur through the formation of an insoluble metal hydroxide, oxide or (basic) salt precipitate as the pH of the solution is gradually brought to a level at which the nucleation of the insoluble metal hydroxide, oxide, or (basic) salt on the surface of the supporting particles takes place.

The process then continues without further substantial changes in the pH of the solution phase itself, but with continuously increasing the basic precipitating ion concentration of the entire system (liquid and solid phases together).

A prerequisite for this method is that hydroxyl ions be increased homogeneously and gradually. By "homogeneously" is understood here that the hydroxyl ion concentration does not significantly vary with the location in the solution but that it is the same throughout the solution, even if arbitrarily small unit volumes are considered. "Gradually", as used herein to describe the increase of hydroxyl ion concentration, means that the rate at which the concentration of the compound to be precipitated increases in the solution is no greater than the rate at which the material to be precipitated migrates through the solution to the surface of the carrier material. And, since the free energy, and hence the solubility product of any precipitation nuclei, in solution, is considerably higher than that of precipitated particles on the carrier surface, the critical value of the hydroxyl, or other ion-concentration, at which precipitation nuclei can be formed within the solution phase per se need not be exceeded, provided the increase of the concentration of the hydroxyl ions in the solution proceeds homogeneously and gradually, and under controlled conditions.

The increase in hydroxyl concentration is thus high enough to precipitate the active element(s) onto the carrier, but too low to effect nucleation of pure precipitate in the solution, i.e. that the migration of the still soluble active element(s) to the carrier is faster than, or equally as fast as, the generation of hydroxyl ions in the solution. As a result the at least inchoately magnetizable or catalytic element(s) is precipitated substantially exclusively onto the suspended carrier material as a hydroxide or an insoluble salt. The carrier material so loaded may be subsequently separated from the solution and subjected to a thermal, or other treatment.

The rate at which the material to be precipitated migrates through the solution depends on the intensity with which the solution is stirred and the degree to which the solid carrier material is distributed through the suspension. Since both of these variables can be adjusted within very wide limits, the results obtained can, in part, be determined by the control exercised over these variables.

Consequently, one condition for precipitation exclusively onto the carrier is to generate hydroxyl ions homogeneously in the solution at a rate that prevents exceeding of the solubility product at which nucleation of a pure precipitate is liable to occur. This means, again that the migration of the, still soluble, precipitate to the carrier surface has to be faster than the generation of hydroxyl ions.

For the proper adhesion of a precipitated metal ion or metal atom to the rather universally applicable carrier silica, the pH range from 6 to 8 is frequently very suitable, and in other cases a pH of from 5 to 7 is used. At a pH above about 5 or 6, the silanol groups in the surface of hydrated silica begin to show a marked degree of ionization, which takes place according to the reaction:

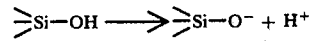

Positively charged ions or conglomerates of precipitated atoms are strongly bound to such a negatively charged silica surface. Although the ionization of the silanol groups at the surface increases continuously with increasing pH values, there is an upper limit of pH values above which suitable catalysts can no longer be produced. In fact, at pH values higher than approximately 8, the silica dissolves to an appreciable extent. The temporarily dissolved silica then precipitates again with the catalytically active component and encloses the latter to a larger or smaller extent. Consequently, the part thereof which remains accessible to the reactants has a rather low activity. With other usual carrier materials such as $Al_2O_3$, $TiO_2$, $ThO_2$ or clays, i.e. silicates, the surface charge varies in a similar manner with the pH of the solution.

For instance, complete control of the pH value is important inter alia in the precipitation of amphoteric hydroxides, which are insoluble only within a limited range of pH values. Examples in point are aluminium and zinc hydroxides. If the pH value is raised too high, these substances can redissolve as an aluminate or zincate.

Further, adsorption of the precipitate to the carrier with appreciable energy is an essential condition for obtaining the desired material. For instance, the lattice energy (i.e. the mutual bond energy of ferric and oxygen ions) of ferric oxide is high compared with the adsorption energy of these components to, say, silicon dioxide. Precipitation of ferric oxide from the homogeneous solution in the presence of a suspended carrier material, consequently does not lead to homogeneous distribution of minute ferrichydroxide particles over the carrier. It has been found in this invention that in such circumstances use can be made of a soluble ferrous compound. The lattice energy of ferrous hydroxide is much lower (the solubility product being much higher), with the result that conditions can be found and maintained such that nucleation remains limited to the surface of the carrier material. For the preparation of a material with extremely small, homogeneously distributed magnetizable particles containing iron, the iron in the starting solution should, therefore, be present substantially in the bivalent state.

In the process wherein the hydroxyl ions are formed in situ, the rate of generation thereof can be controlled by adjustment of the temperature of the carrier suspension and the solution of the catalytically active component. However, abrupt cooling of this suspension can be realized only with great difficulty, so that, after a certain pH value has been reached, the reaction continues for some time and the pH value raises further, which may be undesirable.

In the "injection" embodiment of this invention, the gradient of the increase of the hydroxyl ion concentration with time, as well as the absolute value of this increase, can be simply and completely controlled by a programmed coupling of the reading of the pH value of the suspension and the supply of the alkaline solution to be injected. In this injection embodiment of the process a lower temperature is possible and even sometimes preferred, which permits optimum adjustment for the precipitation time and the pH-value gradient. Thus, the present invention can be practiced wherein the alkaline solution can be injected into an agitated suspension at a temperature ranging from 0° to 100° C.

A. By In Situ Generation Of Hydroxyl Ions

Briefly stated, it has now been found according to this feature of this invention that when hydroxyl ions are produced homogeneously and gradually in situ in a solution of the desired metal compound, precipitation nuclei are formed substantially exclusively on the surface of the suspended, finely divided carrier material, with the resulting precipitate bound to such carrier material with appreciable energy. Homogeneous formation of hydroxyl ions implies that the hydroxyl ion concentration is not a function of the place in the solution, but is uniform throughout the solution so that, however small the volume of solution considered, the concentration of hydroxyl ions will always be equal to that in any other particular volume in the solution.

The condition for precipitation exclusively onto the carrier is to generate hydroxyl ions homogeneously in the solution at a rate that prevents exceeding of the solubility product above which nucleation of a pure precipitate is liable to occur. This also means that the migration of the still soluble precipitate, through the solution to the carrier surface has to be faster than or at least as fast as the generation of hydroxyl ions. The free energy and, hence, the solubility product of nuclei of a precipitating material are appreciably higher than the corresponding values for large precipitate particles, owing to the minute dimensions of the nuclei.

The rate at which the material to be precipitated is transported through the solution depends partly on the intensity with which the solution is agitated, and on the degree to which the solid carrier material is distributed through the suspension. Under the conditions mentioned above, the precipitate will form homogeneously over the entire surface of the carrier material. As the carrier materials used in practice have very large specific surface areas, the precipitate will be distributed homogeneously over a very large surface area. Since the above-mentioned nuclei are formed exclusively on the surface of the carrier material, and not elsewhere in the solution, undesirable development of nuclei into a coarse precipitate will not take place in the solution.

According to this embodiment of the invention, a supported at least inchoately magnetizable or catalytic material, in which the active material is deposited in finely divided form onto a carrier material, is prepared by suspending a finely divided carrier material in a solution containing at least one magnetizable or catalytic element and effecting a gradual, homogeneous, in situ generation of hydroxyl ions in the solution at such a rate that the increase in hydroxyl concentration is high enough to precipitate the active element onto the carrier, but too low to effect nucleation of pure precipitate in the solution, i.e. that the migration of the still soluble active element to the carrier is faster than, or equally fast as, the generation of hydroxyl ions in the solution, as a result of which the magnetizable or catalytic element is precipitated substantially exclusively onto the suspended carrier material as a hydroxide, oxide, or an insoluble (basic) salt, and subsequently separating the carrier material so loaded from the solution and subjecting it to a thermal treatment.

In carrying out the process, the loaded carrier may be separated from the solution by any conventional operation, such as filtration, decantation, centrifuging, etc. This simple separation treatment can be employed because the precipitation is so controlled as to take place on specific sites, i.e. only on the carrier and not in the bulk of the solution. Of course, drying and calcining the separated material may be done in accordance with any of the prior art techniques and at any desired temperature and for any desired length of time, e.g. between 100° C. and 150° C. for about 10 or 16 to 48 or perhaps 100 hours for the drying stage, and between 200° and 850° C. for 1 to 48 or more, e.g. 100, hours for a calcining stage.

Since the rate at which the material to be precipitated migrates through the liquid depends inter alia on the intensity with which the solution is agitated, and on the degree of distribution of the solid carrier material in the suspension, these two variables can be controlled within very wide limits. The desired result can further be chosen by controlling the above-mentioned variables. To ensure homogeneous and gradual formation of hydroxyl ions in the solution, the process according to the invention makes use of chemical reactions known in the art, e.g. homogeneous and gradual formation of hydroxyl ions by hydrolysis of urea present in the solution to ammonium carbamate, or ammonium carbonate. The hydrolysis of urea which is dissolved in the suspension ensures a homogeneous increase in the hydroxyl concentration; the rate at which the hydrolysis proceeds can easily be controlled by the temperature to which the suspension is heated. Instead of urea, derivatives of urea may be used, if so desired, or any other of the known reactants which will produce a gradual formation of hydroxyl ions, as e.g. formamide or acetamide.

If mixed oxides are to be prepared, one or several of the elements cobalt, nickel, manganese, copper, titanium, barium, calcium, magnesium, strontium, lead, zinc, tin, mercury, boron, or other elements, are precipitated onto the carrier material simultaneously with iron, or chromium, or other metal, e.g. a rare earth metal such as yttrium, lanthanum and samarium. Mixed crystals can thus be formed, such as iron-nickel crystals. If no mixed crystals are formed, the various elements may precipitate in succession onto the carrier, their sequence being governed by the relative solubilities of the respective hydroxides or salts. The elements needed can normally be introduced into the solution in the form of a simple, easily obtainable salt, such as a chloride, a sulphate or a nitrate. However, any soluble compound may be used. The desired ratio between the elements in the mixed oxides can sometimes be obtained by introducing the elements into the solution with the same concentration ratio, depending on the relative ratio and completeness of precipitation. The salt solutions in which the carrier material is suspended, and from which the catalytic or ferromagnetic material is precipitated by heating with simultaneous, prolonged and intensive stirring, need not be diluted too much to ensure a thorough distribution of fine precipitate particles onto the carrier material. Highly suited for the purpose are solutions with 5 to 15% by weight of metal ions of the required material. The amount of urea or like hydroxyl ion producing chemical present in the solution should be such that generally at the end of the conversion the pH value has established itself at about 6–7.5 or above. Normally a quantity equal to 1–10 times the theoretical quantity calculated relative to the quantity of active metal present in the solution, is sufficient.

If no mixed crystals are formed, i.e. if the precipitation yields a stratiform deposit, the compounds in the various layers can, in many cases should, be subsequently homogenized by diffusion, particularly where magnetic materials are to be produced. As the particles are extremely small, the distances over which diffusion has to be effected to ensure a homogeneous distribution of the ions are also small. This implies that a relatively mild thermal treatment of the reaction product already produces sufficient diffusion within the particles to ensure formation of the desired mixed oxides from the stratiform deposits of metal compounds. The temperature needed for the thermal treatment of the carrier material and the metal oxides deposited on it, is at any rate far below the sintering temperature of the components; for example at a heating period of 48 hours or shorter the temperature may be chosen in the range from 200° to 600°, preferably from 400° to 600° C. A very important point is that owing to the isolated location of the particles on the carrier material, thermal treatment causes homogenization, but no enlargement of the particles.

This embodiment of the invention is illustrated by Examples I to XXII.

B. By Injection Of An Alkaline Solution

The homogeneous and gradual increase of the hydroxyl ion concentration, according to this embodiment of the invention, can be effected alternatively by the controlled and gradual injection of an alkaline solution into the vigorously agitated suspension.

By "injecting" as used herein, there is meant that the alkaline solution and the suspension are brought into contact with one another, below the surface of said solution, without any other phase being present in the immediate vicinity. By this method the alkaline solution is extremely rapidly distributed throughout the suspension without surface tensions impeding the distribution, so that the hydroxyl ion concentration, while remaining homogeneous, can nonetheless gradually increase in the "body" of the aqueous medium described above.

Although in concept this method is surprisingly simple, it requires very accurate adaptation of the degree of agitation and the rate of injection to the total quantity of alkaline solution required to arrive at the final result. For instance, it is desirable that during the precipitation the average pH value of the suspension should not increase by more than 0.1 unit per minute, while the deviation from the average increase should not exceed 0.05 pH unit.

An advantage of the present process over the in situ method already described is the fact that the pH value can frequently be better controlled. The injection of the alkaline liquid can be stopped, if necessary, when the pH has reached a given value. Besides, the present embodiment improvement offers particular advantages in the case of industrial application of the process. Both the gradient of the increase of the hydroxyl ion concentration with time and the absolute values thereof can be simply and fully controlled by programmed coupling of the measured pH values of the suspension and the rate of injection of the alkaline solution. There are commercially available devices for monitoring solution pH and controlling the rate of addition of a liquid to the monitored solution in response to measured change in pH. According to the present method, it is even preferred sometimes to carry out the reaction at a somewhat lower temperature, in which case the time required for precipitation and the pH gradient can be optimally adjusted.

A preferred method of injection consists in feeding the alkaline solution through a thin tube extending below the surface of the agitated suspension and having an internal diameter sufficently small so that the turbulence within said agitated solution will not extend into the tube bore itself, which tube can be a capillary tube. The axis of the tube bore, at its exit end, should preferably be approximately transverse to the adjacent flow vector of the agitated solution suspension. To ensure the required extremely uniform supply of the alkaline solution, a gas-filled buffer vessel may be preferably fitted in the supply line ahead of the injection tube.

This injection embodiment of this invention is illustrated hereinafter by Examples XXIII to XXX. Some examples concern the preparation of materials consisting of iron oxide dispersed on silica. Other examples describe the preparation of a cobalt-nickel alloy, which is deposited on silica in the form of small particles. Since the maximum concentration of a cobalt salt solution as a function of the pH value passes through a minimum it is desirable if the element cobalt is present in the solution, to adjust the pH value at the start of the precipitation so that it will not exceed 7.5 at the end of the precipitation. The advantages of the injection process are clearly apparent especially for cobalt, but also for nickel.

Formation of mixed crystals or of sequential deposition of crystals can be obtained, as described above in connection with the in situ embodiment, and similar the salt solutions and concentrations may be used.

This embodiment of the invention is illustrated by Examples XXIII to XXX.

DESCRIPTION OF OTHER PROCESSES FOR THE PREPARATION OF THE PRODUCT OF THIS INVENTION

The homogeneous supported metallic particle composition of this invention can also be achieved by other process techniques which principally depend upon a method of inducing homogeneous deposition of the insoluble metal compound by means other than increasing the hydroxyl ion concentration of the body of the aqueous medium containing the suspended supporting material.

C. By Homogeneous Oxidation To A Higher Valence State

According to another embodiment of this process of the invention, which is also separately disclosed and claimed in present application Ser. No. 23,032, filed Mar. 26, 1970, the iron and, if so desired, one, or several, other metals also present in the solution in bivalent form and in an atomic quantity not larger than half that of the iron, are coprecipitated, with simultaneous agitation, by gradual and homogeneous conversion of part (e.g. at least about two-thirds) of the bivalent iron ions to the trivalent forms, at a pH adjusted at a value between about 2 and 6.5, preferably between about 4 and about 6.5 and under controlled temperature conditions, said conversion proceeding at an average rate of at most 0.3 g. atoms per liter of solution per hour. The precipitate is subsequently separated from the solution, washed and dried, whereupon the resulting material is subjected to a further thermal treatment, should this be necessary.

Said further thermal treatment may consist in calcination, with or without complete or partial reduction of the precipitated material.

By "controlled temperature conditions" is meant here that a set temperature value, or a variation in temperature with time, is adjusted to the desired precipitation conditions. By "homogeneous" is further meant that the concentration of bivalent and trivalent ions is not a function of the place in the solution, not even if arbitrarily small unit volumes are considered; by "gradual" is understood that the increase in concentration from bivalent to trivalent ions per unit time is such that the precipitate is formed on the surface of precipitation nuclei that have already formed and not in the body of the solution.

According to the process of the present invention the iron can be converted from the bivalent to the trivalent form having nitrate ions present in the solution preferably nitrate ions of ammonium nitrate — with use of a temperature higher than room temperature (e.g. above about 18°-20° C.). It should be explicity stated, however, that the invention also covers the use of oxidation agents other than nitrates, such as ions of halogen oxyacids or peroxides. In general, oxidation agents may be employed in this process provided (1) they have the oxidation potential necessary to convert the ferrous ions to the ferric ions and (2) they do not themselves form a precipitatory salt with the metal in the solution being treated.

When nitrate ions are used as the oxidant, the following reaction may be initiated above room temperature:

$$Fe^{2+} + NO_3^- + 4H^+ \rightarrow 3Fe^{3+} + NO + 2H_2O$$

The ferric ions thereby homogeneously and gradually formed in the solution now react with bivalent metal ions ($M^{2+}$) according to the reaction:

$$M^{2+} + 2Fe^{3+} + 4H_2O \rightarrow MO.Fe_2O_3 + 8H^+$$

A suitable bivalent metal for use in such process can be the ferrous ion itself; when this is used $FeO.Fe_2O_3 = Fe_3O_4$ (magnetite) precipitates. This action is also covered by the term coprecipitation as used in this application.

In view of the resulting desired magnetic properties it is preferred to coprecipitate other non-ferrous bivalent ions together with the iron, such as nickel, cobalt, zinc, manganese, copper, magnesium and barium. The precipitation is then continued under controlled temperature conditions until the required quantity of the metal ions present has been precipitated. The chemical composition of the coprecipitate to be prepared depends on the metals present besides iron, in the initial solution, and on their molecular ratios, which, in turn, may be selected according to the ultimate magnetic properties desired.

As stated above, an important condition is that during the precipitation the pH must be kept at a value between about 2 and 6.5, preferably between about 4 and about 6.5 for which purpose the hydrogen ions released in the reaction may have to be neutralized. This may be accomplished by injecting an alkaline solution of soda, sodium bicarbonate, ammonia or similar inorganic bases into the solution. If so desired, the pH value can be kept accurately constant by controlling the same by means of a pH meter. By the term "injecting" there is again meant herein contacting the alkaline solution with the reacting solution with no other phase being in the immediate vicinity.

Another possibility is to add urea to the solution, either before or during the precipitation. Due to the gradual hydrolysis of the urea to ammonium carbonate, carbonate ions are thus introduced into the solution and these are effective to bind the hydrogen ions according to the following equation:

$$(NH_2)_2CO + 2H_2O \rightarrow (NH_4)_2CO_3 \xrightarrow{+H^+} H_2O + CO_2 + 2NH_4^+$$

If at the start of the precipitation the pH must be exactly set at the desired value, that is preferably done by means of nitric acid. Said acid does not introduce any "foreign" elements into the permanently magnetizable material, i.e. no more than do the ammonium nitrate, urea or ammonia solution otherwise used in the process.

This embodiment of the invention is illustrated by Examples XLVIII to LIII.

D. By Homogeneous Reduction To A Lower Valence State

Still another means of practicing this invention, and obtaining compositions as claimed herein, includes the procedure of reducing the valency of the ions of the element to be deposition precipitated, by means of a reducing agent, introduced by techniques comparable to the "homogeneous" techniques described above in connection with other embodiments of the invention. Essentially, in the embodiment now under discussion, the deposition precipitation is achieved in a way other than by gradually changing the hydroxyl ion concentration.

This approach to the production of the compositions provided by this embodiment of the invention is based on the recognition that precipitation can take place at a pH at a value required for a proper adhesion, if use is made of a known precipitation method utilizing the difference in solubility which — complexed or non-complexed — ions of the elements to be precipitated possess in correspondence to their difference in valency. If use is made of this phenomenon in this method of precipitation, application of the process according to the invention requires that the ratio of the rate with which the compound to be precipitated migrates to the surface of the carrier material to the rate at which said compound is generated in the solution be adjusted in such a way that the concentration of the poorly soluble compound in the solution does not exceed the value required for the formation of stable and isolated nuclei in the solution. Consequently, according to the process of the invention — to be described in more detail afterwards — precipitation methods known in themselves are applied in a special way. Mention may be made here of such known precipitations as those of copper, silver, molybdenum, tungsten, platinum and osmium — as compounds or as elements — by means of reduction agents such as hydrazine, hydroxylamine, formaldehyde, glucose, cane sugar, or polyvalent alcohols.

Essential to the process according to this embodiment of the present invention is that, if the valencies of the ions of the element to be precipitated are changed at preset pH values and in the presence of a suspended carrier material, this should take place homogeneously and gradually, and under controlled conditions, so as to ensure that extremely small particles will be precipitated. By "homogeneously" is understood here that the concentration of the ions of the old and new valency does not vary with the location in the solution, not even if arbitrarily small units of volume are considered; by "gradually" is understood that the increase in concentration per unit time of ions from the old to the new valency is smaller than the rate at which the compound to be precipitated migrates through the solution to the surface of the carrier material.

By the process according to this embodiment of the invention this is achieved if — with such agitation that the concentration of ions of the old and of the new valency will hardly be a function of the location in the solution — the amount of reducing agent present in the solution at any moment, and the temperature, or the change of temperature with time, are so controlled that — with adjustment of the pH to a value suitable for the combination of the carrier material and the compound to be precipitated — precipitation of a compound takes place not in the bulk of the solution, but on the surface of the carrier suspended in the solution, and at a gradual rate.

All of the reducing agent may be added to the solution at the beginning of the precipitation process, but under certain conditions it is preferable to "inject" controlled quantities of the reducing agent into the solution. By "injecting" is again understood here that the reducing agent and the solution (suspension) are brought into contact with each other without any other phase being present in the immediate vicinity. In this way an extremely fast distribution of the reducing agent throughout the agitated solution (suspension) is ensured without the distribution being opposed by surface tensions, so that the ions of different valencies remain homogeneously distributed during a gradual change. By "controlled quantities" is understood here that the quantity of reducing agent injected per unit time must be accurately adapted to the reaction conditions that are required in order to obtain a catalyst mass of the desired structure consisting of small isolated catalytically active particles on a carrier. With preservation of the basic principle of the invention, these reaction conditions, taken in an absolute sense, differ from one element to another.

According to the practice of this variant of the invention it is required that the amount of the reduced metal-ions per unit volume and per unit time generated during precipitation remains limited. This is accomplished by regulating either the temperature or the injection of a rapidly reducing agent in such way that the concentration of the reduced compound increases by no more than 0.01 grammol per liter of the suspension per minute. It is stressed that the concentration of the reduced compound pertains here to both the atoms still dissolved and the atoms already precipitated on the supporting material. To avoid local supersaturations it is required that the concentration of the reduced compound does not deviate locally more than 0.01 grammol per liter from the mean concentration.

Substances to which the present process may be successfully applied with reduction of the valency of metal ions at preset pH values are, for example, copper, tungsten, molybdenum, and the noble metals, including silver.

If the precipitation is carried out under controlled conditions of temperature with a reducing agent already present in the solution, many organic reducing agents, more particularly aldehydes, monosaccharides, such as aldoses and ketoses, disaccharides, such as maltose, lactose and dextrose, or alcohols may be used, the temperature being adjusted to a value ranging between 40° C. and 100° C. Other compounds that may be used as reducing agents are resorcinol, pyrogallol, gallotannic acid, formic acid, cyclohexanone, cyclopropanoles and hydroquinone. Copper, palladium and platinum, for example, can be excellently treated with a monosaccharide like glucose. Very easily reducible compounds, such as those of hexavalent osmium, can be successfully reduced with an alcohol. The desired reaction time is controlled by adjusting the temperature of the agitated solution (suspension). With a mild reducing agent, such as glucose, and in the temperature range between 40° C. and 100° C., said time can be varied from a practically unlimited period to 10 minutes; at 50° C. the time required is approximately 72 hours.

If rapidly reducing agents, such as hydrazine, hydroxylamine or compounds thereof are used, these can best be injected into the solution in controlled quantities at temperatures between 0° C. and 100° C. Examples for this process are copper, silver, tungsten and molybdenum. However, usually a choice can be made between the reaction of a reducing agent present in the solution under controlled conditions of temperature and the injection of a reducing agent in controlled quantities.

For the proper adhesion of a precipitated metal ion or metal atom to the rather universally applicable carrier silica, the pH range from 6 to 8 is very suitable. At a pH above 5, the silanol groups in the surface of hydrated silica begin to show a marked degree of ionization, which takes place according to the reaction:

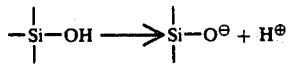

Positively charged ions or conglomerates of precipitated atoms are strongly bound to such a negatively charged silica surface. Although the ionization of the silanol groups at the surface increases continuously with increasing pH values, there is an upper limit of pH values above which suitable catalyst can no longer be produced. In fact, at pH values higher than approximately 8, the silica dissolves to an appreciable extent. The temporarily dissolved silica then precipitates again with the catalytically active component and encloses the latter to a larger or smaller extent. Consequently, the part accessible to the reactants has a rather low activity. With other usual carrier materials such as $Al_2O_3$, $TiO_2$, $ThO_2$ or clays i.e. silicates, the electrostatic surface charge varies in a similar manner with the pH of the solution. The invention is therefore not limited to the use of $SiO_2$ as a carrier material.

According to the invention, compounds of the inchoately magnetic or catalytically active element which are soluble within said pH range are used as starting materials. Besides simple salts, water soluble complexes can in many cases be successfully used, such as, for example, ethylene diamine, ethylene tetramine, and especially tartrate complexes and ammonia complexes. For instance, bivalent copper forms a soluble complex with tartrate ions at a pH value above 6, preferably of 7 to 8.5. This complex formation is not possible with monovalent copper. Consequently, cuprous oxide will precipitate if a cupric tartrate complex is reduced at a pH value higher than 6. A monosaccharide like glucose may be used as reducing agent. At room temperature and a pH value high than 6, preferably of 7 to 8.5, no appreciable reduction will take place. When the suspension of the carrier material in a solution of cupric tartrate and glucose is heated to a temperature exceeding 40° C., the reduction in the suspension sets in. Excellent results have also been obtained by injecting a solution of a hydroxyl ammonium salt, such as hydroxylamine hydrochloride, into a suspension of the carrier material in a cupric tartrate solution at a pH value higher than 6 and at temperatures up to 100° C.

Noble metals such as palladium can also be precipitated via reduction of a tartrate complex. In this case the precipitation can be carried out at a pH higher than 6, preferably around 7, and at a temperature up to 100° C. At such a pH value the adhesion of the palladium to a silica carrier is very good. Unlike copper ions, which are only reduced to the monovalent form, palladium is reduced to the metal by glucose.

Ammonia complexes that are soluble within the above-mentioned pH range, as are a large number of metal ions, may also be used. Examples of such metal ions are those of silver, palladium and platinum. By reducing ammonia complexes of ions of said metals, the metal can be precipitated from the solution. A typical example is the preparation of a platinum catalyst via reduction of ammonia complexes. By way of example we may mention the preparation of a silver catalyst by injection of a hydrazine solution at a pH value of approximately 8.

Yet another variant of the process according to the invention is the reduction of an oxyacid, whereby metal ions are converted to insoluble, whether or not hydrated oxides. Examples of this variant are the oxyacids of hexavalent chromium and molybdenum. These compounds form soluble salts of the oxyacids $H_2CrO_4$ $H_2MoO_4$ with ammonium or alkali metal ions in alkaline solutions. If the pH value of such a molybdate solution is decreased, $MoO_3$ precipitates, provided the initial concentration was sufficiently high. However, since the solubility of $MoO_3$ is rather high, a relatively large quantity of molybdenum remains in the solution. Upon a further decrease in pH, the solubility of molybdenum increases considerably again. It is therefore difficult to precipitate molybdenum oxide onto a carrier material such as silica by varying the pH value, i.e. by varying the pH within the above stated range of about 2 to 6.5. This can be explained as due to the fact that within such pH range the silica supporting particles will have a negative electro-static charge, and the $MoO_3$ anion also carries a negative electro-static charge. Therefore, under the conditions of a pH of between about 2 and 6.5, the carrier particles will not present a nucleating surface to the precipitating ions or nuclei and deposition precipitation as contemplated by this invention cannot occur. However, the objective of the invention can be realized by still further reduction of the pH level below 2, i.e., to about 0.5, because at this still lower pH the silica particles will now have a positive electro-static charge. Thus, a nucleating surface is then available for the still negatively charged $MoO_3$ anions, and under these conditions full compliance with all the requirements of the process of this invention is achieved.

In contrast to anions of hexavalent chromium and molybdenum, the oxide of trivalent or pentavalent molybdenum are poorly soluble within a wide range of high pH values, e.g., above about 5. Therefore, the requirement for deposition precipitation according to this invention at preset pH values higher than about 6, is most easily satisfied by homogeneously reducing the soluble hexavalent chromate or hexavalent molybdate ions. Injection of hydrazine into a suspension of the carrier material in a chromate or molybdate solution permits the required deposition precipitation. The extremely finely divided molybdenum pentoxide deposited particles will as a rule, be thereafter rapidly oxidized in air to molybdenum (VI) trioxide, which is a form generally used in many catalytic processes.

This embodiment of the invention is illustrated by Examples XXXI to XXXV.

E. By Homogeneous Decomplexation To An Insoluble Metal Compound

According to still another embodiment of the process of the present invention, the at least inchoately magnetic or catalytically active component can be precipitated from a homogeneous solution onto a carrier material suspended in this solution, by allowing an oxidation agent to react, within the predetermined limits of the pH value of the solution, and under controlled temperature conditions, with a compound forming a soluble complex with the desired metal atoms, so that precipitation of a compound of the active element will take place exclusively on the suspended carrier material. An important feature of the present process is that it offers the possibility of so adjusting the pH value of the solution during the precipitation that the electro-static charge of the surface of the carrier is able to bind the precipitating active metal and the magnetically or catalytically active component precipitates in a form in which it adheres to the carrier.

In the process according to the present variant, the metal ions are reacted with an oxidizable compound to be converted into a soluble complex. This complex should be so stable that the complexed metal ions are thus soluble within a range of pH values at which the non-complexed ions will precipitate as salts, hydroxides or hydrated oxides.

The pH value of the solution of the complexed ions is adjusted to the required value, and the carrier material is suspended in the solution. Thereafter, the complexing compound is oxidized homogeneously in the agitated solution, under controlled temperature conditions, leading to decomplexation of the metal ions during which step the released metal ions will form a deposited precipitate on the carrier surface. "Controlled temperature conditions" as used here is meant to express that a set value of the temperature, or the variation of temperature with time, is accurately adjusted to the precipitation conditions desired.

The practice of this embodiment of the invention covers, generally, all oxidizable compounds that form soluble complexes with the desired active metal ions, for instance nitrilo triacetic acid, imino diacetic acid, bis-2-amino-ethyl ether-N,N,N',N' tetracetic acid, amino alcohols, such as amino ethyl alcohol, aminoacids, such as glycine and glutamic acid, and diamines, such as ethylene diamine and propylene diamine. Examples illustrating the same appear hereinafter, in which ethylene diamino tetracetic acid (EDTA, tradename KOMPLEXON) is used as the complexing agent. This compound forms a stable complex with practically any metal ion, and can be used almost universally.

The above-mentioned finely divided supporting materials including activated carbon can be used. The complexing agent is of course, oxidized to compounds that are not capable of forming new soluble complexes with the metals to be precipitated. The oxidation can be effected with a large number of compounds. Hydrogen peroxide and sodium hypochlorite are mentioned in the Examples hereinafter. Further oxidizing agents may be exemplified by halogenoxyacids, nitrous acid, nitric acid, permanganate and chromate ions. The oxidation of the usual organic complexing compounds proceeds via free radical reactions. Therefore, the oxidation can be carried out in two ways:

1. The oxidant may be present in the agitated suspension in such an amount as will suffice for the complete oxidation of the complexing agent under controlled temperature conditions;
2. Controlled amounts of the oxidation agent can be injected into a suspension of the carrier material heated at a temperature between 40° and 100° C.

In the first case the initiation reaction in which the free radicals are formed proceeds relatively slowly. The amount of reagent needed for the oxidation can then be added to the suspension without a perceptible reaction taking place. Only after a certain incubation time — which can be set through temperature control — will the number of free radicals formed via the chain reactions become sufficiently high to produce a reaction taking place homogeneously throughout the solution.

In the second oxidation possibility mentioned above, the initial temperature is taken so high that the initiation, and hence the oxidation, proceeds quickly. Now, the requirement for a homogeneous and gradual oxidation is effected by injecting a controlled quantity of the oxidation agent into the agitated suspension. The terms "homogeneous", "gradual" and "injection" have here again the same means as described above.

The degree to which precipitating or already precipitated active metal compounds influence the initiation reaction is of much consequence for the practical realization of the process of the invention. For instance, presence of trivalent antimony will hardly affect the initiation; the oxidation of this antimony complex can therefore be effected under agitation by protracted heating of the suspension with an excess amount of oxidation agent added to it in a vessel.

The oxidation of an iron complex, on the other hand, proceeds much too fast unless controlled. In preparing an iron catalyst or magnetic material the process of the invention in the present embodiment, starts from a trivalent iron salt, and preferably uses a pH value about 4. If the complexing agent used is ethylene diamino tetracetic acid, the oxidation agent should, in the present embodiment, be injected as hydrogen peroxide in a controlled quantity, and a temperature of up to 100° C. may be used.

Silver atoms or silver ions, on the other hand, have a moderate catalytic effect on the decomposition of the complex by, e.g., hydrogen peroxide. Therefore it is possible, at a pH of 7 or over, to make use of a simple silver salt and, for instance, ethylene diamino tetracetic acid as the complexing agent, and to have the oxidation agent, for instance hydrogen peroxide, present in the solution of the silver complex, without the oxidation proceeding at a perceptible rate, unless the temperature is over 60° C.

If the precipitating metal ion strongly promotes the decomposition of the oxidation agent, the procedure employed should make allowance for this. An example in point is furnished by copper, which strongly promotes the decomposition of oxidation agents. According to the process of this variant of the invention, copper catalysts can be prepared by using, at a pH value higher than 5, a simple copper salt if the complexing agent is, for instance, ethylene diamino tetracetic acid, and the oxidation agent is either sodium hypochlorite or hydrogen peroxide. At temperatures between 0° C. and 30° C., copper will already precipitate onto the carrier matieral in extremely fine division, which itself results in the formation of a highly active catalyst for the decomposition of the oxidation agent. Such decomposition of the oxidation agent will now proceed extremely fast, via reactions in which the complexing agent is no longer attacked. Therefore, it is not practicable simply to mix an excess amount of oxidation agent with the suspension of the carrier in a copper complex solution, since after the initiation has proceeded sufficiently far, the catalyzed oxidation will take place in, say, 30 seconds, during which time the temperature may rise to 70° to 80° C. The presence at this temperature of the active decomposition catalyst thus formed causes the remainder of the oxidation agent to give off its oxygen almost instantaneously. Notably if hydrogen peroxide is used, this causes a very rapid gas evolution, and much of the suspension can, in this case, be expelled from the vessel.

In view of this condition, it is therefore preferable to effect this reaction in a thin layer of the suspension. This can be realized, for instance, by using a liquid cyclone for rapidly mixing the oxidation agent and the suspension of the carrier in the complex solution, and then rapidly heating the mixture in a film reactor. The oxidation now takes place homogeneously in a thin film of the suspension, so that the gas evolve can escape without difficulty. It is also possible to react the mixture of oxidation agent and suspension in a cyclone, with the suspension flowing down along the wall of the cyclone.

This variant of the invention is illustrated Examples XL to XLII.

F. Processes Involving In Situ Generation Of The Supporting Material

It is also possible to practice this invention by a process in which the supporting or carrier material is generated in situ within the solution containing the dissolved metallic substance to be precipitation deposited onto the carrier particles. According to this embodiment of the invention (the process of which is separately claimed in copending Application Ser. No. 577, filed Jan. 5, 1970) now U.S. Pat. No. 3,654,161, issued Apr. 4, 1972, a solution of the metallic compound is prepared in water, at a pH of less than 7. There is separately prepared in an alkaline aqueous solution a solution of the material from which the supporting component is to be derived, for instance, an alkaline solution of silica. This alkaline solution of silica is then "injected" into the acidic metallic compound solution, with the result that there is then formed a highly dispersed suspension of precipitated silicon dioxide of fine particle size.

Thereafter, the pH of the suspension is gradually raised to a level at which deposition precipitation of the dissolved metal compound occurs, with nucleation thereof on the surface of the above-prepared silicon dioxide particles.

A composition resulting from this process, as illustrated in Examples XXXVII and XXXIX hereinafter will also have the characteristics generally defined for the compositions of matter provided by this invention.

The advantage of this embodiment of the invention is that the carrier material can be obtained in the suspension in a more uniformly finely divided condition. Other finely divided silica preparations known to the art, such as those obtained by flame hydrolysis of silicon tetrachloride, exhibit some degree of particle agglomeration which cannot be reduced indefinitely in the suspension in the solution of the metallic material is to be precipitated. Agglomerates of such carrier particles may have sizes ranging between about 1000 A units up to 5000 A, and will always be present in such a suspension. This embodiment of this invention just disclosed, involving in situ generation of the silica carrier material, substantially avoids the presence of such agglomerates.

This embodiment of the invention is especially advantageous for the preparation of magnetic compositions provided by this invention. As mentioned in Example XXXIX hereinafter, fabrication of magnetic tapes using the magnetic powders provided by the process involving in situ generation of the carrier material yield exceptionally smooth and wear-resistant layers on the tape — a result believed to be attributable to the more uniform small particle size of the carrier material, and the freedom therein of relatively large agglomerated carrier particles. This is, clearly, a highly desirable result in magnetic tape products.

This embodiment of the invention is illustrated by Examples XXXVII to XXXIX.

DESCRIPTION OF MAGNETIC COMPOSITION OF PRODUCTS PROVIDED BY THIS INVENTION

In one of its embodiments, the present invention provides compositions of matter useful for the magnetic storage and reproduction of data, e.g., on sound or video-recorder tape, and on tapes, sheets, records or discs for computers, and also to form bodies molded of magnetizable materials with, if necessary, very accurately specified dimensions, which can either be used as media for high magnetic permeability (and hence a low remanence), or as permanent magnets.

At the present time, acicular gamma ferric oxide crystals are used almost exclusively as the magnetic components on sound, video or computer recording tapes. The magnetic characteristics are, in turn, derived almost exclusively from the shape anisotropy of the gamma ferric oxide crystals.

By contrast, the magnetizable compositions provided by the present invention differ from such prior art by providing a means for making and utilizing magnetizable particles of, generally, much smaller dimensions, and of a non-acicular form, and wherein the magnetic characteristics are at least importantly determined by the magneto-crystalline energy of the material, rather than from the shape anisotropy of acicular particles.

In order to fully appreciate the somewhat remarkable advantages of this invention, some comment seems appropriate as to the demands upon and requirements for magnetic impulse recording devices.

In audio and video recording it is very important that the magnetic tape has a high magnetic moment per unit volume in order to afford satisfactory recording and play back of signals with a small wave length (about $3\mu$ or less). This is due to the fact that a reduction in tape speed, which is generally desired because it permits relatively simple and, hence, inexpensive apparatus, gives rise to short wave length signals. On the other hand, in most computer applications the tape is magnetized in either one of two directions; whereas the absolute value of the degree of magnetization, and hence the magnetic moment per unit volume, is itself of less importance.

As the permissable degree of loading of the tape with solid materials is limited, a magnetic moment per unit volume of the tape substantially larger than that of the presently conventional iron oxide tapes can only be obtained by using ferromagnetic materials displaying a higher intrinsic magnetization. Such materials are, for instance, iron or cobalt alloys. One of the objects of this invention is to provide a process for preparing powders containing, e.g., iron or cobalt alloys that have the desirable high magnetization required for improved magnetic tapes.

For all such applications the magnetic particles should be small. The goals desired for the size of the magnetic particles stem from two origins, viz.: first, the particles should have dimensions smaller than the gap width of the recording and reproducing heads, which are of the order of 0.75 or more (this condition is needed to arrive at a low background noise of the tape), and, secondly, the magnetic particles should also be generally of at most within the single domain size range in order to display the high coercive force required for most effective magnetic recording.

A principal difficulty in the use of acicular gamma ferric oxide particles in magnetic tapes is their tendency to form magnetic conglomerate bodies when an external orientating magnetic field is imposed upon the particles in the still, at least, semi-fluid binder on the tape, whereby a number of the needle-like acicular magnetic particles become associated together, forming, in effect, a much larger single magnetic unit on the tape. When such conglomerates form, with dimensions significantly larger than the dimension of the gap in the recording head, significant background structure noise develops in the recorded impulse on the tape. For instance, with typical magnetic recording head gaps of the order of one micron, it is sometimes observed with conventional gamma iron oxide magnetic tapes that the particles have become associated together into a single magnet comglomerate of a length as large as 10 microns. The result of such a situation is that the desired linear relationship between the induced magnetic moment and the intensity of the sound or data signal to be recorded deteriorates and gives rise to background noise.

Accordingly, one of the objects of this invention, and one of its achievements, is the provision of improved magnetic compositions which enable the development of magnetic impulse record devices such as tapes, sheets, discs and the like, which have highly advantageous properties as compared to those produced by the present state of the art.

The magnetizable compositions of matter provided by this invention are essentially composed of a very finely divided, dimensionally individual, non-acicular particles of at least one permanently magnetizable metallic substance which has been substantially homogeneously deposited on a finely divided particulate inorganic thermally stable and generally at most weakly magnetizable supporting carrier material. In such compositions, the metallic substance may be any compound(s) of the metal(s) which will exhibit ferromagnetism, or the reduced free metal(s) thereof, and which composition will exhibit magnetic remanence and coercive force characteristics over temperatures ranging from ambient temperatures up to about 100° C. In general, these compositions contain at least one metal from Group VIII of the Periodic Table. Further, the form of the particles of the metallic substance deposited in the composition will be such that the same are at least substantially less than the single domain particle size range for the material and particle shape involved. These particles will further demonstrate magnetocrystalline anisotropy which can generally be observed as a strongly temperature dependent characteristic. Further, the magnetic anisotropy energies of the particles of the compositions provided by this invention will be greater than the thermal energy (kT) thereof over the above-mentioned temperature range.

In part, the invention also permits obtaining very small magnetic metal(s) particles by the reduction of (also) small metal oxide particles which have been prepared by deposition percipitation on the non-magnetic supporting or carrier material. Because of the stable spaced dimensionally independent placement of the metal oxide particles on the carrier particles, it is possible to reduce such oxides to the free metal without sintering agglomeration thereof.

The characteristic particulate compositions having magnetic characteristics as provided by this invention may, then, be generally defined as composed of the finely divided supporting material having adhered to the surface thereof, homogeneously distributed, discrete, dimensionally independent, non-acicular particles of a permanently magnetizable material. It is again emphasized that by this statement it is meant that the said particles of the permanently magnetizable material are dimensionally separate and distinct from each other, being in at least substantial part spaced from each other, and "dimensionally independent" in this sense. As stated, these particles are also non-acicular in that their shape is not characterized as having one dimension significantly greater than its dimensions thereof in planes perpendicular to said one dimension. To the contrary, the supported particles obtained by this invention are generally more or less substantially symmetrical in planes approximately parallel to the adjacent supporting surface, while the dimension of the particle normal to said planes is at most about equal to said dimensions parallel to said surface.

It will be appreciated that if, by contrast, in accordance with the practice of other processes prior to this invention, there is formed a composition of acicular particles on a supporting material, the major axis of such acicular crystals will generally be oriented more or less perpendicularly to the surface of the supporting material, and such dimension will generally be longer than the dimensions of such crystals in planes parallel to said surface by effect or of at least about 2 and up to even several orders of magnitude greater than that.

It is somewhat surprising that the small non-acicular supported magnetizable particles of the composition of this invention exhibit high coercive force and remanence characteristics at normal temperatures in the range of 0° C. to 100° C. because, by contrast, comparable unsupported isolated iron or iron-cobalt particles of similar non-acicular shape do not exhibit such characteristics. This can be seen from, for instance, data published by E. P. Wohlfarth, Advances In Physics, 8, 87 [at III] (1959), and E. F. Kneller et al., J. Applied Physics, 34, 656 (1963). These publications show that as the particle sizes of unsupported isolated ferromagnetic materials are reduced to smaller and smaller dimensions, it should be expected that the materials become paramagnetic, inasmuch as the remanence and coercive force characteristics thereof decrease rapidly to zero with particle size reduction. Similarly, in a publication by the present inventor reporting certain measurements observed of the magnetic characteristics of small nickel particles which were obtained by precipitation from a homogeneous solution on a supporting material suspended in the solution showed that such material exhibited only paramagnetic or superparamagnetic behavior at temperatures above about 150° K. See Geus et al. J. Cat. 6, 108–136 (1966).

However, the particles provided by this invention do possess the characteristics of exhibiting magnetocrystalline anisotropy in planes parallel to the adjacent surface of the supporting material. This characteristic may be present because of the difference between the crystallographic symmetry of a free unsupported particle of very small dimension and the asymmetry of very small particles which are adhered to the supporting material surface. It is believed that when the insoluble metal compound is formed on the nucleating surface by the process of this invention, the crystalline particles do not form with the development of symmetrical crystal structures. The crystal growth is believed to be asymmetrically induced upon the supporting surface (whereas such small particle crystals would tend to have symmetrical crystal development if formed in the solution phase. The large magnetic anisotropy of the crystals of the metallic component which are thus located on the surface layer of the supporting particle (as compared to those in the interior of the particle) can be observed only if the external symmetry of the metallic particle deviates from that of the normal crystallographic lattice of the metallic material of which such particles are composed.

Thus, whereas this invention utilizes non-acicular particles of such a small size that in many cases the comparably sized free, unsupported particles would have a nearly zero coercive force, because the present metallic particles are thus deposited and held on the supporting material, the coercive force thereof not only remains of useful value, but is substantially higher than anything that might be expected from the magnetic characteristics of the comparable isolated, unsupported particles.

These greatly enhanced magnetic characteristics for the supported compositions of this invention are believed to result, at least in part, from the aforementioned transition boundary layer between the metallic particle and the supporting particle.

This transition boundary layer is also considered to be a most important feature for the strong adherence of the insoluble metal compound particle to the supporting material. It is believed that the significant energy which holds the particle to the support is developed through this intercrystalline or mixed crystalline transition boundary layer.

The formation of the transition boundary layer is further understood to result from the nucleation and deposition precipitation of the crystals of the insoluble metal compound on the surface of the supporting material. The existence of such a layer is indicated by experiments in which it is attempted to dissolve the supporting material away from the supported particle. For instance, attempts to dissolve the silica support away from the reduced iron cobalt supported particles will remove, for instance, only between about 5% to about 50% of the total silicon content present. The undissolvable silica retained with the metallic particles is believed to be that portion of the support which is intimately associated with the above-mentioned boundary layer. If crystal formation and growth were, instead, to occur in the solution and attachment of the resulting insoluble metal compound crystal onto the support was the result of a mere coincidence of mechanical juxtaposition of the two materials, the combined effects observed in the practice of this invention, e.g., (a) the unexpectedly high magnetocrystalline anisotropy and coercive force properties, and (b) the inability wholly to remove the supporting material by dissolution, would be absent.

It is a further feature of this invention that the magnetizable metal compositions herein provided may be passivated with almost complete preservation of their magnetic characteristics. By the term "passivation", as used herein, it is to be understood that the treated powders no longer show any activity towards air and that, as far as possible, they also have no catalytic activity towards the plastic material, in which they may be subsequently incorporated, as might be the case with an untreated metal powder.

Passivation of the metallic powders provided by this invention may be obtained by treating the same with an inert gas containing at most about 0.2% oxygen, or an inert gas containing at most about 2% of nitrous oxide, or a combination of such gas mixtures at temperatures in the range from about 0° C. to about 100° C. for a period of time at least about 20 hours or so. When the metal powders are treated in this way, it is found that they retain their magnetic properties practically unchanged while displaying neither any unwanted oxidation, nor pyrophoric characteristics on exposure to air. Nor do they retain any significant catalytic activity of the metal towards the plastic materials used in the formation of tapes, sheets, wires or other shaped objects in their ultimate use as magnetic components.

DESCRIPTION OF CATALYTICALLY USEFUL PRODUCTS PROVIDED BY THIS INVENTION

In those embodiments of this invention wherein a catalytically active material is provided, the compositions are, again, distinguished by having rather large surface areas for the catalytic reactive material. As is well known, the catalytic activity of a catalyst is normally proportional to the specific surface area of the catalytically active materials. In catalytic reactions, the specific surface area of the solid catalyst directly affects, among other things, the size of the reactor which is used, or, alternatively, the amount of the catalyst which is required for a given activity. It is, accordingly, important to prepare catalysts which have a large surface for the catalytically active material.

To achieve this object of the invention, it is, accordingly, essential that:
1. The catalytically active material be distributed over the carrier material in a very finely divided form. Generally speaking, for commercial use, the diameter of the catalytically active particles should preferably be between 10 and 50 Å;
2. The active particles be homogeneously distributed over the surface of the carrier. Homogeneous distribution means that the distribution or coverage of the catalyst particles over the surface of the carrier is uniform. This is important because agglomerates of catalyst particles quickly cake together upon heating with the result that the specific surface area of the catalyst particles is considerably decreased; and
3. The carrier material be highly loaded with catalytically active material.

While, as a rule, in past practices, thermostable materials such as silicon dioxide, aluminum oxide, titanium oxide, and the like have been used as carrier materials for the catalytic particles, the methods of forming the catalytic composition have been different from that employed according to the present invention.

For instance a common method for distributing the catalytically active material over the carrier surface consists of impregnating the carrier material with a solution, preferably a dissolved salt, e.g. a nitrate, of the desired catalytically active material, and, subsequently, driving-off the solvent by drying and thereafter calcining the mass, which results in the salt absorbed by the carrier material being converted into the metal oxide. If the catalyst is to be present on the carrier in the metal form the metal oxide can be reduced by heating in a hydrogen flow or other reducing gases. One major disadvantage of this procedure is that when the mass is being dried, the dissolved salts migrate in the solution to where the evaporation rate of the solvent is highest and therefore, form undesirable agglomerates of the active material in those places. This happens, inter alia, at the end of the pores of the carrier particles.

In German Patent Specification No. 740,634 it has been suggested to overcome such difficulties by causing the active material to adhere to the carrier surface in the form of an insoluble compound before the mass is dried. To this end the carrier material is impregnated with a solution of a metal salt and a nitrogen-containing derivative of carbonic acid, e.g. urea. The impregnated carrier mass, with as much solution thereon as will adhere thereto is heated, during which heating an insoluble metal compound forms from the adhering solution; the temperature of the carrier material is then gradually increased to the point where the urea present decomposes. Unlike dissolved salts, as noted above, the insoluble particles obtained do not move during the drying and evaporation step. Consequently, the process of the German patent reduces agglomerization of the active particles. However, the process does not obtain extremely small finely divided active catalyst particles on the carrier.

The aforementioned known processes are characterized in that the carrier mass is impregnated with a solution of the desired catalytically active material, and the active material is deposited from the remaining solution adhering to the carrier surface, by further treatment, e.g., by heating and/or drying. A catalyst prepared in this way does not fully satisfy the above-mentioned conditions for obtaining a large specific surface area, because:

1. the active particles are not completely homogenously distributed over the carrier, since the amount of the solution adhering to the carrier differs from place to place thereon;
2. the amount of catalytically active material present on the carrier is small, since the amount of solution adhering to the carrier is likewise small; and
3. undesirable agglomeration can be prevented only by using highly diluted solutions, which also causes the amount of catalytically active material present on the carrier to be small.

Another attempt at obtaining catalytically active material which is finely and homogeneously distributed over the carrier is described in the British Patent Specification No. 926,235. This process starts with complex metal amine carbonate solutions, in which the carrier material is suspended and which suspension is heated with simultaneous stirring. As a result, the soluble metal ammine carbonate is decomposed and converted into insoluble metal carbonate or basic metal carbonate, which precipitates on the suspended carrier material. By heating the carbonate and reducing it, if necessary, it can be converted into the metal oxide or metal form, respectively. Processes using complex compounds have the following serious disadvantages:

1. Only a limited number of metals yield the required complex compounds, viz. Ni, Co, Cu, Mn, Pt, Pd, Hg, Cd, Au and Zn;
2. The degree of solubility of metal ammine carbonates is small, so that normally only catalyst masses with a low content of catalytically active material can be prepared;
3. To obtain the amine carbonates in soluble form, it is essential to use a high ammonia concentration so that the pH of the solution will become high. In a medium of this type, a number of widely used carrier materials, such as silicon dioxide and aluminium oxide, go partly into solution. When the ammonia is removed, which is required to permit decomposition of the metal ammine carbonate, the pH-value will drop again. The dissolved part of the carrier material will then precipitate and envelop the precipitated active particles, which thereby becomes inactive;
4. The preparation of the required solution is laborious.

Accordingly, the catalytic objects of this invention are to provide a catalytic composition which overcomes the above-mentioned disadvantages in the prior art, and which enables the catalytically active material to be very finely and homogeneously distributed over the carrier material.

By the processes of this invention, as already described herein, supported catalyst masses are obtained in which the catalytically active material is deposited in a finely divided form onto the carrier material in such manner that the individual particles of the catalytically active material are substantially isolated from each other, and will remain in that dimensionally isolated circumstance through the subsequent treatments of the composition to convert it to desired particular catalytic forms.

Generally, the catalytically active materials which may be used include any soluble compound of a catalytic metallic element. Many such catalytic elements are known to the art, most of which are in the form of metals or metal complexes. In accordance with the practice of this invention, the only basic requirement as to the catalytic metal used is that it be capable of forming a insoluble precipitate from its solution with the addition of hydroxyl ions (in a preferred embodiment of the invention) or through some other homogeneous change in the condition of the original soltuion of the catalytic metal component.

Simple tests will establish whether or not a given metal or solution of the metal is appropriate for use according to this invention. For example, a solution of the salt of the metal may be treated by slow addition of hydroxyl ions, to determine whether appropriate precipitation properties are exhibited. For instance, dilute sodium hydroxide or ammonium carbonate or ammonium hydroxide may be added to such a solution to determine whether or not an appropriate metal hydroxide precipitate forms. Suitable metals which will behave in this manner include, without limitation, chromium, tin, bismuth, cobalt, nickel, iron, antimony, uranium, manganese, vanadium and lead. Other metals may also be used.

The catalyst masses provided by this invention generally have the following properties:

1. The active particles have diameters which are substantially 50 Å or less, e.g. 30 Å;
2. The catalyst mass contains a high percentage by weight of catalytically active material, e.g. 50% by weight or more;
3. Owing to the very homogeneous distribution of the active particles over the carrier, the catalyst mass has a very high thermal stability;
4. The catalyst mass can be readily reduced at relatively low temperatures. In contrast to, e.g., coprecipitated catalyst particles, which required a reduction temperature of at least 500° C., the mass can be reduced at 400° C. in $H_2$ for instance;
5. An advantage of this method which should not be underestimated is that the very finely divided catalyst mass can be quite readily separated from the solution by filtration, and even by decantation.

Among all the heretofore known industrial catalysts, there is not one that provides all the above properties. Since with the present invention very large catalytically active surface areas are obtained per unit of catalyst volume, less reactor volume will be needed for a given production volume, and therefore reactors that are smaller and easier to operate may be used.

In making the catalyst composition of the invention, such finely divided carrier materials as are available from compounds such as silicon dioxide, aluminum oxide, titanium oxide, or similar thermostable substances may be employed, and the specific surface area of the carrier material should preferably be relatively large, e.g., of the order of 150 $m^2/g$ or more, being at least 50 $m^2/g$.

The solutions of the metallic catalytic component, in which the carrier material is generally suspended in the practice of the process provided by this invention, and from which the catalytically active material is deposition precipitated upon the carrier, need not be very highly diluted to effect a fine distribution of the precipitate over the carrier material. In general, solutions containing 5–15% by weight of metal ions of the catalytically active material are quite suitable for this purpose.

When this invention is practiced according to the process involving the in situ generation of hydroxyl ions, it will be understood that any suitable water-soluble compound of the catalytically active material may be used, in most cases in the form of a simple, readily obtainable salt, such as a chloride, sulphate, or a nitrate. If, in such process, the hydroxyl formation is to be effected by reaction of urea with nitrous acid, a soluble nitrite, e.g., an alkali metal nitrite such as sodium nitrite, must be added to the acid solution. However, if the presence of a small amount of an alkali metal has an adverse effect on the catalytic activity, formations of hydroxyl ions by reaction of the nitrite ions may be accomplished by starting with solutions which contain the catalytically active material in the form of a metal nitrite.

This invention provides not only for the preparation of monofunctional catalysts, i.e. catalyst masses containing only one catalytically active metal or metal oxide, but also for the preparation of bifunctional, or even polyfunctional catalyst masses i.e. catalyst masses containing different catalytically active metals or metal oxides accelerating catalytically different reactions. And, of course, as noted above the catalytically active metals may be in the form of their salts, such as the molybdates, vanadates and tungstates, etc.

To obtain the desired catalyst mass, it is essential that the precipitate be absorbed onto the carrier material with appreciable energy. For example, energy with which the constituents of ferric hydroxide are bonded to each other is great as compared with the energy with which these constituents are adsorbed to silicon dioxide. Accordingly, the precipitation of ferric hydroxide from the homogeneous solution in the presence of a suspended carrier material does not result in completely homogeneous distribution of small ferric hydroxide particles over the carrier. Therefore, a soluble ferrous compound must be used as the starting catalytically active material; the energy with which the constituents of ferrous hydroxide are bonded to each other is much smaller, than in the case of ferric hydroxide with the desired result that the formation of nuclei is confined to the surface of the carrier material. For preparing an iron catalyst with very finely divided, homogeneously distributed active particles it is therefore required that the iron be substantially present in the starting solution in the bivalent form, and in the absence of oxygen during the precipitation.

The pulverized catalyst mass prepared in conformity with the process hereinbefore described is not always very suitable for use on an industrial scale, because:

1. In gasphase reactions severe dust problems may be involved and i.e. costly dust-extraction equipment is needed;
2. The resistance of the pulverulent mass to gases may be high;
3. A proper distribution of the reaction gases over the catalyst mass is, in many cases, not realized, due to channeling in the pulverized mass; and
4. In liquid phase reactions the removal of the liquid from the catalyst mass may in some cases be extremely difficult.

These difficulties do not arise if the catalyst system can be employed in a more coarse form, i.e. as artefacts of a preselected shape and macroscopic dimensions. With known catalysts of relatively large specific surface area of the catalytically active material, such as those according to the DDR (Eastern German) Patent No. 8151, or a coprecipitated catalyst, such as a Ni/SiO$_2$ catalyst according to the process of van Eijck van Voorthuijzen and Fransen, this more coarse form has not been realized. The catalysts prepared according to the DDR Patent No. 8151 consist of a mixed oxalate or mixed formate of the supporting and catalytically active material. To prepare the catalyst from the mixed salts the latter has to be deomposed at an elevated temperature. In this procedure, a finely divided powder is obtained; the mutual adherence between the powder particles is too small to be pressed into artefacts with a strength sufficient to be handled. In the method devised by van Eijck van Voorthuijzen and Fransen drying of the copricipitated nickel-silica leads to vitreous-like particles, that cannot be pressed after milling. Other catalysts with a large specific surface area which do lend themselves for being molded or shaped into artefacts, such as the so-called Raney catalysts, can be regenerated only by an extremely laborious operation, which is objectionable in most applications.

It has now been found that shaped and molded catalytically active artefacts having uniform macroscopic dimensions and completely satisfying the surface areas requirements, can be made in a simple manner from the above catalyst mass, prepared according to the present invention. This is achieved by homogeneously distributing on a thermostable material in connection with carriers as hereinbefore defined or at least on part thereof, catalytically active particles measuring 50 A or less, in a weight-ratio of up to 3:1 to the supporting thermostable material, molding the so prepared thermostable material into artefacts of uniform macroscopic dimensions and subjecting the molded artefacts, if desired under reducing conditions, to a heat-treatment at a temperature between 300° and 600° C. The artefacts so made are hard and wear-resistant. The catalytic activity per unit weight of catalytic material is almost equal to that of the pulverized material.

In many processes the desired results may be obtained with weight ratios of the catalytically active particles to the thermostable supporting material of as low as approximately 1:10, but normally, optimum results are obtained at a weight ratio of 2:1 or less. The desired weight ratio of the catalytically active particles to the thermostable material in the catalytically active artefacts can be obtained i.e. by adding thereto a thermostable filler. Suitable thermostable filler include clay, corundum, and carborundum.

Preferably, the artefacts are shaped by compression-molding. However, other methods of molding or shaping may be used, such as extrusion, pelletizing, transfer molding, casting, etc. Suitable shapes are cylinders, spheres, rings or the like, depending on the application for which the catalyst is intended. In those cases where the catalytically active particle must be present on the thermostable material as metal particles, the heat-treatment is carried out under reducing conditions as described above.

The invention also relates to catalytically active artefacts made by the process according to the invention. The artefacts are characterized in that they are molded of thermostable material, as hereinbefore defined in connection with carriers, and possess a preselected shape and macroscopic dimensions, the said material, or part of the said material, being homogeneously loaded with catalytically active particles measuring up to 50 A in diameter in up to a 3:1 weight ratio to the supporting material.

It should be mentioned here that tablets of supporting material impregnated with catalytic material are known in the art. However, those artefacts have a much lower catalytic activity than those according to the invention, i.e. because they are loaded with a much smaller amount of catalytically active material than the catalyst masses according to the invention. The artefacts according to the invention further differ from the known ones in that the selectivity for certain reactions may be entirely different due to the extremely small dimensions of the catalytically active particles.

EXAMPLES ILLUSTRATING THE VARIOUS PRINCIPLES OF THE PRACTICE OF THE PROCESS OF THIS INVENTION

EXAMPLE A

Preparation of a Catalyst Mass With Nickel as the Catalytically Active Material

In this example, the procedure was as follows:
To 3 liters of water were added:
123.5 g of $Ni(NO_3)_2 \cdot 6H_2O$
30.6 g of urea and
25.0 g AEROSIL (Spec. Surf. 200 $M^2g^{-1}$)

The suspension was heated at 90° C. with intensive stirring and kept at this under these conditions for 67 hours. The variation of the pH value with the time during the course of the process is represented in FIG. A-1.

The mass obtained after filtration and washing was dried at 120° C. for 16 hours. The filtrate contained only 0.22 g of Ni per liter. The mass contained 38.1% by weight of Ni, 33.6% by weight of $SiO_2$ and less than 0.02% by weight of carbon.

After calcination at 450° C. for 16 hours and reduction in a hydrogen current at 450° C. for 16 hours, the mass was converted in a nickel-metal catalyst. The X-ray diffraction pattern indicated the presence of nickel particles; the broadening of the reflections pointed to particles of a mean diameter of 30 Å.

On reduction in a hydrogen current at 600° C., the mass contained nickel particles with a mean diameter of 60 Å.

The principles of "deposition precipitation" according to this invention, by homogeneous and gradual increase of the hydroxyl concentration in the presence of a carrier is further elucidated in connection with this Example by reference to the curves represented in FIG. A-2.

FIG. A-2 illustrates the comparative variation of the pH value, with time, of solutions containing: (a) urea only; (b) urea and nickel nitrate; and (c) a suspension of silica (AEROSIL) in a solution of urea and nickel nitrate. The data are derived from measurements made wherein the concentration of the above substances is equal in each case, and the rate of heating of the solutions to 100° C. as well as the degree of agitation were also maintained as equal as possible.

FIG. A-2 shows that, due to the precipitation of nickel, the pH value of solutions of urea and nickel nitrate (b) does not increase to the level obtained for the solution containing urea only (a). As indicated in FIG. A-2, formation of a visible precipitate occurs in the case (b), where precipitation is effected in the absence of carrier material, at a pH level of about 5.65. In this case (b) the precipitation proceeded from a normal homogeneous solution, and thus a large number of nucleation centers were not present. Consequently, large crystallites are generated in this process.

When silica is suspended in the solution (c), the pH value rises quickly to a level of about 5.45. At this level the hydroxyl groups at the surface of the silia particles are hydrolized to a sufficient degree to capture the unstable nickel nuclei that are formed in the bulk of the solution. Owing to the rapid nucleation of the nickel compound on the surface of the silica particles, which then follows, the pH value of the solution then decreases to about 5.25. This level is maintained while the main part of the nickel is deposited onto the surface of the carrier.

It will be noted that in FIG. A-1 the pH maximum of the curve was reached after 120 minutes, this curve representing a measurement made wherein the solution was heated to a temperature of 90° C. In FIG. A-2, the pH maximum for the curve (c) was reached within 25 minutes, this curve being based upon data in which the solution was heated to 100° C. The comparative time required to reach these respective pH maxima, as illustrated in these two curves, shows the important effect of temperature on the rate of hydrolysis of urea.

The lower solubility product for the precipitating nickel particles, as a result of nucleation at or on the surface of the carrier particles is demonstrated in the curves in FIGS. A-1 and A-2 (it will be understood that FIG. A-2 does not show the process carried to completion as in FIG. A-1). Whereas nickel precipitates in the absence of a silica carrier almost completely at a pH value of about 5.65, see FIG. A-2, curve (b), the nickel is deposition precipitated onto the carrier surface for the main part, at the lower pH value of about 5.25, see FIG. A-2, curve (c). In FIG. A-1, this deposition precipitation was effected at a still lower pH value between 4.7 and 5.

The rate of generation of the hydroxyl ions is limited by the rate of migration of the nickel hydroxide nuclei to the surface of the carrier particles. But, in turn, the rate of migration is essentially a function of the concentration gradient in the solution (small temperature differences as between 90° C. and 100° C. in FIGS. A-1 and A-2 have relatively negligible effects), (i.e., the gradient between the hydroxyl ion concentration in the bulk of the solution and at the surface of the carrier particles). In FIG. A-1, the rate of generation of hydroxyl ions is lower than in curve (c) of FIG. A-2.

Therefore, in curve (c) of FIG. A-2 a higher concentration gradient is established within the solution. Accordingly there is a higher rate of migration of the nickel hydroxide nuclei to the carrier particle surface. Therefore, deposition precipitation of the nickel particles is effected at a higher pH in FIG. A-2, curve (c) than in FIG. A-1.

However, it will seen that if the rate of generation of hydroxyl ions was made still higher, the pH level at which nucleation could occur within the solution curve (b), would be reached. Then the conditions for "deposition precipitation" will no longer exist. This explains why, according to this invention, the rate of generation of the hydroxyl ions must be controlled so that it is both "homogeneous" (to avoid local high concentrations) and "gradual" (to avoid an excessively high pH generally in the solution).

EXAMPLE B

Preparation of a Catalyst Mass, Containing Nickel as the Catalytical Active Material and Microspheroidal Silica As Carrier Material In this example, the procedure was as follows:
To 3 liters of water were added:
123.5 g of $Ni(NO_3)_2 \cdot 6 H_2O$
30.6 g of urea and
25.0 g of microspheroidal silica (manufactured by KETJEN, type $F_1$, spec. surf. 506 $m^2g^{-1}$; mean pore diameter 60 A).

The suspension was heated up to 90° C. with intensive stirring and kept at this temperature for 48 hours. The variation of the pH value with the time is represented in FIG. B, similar to the presentation in FIG. A-1.

The mass obtained after filtration and washing was dried at 120° C. for 16 hours. The filtrate contained 17.5 mg of Ni per liter. The mass contained 36.6% by weight of Ni, 32.7% by weight of $SiO_2$ and 0.14% by weight of carbon.

The dried mass displayed the X-ray pattern of Ni-$(OH)_2$ with asymmetric broadened lines. By heating in a hydrogen current at 200° C. for 1.5 hours and reduction at 450° C. for 65 hours the mass was converted into a nickel-metal catalyst. The X-ray diffraction pattern indicated the presence of nickel particles together with some unreduced $Ni(OH)_2$; the broadening of the reflections pointed to particles of a mean diameter of 40 A. This was confirmed by electron micrographs.

EXAMPLE C

Preparation of a Catalyst Mass, Containing Nickel as the Catalytical Active Material and Microspheroidal Silica as Carrier Material In this example, the procedure was as follows:
To 3 liters of water were added:
123 g of $Ni(NO_3)_2 \cdot 6 H_2O$
30.6 g of urea and
25.0 g of microspheroidal silica (manufactured by KETJEN, type $F_2$, spec. surf. 405 $m^2g^{-1}$, mean pore diameter 164 A).

The suspension was heated up to 90° C. with intensive stirring and kept at this temperature for 72 hours. The variation of the pH value with the time is represented in FIG. C.

The mass obtained after filtration and washing was dried at 120° C. for 16 hours. The filtrate contained 38 mg. of Ni per liter. The mass contained 36.4% by weight of Ni, 33.1% by weight of $SiO_2$ and 0.17% by weight of carbon.

The dried mass displayed the X-ray pattern of Ni-$(OH)_2$ with asymmetric broadened lines. By reduction in a hydrogen current at 400° C. for 18 hours the mass was converted into a nickel-metal catalyst. The X-ray diffraction pattern indicated the presence of nickel particles; the broadening of the reflections pointed to particles with a mean diameter of 35 A. This was confirmed by electron micrographs.

The microspheroidal silica Grade $F_1$ used in Example B contains pores that are appreciably narrower than those in Grade $F_2$ used in this Example C (mean diameters 60 and 160 A, respectively). The rate of migration of unstable nuclei of precipitating nickel is therefore lower for Grade $F_1$ than for Grade $F_2$. Accordingly, the main part of the nickel precipitates at a larger concentration gradient and hence, at a higher pH value on Grade $F_1$ than on Grade $F_2$ (compare FIGS. B and C).

EXAMPLE D

Preparation of a Catalyst Mass, Containing Nickel as the Catalytically Active Material and Kieselguhr as Carrier-Material In this example, the procedure was as follows:
To 3 liters of water were added:
123.5 g of $Ni(NO_3)_2 \cdot 6 H_2O$
30.6 g of urea and
25.0 g of Kieselguhr (trade name CELATON, spec. surf. 15 $m^2g^{-1}$).

The suspension was heated at 90° C. with intensive stirring. The variation of the pH value of the suspension is represented in FIG. D. After being at 90° C. for 92 hours the solution contained about 0.9 g of nickel per liter.

The mass obtained after filtration and washing was dried at 120° C. for 16 hours. It contained 33.2% by weight of Ni, 35.8% by weight of $SiO_2$ and 0.4% by weight of Carbon.

After calcination at 450° C. for 16 hours the composition of the mass was: 36.6% by weight of Ni as NiO, 39.5% by weight $SiO_2$ and less than 0.02% by weight of Carbon.

By reduction in a hydrogen current, the mass was converted into a nickel-metal catalyst. The X-ray diffraction pattern indicated the presence of nickel particles; the broadening of the reflections pointed to particles of a mean diameter of 45 A.

EXAMPLE E

Preparation of a Catalyst Mass, Containing Nickel as the Catalytically Active Material and Alumina as Carrier Material In this example, the procedure was as follows:
To 3 liters of water were added:
123.5 g of $Ni(NO_3)_2 \cdot 6 H_2O$
30.6 g urea and
25.0 g alumina (manufactured by DEGUSA, spec. surf. 90 $m^2g^{-1}$).

The suspension was heated at 90° C. with intensive stirring. The variation of the pH value of the suspension is represented in FIG. E. A rapid hydrolysis of the nickel nitrate first decreased the pH to a value from 4.4 to 3.65, after which it increased owing to the hydrolysis of urea.

The deposition precipitation was carried out at 90° C. for 50 hours. The mass obtained after filtration and washing was dried at 120° C. for 16 hours. It contained 31.3% by weight of Ni, 29.3% by weight of $Al_2O_3$ and 0.7% by weight of Carbon.

The mass was then heated in a hydrogen current in 1 hour up to 220° C., kept for 1 hour at this temperature, next 1 hour up to 300° C. and kept for 1 hour at this temperature and finally reduced at 480° C. for 16 hours.

The X-ray diffraction pattern indicated the presence of nickel particles, the broadening of the reflections pointed to particles of a mean diameter of 55 Å.

On reduction of a hydrogen current at 800° C. for 16 hours, the mass contained nickel particles with diameters ranging from about 50 to 150 Å, as appeared from electron micrographs.

EXAMPLE F

Preparation of a Catalyst Mass, Containing Iron as the Catalytically Active Material In this example, the procedure was as follows:
To 3.5 liters of water were added:
50 g urea and
50 g AEROSIL (spec. surf. 380 $m^2g^{-1}$) and After 2 hours boiling in a nitrogen atmosphere and subsequently cooling to room temperature, the pH value of the suspension was adjusted to 2.0 by adding hydrochloric acid.

To the said suspension were added:
43.5 ml of a degassed $FeCl_2$ solution (containing 10 g Fe).

The suspension was intensively stirred under an oxygen-free, $N_2$ atmosphere and heated at 100° C. for 20 hours. The variation on the pH value with the time is presented in FIG. F. After 20 hours the iron was completely precipitated and the solution did not contain any iron. The loaded carrier material in the precipitation vessel had a white color, which demonstrates that no oxidation to Fe(III) had occurred.

The mass obtained after filtration and washing was dried at 120° C. for 16 hours. On filtration in air, oxidation changed the color to green which became brown after drying. It contained 28.3% by weight of Fe and 46.0% by weight of $SiO_2$.

The X-ray diffraction pattern of the dried material only displayed two faint broad bands with d-values of 2.00 and 1.53 Å, which demonstrate the presence of very small particles.

After calcination at 900° C. for 16 hours, to dehydrate the Fe(III) oxide, the mass was reduced to an iron catalyst in a hydrogen current at temperatures increasing from 200° C. to 800° C. for 120 hours. The resulting catalyst, useful for ammonia synthesis, contained iron particles with dimensions from 70 to 120 Å, as appeared from electron micrographs.

The respective curves in FIG. F illustrate the same effects, and importance, of compliance with the conditions required by the process of this invention as were discussed in connection with FIGS. A-2.

EXAMPLE G

Preparation of a Catalyst Mass, Containing Cobalt as the Catalytically Active Material In this example the procedure was as follows:
To 2 liters of water were added:
50 g $CoCl_2$. 6 $H_2O$
60 g urea
2.0 g AEROSIL (Spec. Surf. 180 $m^2g^{-1}$).

The suspension was heated at 100° C. with intensive stirring for 30 hours. The color of the suspension changed from red into dark blue.

The mass obtained after filtration and washing was dried at 120° C. for 16 hours. It contained 45.7% by weight of Co, 16.3% by weight of $SiO_2$ and 0.3% by weight of $NH_3$.

After evacuation for 20 minutes at 436° C. the mass was reduced in a hydrogen current at 466° C. for 113 hours. The X-ray diffraction pattern indicated the presence of cobalt particles; the broadening of the reflections pointed to particles of a mean diameter of 105 Å.

This product also exhibits useful ferromagnetic properties, and can be used in hydrogenation reactions as a catalyst.

EXAMPLE H

Preparation of a Catalyst Mass, Containing Stannic Oxide as the Catalytically Active Material, Using Formamide In this example the procedure was as follows:
To 2 liters of water were added:
118.0 g of $SnCl_4$. 5 $H_2O$
55 ml of formamide (spec. gravity 1.1 g $cm^{-3}$) and
60 g of AEROSIL (spec. surf. 204 $m^2g^{-1}$).

The suspension was heated at 90° C. with intensive stirring for 9 hours. The variation of the pH value of the suspension is represented in FIG. H. In this figure, the variation of the pH value of a formamide solution without the presence of a carrier material is represented as well, and comparison of the curves shows the removal of hydroxyl ions from the solution phase by deposition precipitation of the stannic hydroxide.

Following raising the temperature to 100° C. for 30 minutes, the mass obtained after filtration and washing was dried at 120° C. for 40 hours. It contained 35.3% by weight of Sn, 47.4% by weight of $SiO_2$, the balance being Cl and Carbon.

The X-ray diffraction pattern indicated the presence of $SnO_2$; the broadening reflections pointed to particles of 3 mean diameter of 25 Å.

The dried mass was calcined at 450° C. for 24 hours, after which the composition was: 36.5% by weight of Sn, 48.8% by weight of $SiO_2$, the balance being Cl. The X-ray pattern of the calcined sample pointed to the presence of $SnO_2$ with a mean particle size of 50 Å. Electron micrographs showed besides particles of about 50 Å, many particles with smaller dimensions.

EXAMPLE J

Preparation of a Catalyst Mass, Containing Stannic Oxide as the Catalytically Active Material, Using Acetamide as the Hydrolyzing Agent In this example, the procedure was as follows:
To 2 liters of water were added:
118.0 g of $SnCl_4$. 5 $H_2O$
79.5 g of acetamide
60 g of AEROSIL (spec. surf. 204 $m^2g^{-1}$)

The suspension was heated at 90° C. with intensive stirring for 9 hours. The variation of the pH value of the suspension is represented in FIG. J. In this figure, the variation of the pH value of an acetamide solution without the presence of carrier material is represented as well, again illustrating the removal of the hydroxyl ions from the solution phase due to the deposition precipitation of the stannic hydroxide.

Following raising the temperature to 100° C. for 20 minutes the mass obtained after dilution with 1.5 liters, and hot water decantation, filtration and washing, was dried at 120° C. for 24 hours. It contained 34.0% by weight of Sn, 45.7% by weight of $SiO_2$, 2.5% by weight of Cl and 0.3% by weight of carbon.

The X-ray diffraction pattern indicated the presence of $SnO_2$; the broadening of the reflections indicated to particles of a mean diameter of 30 Å.

Part of the dried mass was calcined at 450° C. for 24 hours, after which the composition was: 36.0% by weight of Sn, 48.2% by weight of $SiO_2$ and 0.8% by weight of Cl. The X-ray pattern of the calcined sample pointed to about 80% by weight of particles with a mean diameter of 35 Å and about 20% by weight of particles with a mean diameter of 140 Å.

The accompanying electron micrographs are illustrative of the products obtained by the practice of the process of this invention. For instance, FIG. V-1 illustrates a nickel on silica preparation as obtained after filtration and drying from the aqueous medium and before reduction, according to the process of Example XXXVI, while FIG. V-2 illustrates the same product after reduction, these two figures being further discussed in the text of Example XXXVI hereinafter.

FIG. W is an electron micrograph of another nickel on silica product, after reduction as would be obtained by a process similar to that in Example II, hereinafter. The particle size in FIG. W is slightly larger than in FIG. V-2, the respective mean diameters as determined by X-ray line broadening about 23 Å for FIG. Y-2 and 30 Å for FIG. Z-1. FIG. X-1 is an electron micrograph of the iron on silica product as obtained in Example F, supra, before reduction. As Example F states the deposited iron particles in this Example are extremely small.

FIG. X-2 is also the same product after the calcination and reduction step described in Example F and corresponding resulting increase in the size of the now-reduced iron particles.

Electron micrograph V illustrates the product obtained by the process of Example XIX (hereinafter), after reduction.

FIG. Z illustrates the cobalt-iron on silica product obtained by the process of Example XLIII (hereinafter), after the reduction described in that example.

It will be seen from these electron micrographs that generally there is obtained a product having discrete very small metal-containing particles distributed substantially homogeneously over the surface of the finely divided particles of the supporting material (the greyer portion in the illustrations, on which the darker metal particles appear); however FIG. V-1 illustrates that in some cases the insoluble metal-containing component is deposition precipitated in the form of a thin layer extending all over the surface of the supporting or carrier particles. Such a layer formation of the metal-containing component will, after reduction, have the discrete particulate form as shown in FIG. V-2.

As illustrated on these figures, the measurement of approximately 6.5 mm on the electron micrographs correspond to an actual distance of about 500 Å in the sample itself.

FURTHER EXAMPLES ILLUSTRATING VARIOUS EMBODIMENTS OF THE INVENTION

Examples Illustrating The In Situ Generation of Hydroxyl Ion Method Of Practicing This Invention The following examples supply further details regarding specific embodiments of the invention for effecting homogeneous and gradual formation of hydroxyl ions in a solution of a metal salt, in which a carrier material is suspended, by the process according to the present invention.

EXAMPLE I

Preparation of a catalyst mass containing nickel as the catalytically active material.

102 g of $Ni(NO_3)_2 6$ aq.
49 g of $NaNO_2$
43 g of urea, and
20 g of "Aerosil" were added to about 4 liters of water.

The suspension was heated for 44 hours at 88° C. with vigorous agitation, and passed through a glass filter. The mass was washed with distilled water and subsequently dried for 84 hours at 120° C.

Upon analysis the catalyst mass proved to contain
27.2% of Ni in the form of NiO.
0.14% of $NH_3$
0.26% of $NO_3$ and
0.19% of Na.

After reduction in a flow of hydrogen, this catalyst can be converted into a nickel-metal catalyst containing 60 parts by weight of Ni to 40 parts by weight of $SiO_2$. The nickel surface of this catalyst — measured by hydrogen-chemisorption — amounted to 184 m$^2$ of Ni/g, from which it follows that the average particle size was 36 Å.

EXAMPLE II

Preparation of a catalyst mass containing nickel as the catalytically active material was made as follows:

593 g of $Ni(NO_3)_2.6$ aq,
122 g of urea, and
80 g of "Aerosil" were added to 4 l of water. The suspension was heated to 100° C. with vigorous agitation.

After 120 hours heating the pH-value was 7.0; all the nickel was precipitated. The filtrated and washed solid was dried at 120° C. for 20 hours. Its nickel content was 38.6%, its silica content 24.1%. After reduction at 380° C. for 72 hours, metallic nickel particles with an X-ray diameter of 30 Å were present.

EXAMPLE III

Preparation of a catalyst containing bismuth oxide as the catalytically active material.

10.4 g of $Bi(NO_3)_3 5$ aq were dissolved in a mixture of 8 ml of concentrated $HNO_3$(14N) and 40 ml of water. 72 g of urea dissolved in 200 ml of water were added to the solution whereupon 8.1 g of "Aerosil" were suspended in it.

After being heated for 4 hours at 100° C. with vigorous stirring, which raised the pH to 7, the suspension was filtered, and the material so obtained was calcined at 450° C. The catalyst mass contained 38.2% of $Bi_2O_3$ and 61% of $SiO_2$.

Electron-microscopic examination showed that, apart from the formation of a few bismuth oxide conglomerates having a diameter of about 700 Å, by far the larger part of the bismuth oxide had precipitated homogeneously over the carrier material in the form of particles having a diameter of 30-70 Å.

EXAMPLE IV

Preparation of a catalyst mass containing cobalt molybdate as the catalytically active material.
99.5 g of $Co(NO_3)_2.6$ aq,
60.5 g of $(NH_4)_6Mo_7O_{24}.4$ aq,
17.5 g of urea, and
75 g of "Aerosil" were added to 2 liters of water.

The suspension was heated overnight at 100° C. with vigorous stirring, and passed through a filter. The resulting mass was calcined at 400° C.

Upon analysis it proved to contain 47.5% of $CoMoO_4$. Electron-microscopic examination showed that the larger part of the cobalt molybdate had precipitated homogeneously over the carrier material in the form of extremely fine needles having a length of 150-400 Å and a thickness of 10 Å.

EXAMPLE V

Preparation of a catalyst mass containing chromium oxide as the catalytically active material.
80 g of $Cr(NO_3)_3.9$ aq,
90 g of urea, and
10 g of "Aerosil" were added to 4 liters of water.

The suspension of carrier material in the solution of chromium nitrate and urea was heated for 150 hours at 80° C. with vigorous stirring, during which treatment chromium hydroxide precipitated on the carrier. After that, the suspension was passed through a glass filter.

The catalyst mass obtained was dried for 70 hours at 120° C. and subsequently heated for 17 hours at 500° C. Upon analysis, the catalyst mass proved to contain 57.4% of $Cr_2O_3$.

Electron-microscopic examination showed that particles having a diameter of some tens of Å had precipitated homogeneously over the carrier material.

EXAMPLE VI

Preparation of a catalyst mass containing stannic oxide as the catalytically active material.

A solution of 20 g of urea in 50 ml of water was added to a solution of 11.6 g of $SnCl_4.5$ aq in 200 ml of water. After that, 5 g of "Aerosil" were suspended in the solution. The resulting suspension was heated for 4 hours at 100° C. with vigorous agitation. At the end of that period, the pH had increased to 7. After being calcined at 450° C., the catalyst mass recovered by filtration contained 50% of $SnO_2$ and 50% of $SiO_2$.

Electron-microscopic examination showed that the $SnO_2$ had precipitated homogeneously over the surface of the carrier in the form of particles having a diameter of about 10 Å.

EXAMPLE VII

Preparation of a catalyst mass containing platinum as the catalytically active material.
0.8 g of $H_2PtCl_6.6$ aq,
3 g of urea, and
3 g of "Aerosil" were added to 400 cm³ of water.

The suspension was heated for 7 hours at 90° C. with vigorous stirring, after which it was passed through a glass filter and dried for 17 hours at 120° C. The reduced catalyst mass contained 2.9% of Pt; the platinum surface amounted to 230 m² of Pt/g, from which an average particle size of 12 Å can be calculated.

EXAMPLE VIII

Preparation of a catalyst mass comprising $TiO_2$ (specific surface area about 40 m²/g) as the carrier material and nickel as the catalytically active material.
107.4 g of $Ni(NO_3)_2.6$ aq,
201 g of urea, and
10.6 g of titania, $TiO_2$ were added to 4 liters of water.

The suspension was heated for 96 hours with vigorous stirring and passed through normal filter paper. The mass so obtained was dried for 20 hours at 120° C.

Upon analysis, the mass proved to contain 39.2% of Ni and 25.3% of $TiO_2$. X-ray examination showed that the mean diameter of the non-reduced particles was 50 Å.

EXAMPLE IX

Preparation of a catalyst mass containing iron hydroxide as the active material and "Aerosil" as the carrier material.
955 cm³ of $FeCl_2$-solution (containing 7.8 g of Fe),
25.6 g of urea, and
23.4 of "Aerosil" were added to 2 liters of distilled and reboiled water.

The suspension was vigorously stirred and heated in an $N_2$-atmosphere. At the start of the test, the pH amounted to 3.9, and rapidly increased to 5.9. After 74 hours of vigorous stirring, it was 6.3, and after 90 hours, 8.2. The mass was then passed through normal filter paper in contact with the air, and subsequently dried for 80 hours at 120° C. The color was an even brown.

Upon analysis the mass proved to contain 22.5% of Fe (in the trivalent form) and 57.3% of $SiO_2$. X-ray examination showed that the diameter of the particles was 23 Å.

EXAMPLE X 180 g $Ni(NO_3)_2.6$ aq,
138.1 g $NaNO_2$
70.1 g "Aerosil" were added to 4 l of water.

The suspension was heated at 100° C. for 22 hours. The solid was filtered over a G 4 glassfilter and dried at 120° C. for 48 hours. The nickel content was 26.1%; the silica content 50.5%, sodium content 0.7%. After reduction at 500° C. for 120 hours the X-ray diameter of the nickel particles was 32 Å.

Differences in activity between known catalysts and catalysts according to the invention appear e.g. from the following examples on the hydrogenation of benzene by means of nickel catalyst and from an example on the oxidation of propylene by means of tin oxide-molybdenum oxide catalysts. In either case, the results obtained with the customary catalysts are compared with those obtained by means of catalytically active artefacts according to the invention.

EXAMPLE XI

Hydrogenation of benzene by means of nickel catalysts.

Hydrogen uptake, expressed in gram-mol (gmol) per hour per gram of Ni in the applied catalysts, as a measure of the hydrogenation activity:

Catalyst A: "Aerosil" impregnated with Ni $(NO_3)_2$:
B: ditto, calcined at 450° C, C: artefacts made of "Aerosil" on which NiO particles smaller than 50 Å are homogeneously precipitated in the way described in Example I,
D: ditto, as C.

| Catalyst | A | | B | | C | | | D | |
|---|---|---|---|---|---|---|---|---|---|
| Reduction time, h | 17 | 17 | 65 | 82 | 65 | 65 | 65 | 130 | 220 |
| Reduction temp., °C. | 350 | | 450 | | 450 | | | 475 | |
| Hydrogen uptake gmol per hour per g of Ni | 0.49 | 0.1 | 0.15 | 0.16 | 2.5 | 2.1 | 1.8 | 1.9 | 2.1 |

With catalysts C and D a nickel surface area of 55 m² per cm³ of reactor space can be obtained, the corresponding figure for catalysts A and B being only a few m². The activity expressed per g of nickel exceeds that of the latter by a factor 5–10, and varies only slightly with the nickel content of the artefacts.

EXAMPLE XII

Oxydation of propylene with tinoxide-molybdenum oxide catalysts, in which propylene, air and steam is passed over the catalyst mass:

Catalyst E: pure $SnO_2$ loaded with $MoO_2(OH)_2$ by impregnation. Specific surface area 3.0 m²/g.

Catalyst F: a mixture of $SnO_2$ and $MoO_3$. Specific surface area of the $SnO_2$: 2.9 m²/g Catalyst G: $SnO_2$ precipitated from tintetrachloride by boiling with nitric acid, and loaded with $MoO_2(OH)_2$ by passing a steam current saturated with $MoO_2(OH)_2$ over the $SnO_2$. Specific surface area: 25 m²/g.

Catalyst H: artefacts made of "Aerosil"; prior to molding, $SnO_2$ particles of approximately 10 Å are homogeneously distributed on the "Aerosil" in accordance with the process of Example VI after which the material is placed in steam current saturated with $MoO_2(OH)_2$.

Catalyst H*: as under H.

| Catalyst | E | F | G | H | H# |
|---|---|---|---|---|---|
| Reaction temp. °C. | 342 | 348 | 272 | 275 | 350 |
| Reaction rate of propylene in mmol of propylene per h per g of $SnO_2$ | 1.20 | 1.39 | 6.75 | 248 | 450 |
| Selectivity in % | | | | | |
| Total decomposition to CO and $CO_2$ | 10 | 7 | 19 | 9.1 | — |
| Acetaldehyde | 3 | 4 | 5 | 5 | 11 |
| Acetone | 30 | 43 | 47 | 81 | 65 |
| Acrolein | 2.5 | 6 | 0.2 | — | 14 |
| Acetic acid | 49 | 37 | 24 | 4.6 | 9.7 |
| Acrylic acid | 1.5 | 1 | 0.6 | 0.5 | — |
| Maleic acid | 4 | 2 | 4 | — | — |
| Conversion % propylene | 4.5 | 5.2 | 5.0 | 4.8 | 1.1 |

Catalyst H has a very much higher oxidation activity, and an approximately twice higher selectivity with respect to the formation of acetone.

The artefacts are hard and wear-resistant. The artefacts C and D mentioned in Example XI measure 2 mm in diameter and 4 mm in length; enclosed between two flat plates they can withstand an axial load of 23 kg and a radial load of 5.5 kg.

EXAMPLE XIII

To 2 liters of boiled and distilled water there was added 955 ml of an $FeCl_2$ solution containing 7.8 g of bivalent iron. After that, 23.4 g of Aerosil (spec. surface area 180 m² g⁻¹) and 25.6 g of urea were added. Subsequently heating in a nitrogen atmosphere at 70° C. was effected, with intense stirring. At the start, the pH value was 3.9. After 72 hours of heating, the pH value had risen to 6.3, after which the temperature was raised to 100° C. After 16 hours the pH value was 8.2. Subsequently, cooling was effected, and the gray solid material was filtered in air over a normal paper filter, when the solid material became a uniform brown. After washing with water the precipitate was dried at 120° C. for 80 hours. The material contained 22.5% by weight of trivalent iron, 57.3% by weight of $SiO_2$, and 0.8% by weight of $Cl^-$. X-ray and electron-microscopic examinations showed the iron (oxide) to be present on the Aerosil as particles having dimensions ranging mainly between 30 and 40 A. By thermal gravimetric examinations it was found that the last traces of water could be removed only upon heating at 850° C. The dimensions of the iron oxide particles did not change in the process. After the heating in air at the above-mentioned temperature, a portion of the material was reduced in a hydrogen atmosphere at temperature between 400° and 500° C. The size of the resulting iron particles depend on the reduction temperature. This rate determines the water vapor pressure during the reduction process. By varying these conditions of the reduction, iron particles having dimensions of 40 A to 100 A were obtained in homogeneous distribution on the surface of the supporting material.

EXAMPLE XIV

To 2 liters of distilled and boiling water there was added 90.2 g of urea, 25 g of $CoCl_2.6$ aq and 10 g of $NiCl_2.6$ aq. After that, 3.1 g of "Aerosil" (Spec. surface area 180 m² g⁻¹) were added. Subsequently, the liquid was heated at about 100° C. for 30 hours with intense stirring. In the course of the said heating treatment, the color of the suspension changed from pink into blue. Cooling was then effected and the loaded supporting material was filtered in the air over a normal paper filter. After washing with water, the precipitate was dried at 120° C. for 16 hours. The material contained 13.8% by weight of nickel, 33.0% by weight of cobalt, 20.3% by weight of $SiO_2$, 3.3% by weight of $CO_2$, and water. X-ray and electron-microscopic examinations showed that particles of 50 A units were present on the Aerosil. Investigation in a thermobalance showed that about 70% of the oxides were reduced to the metal form by subjecting the material to a hydrogen flow for 30 hours at 300° C. For effecting a complete reduction, temperatures of 600° C. and over were required; the application of temperatures in this temperature range caused an enlargement of the particle dimension to about 100 A. An X-ray diffraction pattern confirmed the presence of an alloy.

The dried material was compressed to cylinders 3 mm in height and 2.5 mm in diameter. Upon reduction in hydrogen for 42 hours at 500° C., the tablets were joined to form a column 15 cm in length. On this column a hysteresis loop of the material was determined. The said loop is shown in FIG. K.

EXAMPLE XV

Preparation of a ferric oxide-on-silica mass 955 cc of $FeCl_2$ solution (corresponding to 7.8 g of Fe), 25.6 g of urea and 23.4 g of silica ("Aerosil" specific surface are a 180 $m^2 g^{-1}$) were added to 2 liters of distilled and boiled water.

The suspension was heated to about 90° C. with intensive stirring in a nitrogen atmosphere. The pH-value rose rapidly from 3.9 at the start of the heating to 5.9, to increase subsequently slowly to 6.3 after 74 hours of heating and to 8.2 after 90 hours.

The mass was then filtered in contact with air over normal filter paper, and subsequently dried at 300° C. for 80 hours. The color of the dried residue was an even brown. Upon analysis the mass proved to contain 42.7% of $Fe_2O_3$ with the iron in the tri-valent state) and 57.3% of $SiO_2$. The particle size, as determined by X-ray examination, was uniform and equal to 23 Å.

The mass could be very easily made into strong molded bodies, by compression-molding.

EXAMPLE XVI

Preparation of a chromic oxide mass on silica 80 g of $Cr(NO_3)_3.9 H_2O$, 90 g of urea and 10 g of silicon dioxide were added to 4 liters of distilled and boiled water.

The suspension of the carrier material in the chromium nitrate and urea solution was heated at 80° C. for 150 hours in a nitrogen atmosphere with intensive stirring. The carrier material with precipitated chromium hydroxide was then filtered off on a glass filter.

The resulting mass was dried at 120° C. for 70 hours and subsequently heated at 500° C. for 17 hours. Upon analysis the mass proved to contain 57.4% of $Cr_2O_3$. Electron-microscopic examination showed that the carrier material was loaded with homogeneously distributed particles measuring some tens of Å in size.

EXAMPLE XVII

Preparation of a ferric oxide-on-silica mass with high iron content 79.6 g of urea and 4 g of silica ("Aerosil" degree 200 V, specific surface area about 200 $m^2 g^{-1}$) were added to 2 liters of water. This suspension was boiled for 1 hour in a nitrogen atmosphere. After cooling to room temperature hydrochloric acid was used to adjust the pH value on 3, whereafter 101.4 cc of a $FeCl_2$ solution (corresponding to 8 g of iron) was added.

This suspension was heated at about 60° C. for 72 hours. The pure white precipitate was filtered in contact with air, part of the mass then coloring brown. After 24 hours of drying at 110° C., the composition was 59.5% $Fe_2O_3$, 20% $SiO_2$, and 20.5% water. X-ray analysis proved the presence of FeO(OH) and $Fe_2O_3.H_2O$. The particle size of the FeO(OH) particles was around 160 Å, whereas the size of the $Fe_2O_3.H_2O$ particles present was below 20 Å.

EXAMPLE XVIII

Preparation of a nickel-iron oxide-on-silica mass 90 g of urea were dissolved in 2 liters of water, and 3 g of silica ("aerosil" grade 200 V, specific surface area 200 $m^2 g^{-1}$) were suspended into the solution. To remove dissolved oxygen the suspension was boiled during 5 hours in a nitrogen atmosphere, and subsequently cooled. By adding hydrochloric acid the pH-value was adjusted to 3.

To the said suspension 250 ml of a degassed nickel chloride solution (containing 1.72 g of nickel) and 88.5 g of a ferrous chloride solution (containing 7.0 g of iron) were added. The resulting suspension was heated in a nitrogen atmosphere with intensive stirring; the color of the suspension became initially a light green, while later on, it became a dirty deep green to black.

After 72 hours of heating the mass was filtered, washed and dried for 16 hours at 120° C., and proved to be strongly ferromagnetic. The composition was determined to be iron 41.4%, nickel 10.0%, $SiO_2$ 18.4%, $NH_3$ 0.5% $CO_2$ 0.1%, the balance being oxygen and water.

The X-ray diffraction pattern only displayed broadened lines due to $Fe_3O_4$, with a calculated particle size of 180 Å. Electron-microscope examination showed the carrier material to be homogeneously covered with nickel-iron oxide particles of about 20 Å, and in which some larger iron oxide particles were present.

If the thermal treatment comprises reduction in hydrogen at e.g. 300° C., and subsequent oxidation, iron-nickel oxide particles of about 80 Å in size were obtained, isolated and distributed on the carrier material.

EXAMPLE XIX

Preparation of an iron-nickel oxide-on-silica mass 80.1 g of urea was dissolved in 2 liters of water in which 3.0 g of silica ("Aerosil" grade 200 V, specific surface area 200 $m^2 g^{-1}$) were suspended. This suspension of a ferrous chloride solution (containing 7.0 g of iron) were added. The resulting suspension was heated in a nitrogen atmosphere with intensive stirring; the color of the suspension became initially a light green, while later on, it became a dirty deep green to black.

After 72 hours of heating the mass was filtered, washed and dried for 16 hours at 120° C., and proved to be strongly ferromagnetic. The composition was determined to be iron 41.4%, nickel 10.0%, $SiO_2$ 18.4%, $NH_3$ 0.5% $CO_2$ 0.1%, the balance being oxygen and water.

The X-ray diffraction pattern only displayed broadened lines due to $Fe_3O_4$, with a calculated particle size of 180 Å. Electron-microscope examination showed the carrier material to be homogeneously covered with nickel-iron oxide particles of about 20 Å, and in which some larger iron oxide particles were present.

If the thermal treatment comprises reduction in hydrogen at e.g. 300° C., and subsequent oxidation, iron-nickel oxide particles of about 80 Å in size were obtained, isolated and distributed on the carrier material.

EXAMPLE XIX

Preparation of an iron-nickel oxide-on-silica mass 80.1 g of urea was dissolved in 2 liters of water in which 3.0 g of silica ("Aerosil" grade 200 V, specific surface area 200 $m^2 g^{-1}$) were suspended. This suspension was boiled during 2 hours in a nitrogen atmosphere to remove dissolved oxygen. The pH-value was adjusted to 3 by hydrochloric acid after cooling to room temperature.

25.4 cc of a ferrous chloride solution containing 2.0 g of iron and 250 cc of a degassed nickel chloride solution containing 6.9 g of nickel were added. The suspension obtained in this way was heated at 90° C. for 72 hours in nitrogen atmosphere. Its color initially turned into a light green and finally became a dark green.

The mass was filtered, washed and dried for 16 hours at 110° C. Its composition was iron 10.7%, nickel 36.0%, $SiO_2$ 15.8%, $NH_3$ 0.2%, $CO_2$ 1.5%, the balance being oxygen and water.

The X-ray pattern of the dried material was broadened and could not be identified. This line-broadening points to a particle size of about 100 Å. Electron-microscopic examination showed that the carrier material was covered homogeneously with metal oxide particles of about 20 Å.

EXAMPLE XX

Preparation of a cobalt-iron oxide-on-silica mass 90 g of urea were dissolved in a suspension of 3.1 g of silica ("Aerosil" grade 200 V, specific surface 200 m² g$^{-1}$) in 2 liters of water. The suspension was boiled for 2 hours in a nitrogen atmosphere to remove dissolved oxygen. After cooling to room temperature the pH-value was adjusted to 3 by means of hydrochloric acid.

To this suspension 250 cc of a cobalt chloride solution containing 3 g of cobalt and 76.2 cc of a ferrous chloride solution containing 6.0 g of iron were added. The suspension was heated at about 90° C. for 120 hours in a nitrogen atmosphere with intensive stirring. The color of the suspension turned initially into a faint pink and then from violet to gray green.

The mass was filtered, washed and dried for 16 hours at 110° C. After drying the material was strongly ferromagnetic. The composition was iron 33.2%, cobalt 17.1%, silica 16.8%, $NH_3$ 0.2%, $CO_2$ 1.5%, the balance being oxygen and water.

The X-ray pattern displayed in addition to some sharp lines due to large $Fe_3O_4$ particles, very strongly broadened bands of a pattern that could not be identified. Electron-microscopic examination showed that the carrier material was homogeneously covered with 30 Å metal oxide particles, and some larger iron oxide particles.

EXAMPLE XXI

Preparation of an iron-on-alumina mass 90 g of urea were dissolved in a suspension of 3 g alumina (manufactured by Degussa, grade P 110 C I, specific surface area 90 m²/g) in 2 liters of water; the suspension was boiled for 2 hours in a nitrogen atmosphere to remove dissolved oxygen. After cooling to room temperature, the pH-value was adjusted to 3 by adding hydrochloric acid. 216 cc of a ferrous chloride solution containing 9 g of iron were added, and the suspension was boiled for 48 hours with intensive stirring. The color of the suspension became dark green.

After cooling to room temperature, the mass was filtered, washed and dried at 110° C. The composition was 48.6% of iron, and 16.2% of alumina, the balance being oxygen and water.

EXAMPLE XXII

A solution was prepared containing iron (II) (30 grams of iron) in water (3.5 liters) and also containing $Co(NO_3)_2$.6 aq 3(37.2 grams) and urea (100 grams). As the supporting material, silica (15 grams) was introduced therein, having a specific surface of 400 m² g$^{-1}$.

The resulting suspension was heating with intensive stirring under a nitrogen atmosphere, through the following steps.

The initial value of the pH was 2.2 and was then allowed to increase very slowly to a level of 6.5 after 60 hours of heating.

The solid material was then removed from the liquid, by filtration, and dried at 150° C. for 16 hours, in contact with air.

The dried residue had a brown color, contained 38.5% by weight of iron, 10.2% by weight of cobalt and 22.1% by weight of silica. The particle size as determined by X-ray examination was about 40 Å, and essentially uniform. The particle size as determined by electron-microscope investigation was also about 40 Å.

After pelletizing the powder was kept for 105 hours at 500° C. in flowing hydrogen. The magnetic moment of the reduced powder was 138 emu/g, which indicated a degree of reduction of 90%.

EXAMPLE XXII A

Preparation of an Iron-On-Silica Alumina Mass 90 g of urea were dissolved in a suspension of 3 g of a silica-alumina carrier material (manufactured by KETJEN, specific surface area about 500 m²/g) in 2 liters of water; the suspension was boiled for 2 hours in a nitrogen atmosphere to remove dissolved oxygen. The pH-value was adjusted to 3 with hydrochloric acid. After cooling to room temperature, 150 cc of a ferrous chloride solution containing 9.3 g of iron, were added.

The suspension was boiled for 72 hours in a nitrogen atmosphere with intensive stirring. The color of the solution turned into a dark green.

After cooling to room temperature the mass was filtered, washed and dried at 110° C. The composition was 43.9% of iron, and 14.6% of silica/alumina carrier, the balance, being oxygen and water.

EXAMPLES ILLUSTRATING THE PROCESS BY INJECTION OF AN ALKALI

EXAMPLE XXIII

The preparation of nickel catalysts

For a low degree of loading of the carrier material, precipitation by means of ammonia can be carried out at room temperature. If a high degree of loading is required, precipitation can be effected at elevated temperature.

a. 14.7 g of $Ni(NO_3)_2 \cdot 6 H_2O$; 10 g of a highly porous silicon dioxide obtained by flame hydrolysis of silicontetrachloride and sold under the trademark "Aerosil", 600 cm³ of distilled water were added together. The Ni to $SiO_2$ ratio was 1:3.4. With continuous, intensive stirring, a 1 N ammonia solution was then injected below the liquid surface at room temperature, at the rate of 6 cm³ per hour. When a pH-value of 8.9 had been reached, the experiment was stopped. After the carrier material, now loaded, had settled, it was filtered off on a normal paper filter, washed with 1 liter of distilled water and dried for 20 hours at 120° C. the filtrate was clear and colorless. The analysis of the resulting material gave: Ni: 18.1% weight; $SiO_2$: 61.7% weight; $NH_3$: 0.2% weight; $NO_3^-$: 2.9% weight. The change of the pH-value of the suspension as a function of time is shown in FIG. L. The ordinate indicates the pH value, the abscissa, the treatment time in minutes. The abscissa at the same time shows the molar ratio of $NH_3$ added to $Ni^{++}$ present. Addition of the ammonia solution starts at point A, precipitation sets in at B and is terminated at C. The mean rise of the pH-value during the precipitation was 0.008 units per minute, with a maximum of 0.013 units per minute. An X-ray diffraction test showed two non-identifiable bands. From the broadening of the X-ray reflections a mean particle size of 44 Å units was derived. After reduction of the material in hydrogen at 390° C. for a period of 72 hours, the preparation showed the X-ray diffraction pattern of nickel, with broadened reflections indicating a mean particle size of 18 to 19 Å units.

b. 492.8 g of $Ni(NO_3)_2 \cdot 6 H_2O$; 80.3 g of "Aerosil" and 4 liters of distilled water were added together. The Ni to $SiO_2$ ratio was 1.5:1. With continuous intensive stirring a 10 N ammonia solution was injected at room temperature under the liquid surface, at the rate of 276 cm³ per hour. The pH-value rose to 7.5, without a nickel compound being precipitated. Thereafter the temperature was raised to 100° C. During heating, the pH-value fell off to 4.7. At 100° C. the injection of the 10 N ammonia solution was continued until the pH had reached a value of 6.8 and the liquid started to assume a pale blue color on account of perceptible formation of a nickel ammonium complex. At this pH-value the experiment was stopped. After the carrier material, now loaded, had settled, it was filtered off on a normal paper filter, washed with 2 liters of distilled water, and dried at 100° C. for 20 hours. The analysis of the resulting material gave: Ni: 37.4% weight; $SiO_2$: 23.7% weight; $NH_3$: 0.3% weight; $NO_3^-$: 9.1% weight. X-ray diffraction testing did not reveal any identifiable pattern. From the broadening of the X-ray reflections, the mean particle size appeared to be 50 to 55 A units. After reduction of the material in hydrogen for 72 hours at 350° C. the specific nickel surface area was 63 m²/g of nickel. After reduction at a temperature of 500° C. this area had increased to 114 m²/g of nickel.

EXAMPLE XXIV

The preparation of iron catalysts

As appears from Examples XXIVa and b, a high treatment temperature leads to smaller-size precipitated iron-oxide particles than the use of room temperature.

a. 1 g of "Aerosil" was suspended in 3 liters of distilled water. The suspension was then boiled to remove dissolved oxygen. At a temperature of 85° C., 42 cm³ of a ferrous chloride solution containing 2 g of iron was then added. With constant and intensive stirring, an oxygen-free ammonium carbonate solution was subsequently injected at this temperature under the liquid surface, at the rate of 500 cm³ per hour, this solution containing 26 g of ammonium carbonate per liter. This reagent was added for 17 minutes, until a pH-value of 8.5 had been reached. After the carrier material, now loaded, had settled, it was filtered off on a normal paper filter, washed with 1 liter of distilled water, and dried at 100° C. for 24 hours. The filtrate was clear and colorless. Analysis of the resulting material gave: Fe: 41.5% weight; $SiO_2$: 25.5% weight; $NH_3$: < 0.1% weight; $CO_2$: 0.6% weight; $Cl^-$: < 0.1% weight. X-ray diffraction testing indicated the possibility of $\delta FeOOH$ being present. The broadening of the X-ray reflections showed the mean particle size to be 25 A units.

b. 1 g of "Aerosil" was suspended in 2 liters of distilled water, and the suspension was then boiled to remove dissolved oxygen. After cooling to room temperature, addition was made of 42 cm³ of a ferrous chloride solution, with 2 g of iron contained in it. With continuous and intensive stirring, an oxygen-free 0.25 M sodium carbonate solution was injected under the liquid surface at room temperature, at the rate of 500 cm³ per hour. This reagent was added for 17 minutes, until a pH-value of 9.2 had been reached. After the carrier material, now loaded, had settled, it was filtered off on a normal paper filter, washed with 1 liter of distilled water and dried at 100° C. for 72 hours. The filtrate was clear and colorless, even after having been kept in air for 72 hours, which points to the absence of non-precipitated ferrous chloride. Analysis of the resulting material gave: Fe: 46.2% weight; $SiO_2$: 20.9% weight; $CO_2$: 2.6% weight; $Cl^-$: 0.1% weight; Na: 0.6% weight. FIG. M shows the change of the pH-value during the precipitation, in the same way as FIG. L does. In the present figure, the ordinate shows the pH-values, the abscissa, the treatment time in minutes and the molar ratio of $Na_2CO_3$ added to $Fe^{++}$ present. The addition of the sodium carbonate solution starts at point A, the precipitation is initiated at B and terminated at C. The broadening of the X-ray reflections indicated a mean particle size of 50 Å units. Since at room temperature as used in this Example (compare Example F), stable soluble iron (II) bicarbonate can be formed in the range of pH values from 5.0 to 7.5, while it would precipitate at higher temperatures. Consequently, the pH herein must be increased up to about 7.5 to induce the deposition-precipitation (compare FIGS. F and M).

EXAMPLE XXV

The preparation of zinc catalysts 31.6 g of $ZnCl_2$, 0.8 cm³ of concentrated HCl, 20 g of "Aerosil", and 800 cm³ of distilled water were added together. With continuous intensive stirring, a 1 N ammonia solution was injected below the liquid surface at room temperature, at the rate of 218 cm³ per hour. The injection was continued for 2 hours and 10 minutes, until the pH of the suspension had reached a value of 7.8. At this value the experiment was stopped. After the carrier material, now loaded, had settled, it was filtered off on a normal paper filter, washed with 800 cm³ of distilled water, and dried at 120° C. for 19 hours.

Analysis of the resulting material gave a Zn to $SiO_2$ ratio of 1:1. The change of the pH-value with time is shown in FIG. N. The ordinate indicates the pH-value, the abscissa, the treatment time in minutes, and the molar ratio of $NH_3$ added to $Zn^{++}$ present. The addition of the ammonia solution starts at point A, as does the precipitation, and is terminated at point B. The mean rise of the pH-value during the precipitation amounted to 0.03 units per minute. Precipitation is complete only in the range of pH-value under 8. The method according to the invention as applied here is particularly suitable for abruptly terminating the rise of the pH at point B, when the value of 8 has been reached.

X-ray diffraction testing yielded a pattern for $Zn_5(OH)_6Cl_2$. The broadening of the X-ray diffractions indicated that the mean particle size was 450 Å units. However, electron-microscopy showed that only a few big zinc-containing crystallites were present, but that the majority of the zinc oxide was dispersed in a finely divided form over the carrier material. The size of these small zinc oxide particles was about 30 Å units.

EXAMPLE XXVI

The preparation of tin catalysts a. 15.0 g of $SnCl_4 \cdot 5 H_2O$; 75 g of "Aerosil", and 2 liters of distilled water were added together. with continuous intensive stirring, a 1 N ammonia solution was injected at room temperature under the liquid surface, at the rate of 500 cm³ per hour. When the pH had reached a value of 3.1, the experiment was stopped. After the carrier material, now loaded, had settled, it was filtered off on a normal paper filter, washed with 1 liter of water, and dried at 120° C. for 20 hours. After heating at a temperature of 450° C., the material showed the following analysis: $SnO_2$: 8.4% weight, $SiO_2$: 91.5% weight. X-ray diffraction yielded no identifiable pattern. Electron-microscopy revealed the particle size to be 40 to 50 Å units. The change of the pH-value as a function of time is shown in FIG. O. The ordinate gives the pH-value, the abscissa, the treatment time in minutes and the molar ratio of $NH_3$ added to $Sn^{4+}$ present. The addition of the ammonia solution and the precipitation start at point A and the precipitation is terminated at B. The mean rise of the pH-value was 0.03 units per minute, with a maximum of 0.15 units per minute. In a separate experiment (dashed line in FIG. O), the pH-value was further raised by continuing the injection. At a value of 7 all of the tin had dissolved again as stannate. The method according to the invention as employed here is also particularly suitable for abruptly terminating the pH rise when a given value has been reached.

b. When the above procedure for the preparation of tin catalysts is applied at a temperature of 100° C., the tin oxide particles on the carrier material have a size of only 10 Å units. The effect of the elevated temperature is similar to that found in the precipitation of ferrous hydroxide.

EXAMPLE XXVII

Preparation of iron oxide particles on a silica carrier 1 gram of silica ("Aerosil", having a specific surface of 200 m²/g) was suspended in 3 liters of distilled water; the suspension was boiled to drive out the dissolved oxygen. Next, at a temperature of 85° C., 42 ml of a ferrous chloride solution, containing 2 grams of iron, was added. At the above-mentioned temperature an oxygen free ammonium carbonate solution, containing 26 grams of ammonium carbonate per liter, was injected below the surface of the constantly and intensively agitated liquid at the rate of 500 ml per hour. The initial pH value was 7.2, and said reactant was added in 17 minutes' time when a pH-value of 8.5 had been reached. After the loaded carrier material had settled, it was filtered on a normal paper filter, washed with 1 liter of distilled water, and dried at 100° C. for 24 hours. The filtrate was clear and colorless.

The result of an analysis of the brown-colored residue material thus obtained was: Fe: 41.5 percent by weight; $SiO_2$: 25.5 percent by weight; $NH_3$: less than 0.1 percent by weight; $CO_2$: 0.6 percent by weight; $Cl^-$: less than 0.1 percent by weight.

From the broadening of the X-ray reflections followed an average particle size of 25 Ångstrom units. The resulting material could be dehydrated by calcination, and the oxide could subsequently be converted to metal by reduction with hydrogen.

Both the dehydrated oxide and the reduced metal compositions exhibited useful magnetic characteristics in accordance with this invention.

Study of the magnetic properties showed that the material was permanently magnetizable at ambient temperatures and was suitable for use in the production of magnetic impulse record making devices, such as tapes, by suitable incorporation in appropriate binders.

EXAMPLE XXVIII

Preparation of iron oxide particles on a silica carrier 1 gram of silica ("Aerosil", specific surface of 200 m²/g) was suspended in 2 liters of distilled water, and the suspension was boiled to drive out the dissolved oxygen. After cooling to room temperature, 42 ml of a ferrous chloride solution, containing 2 grams of iron, was added. Next an oxygen free, 0.25 molar sodium carbonate solution was injected at room temperature below the surface of the intensively agitated solution at the rate of 500 ml per hour. The initial pH value was 7.6, and said reactant was added in 17 minutes, when a pH-value of 9.2 had been reached. When the loaded carrier material had settled, it was filtered on a normal paper filter, washed with 1 liter of distilled water, and dried at 100° C. for 72 hours. The filtrate was clear and colorless, even after 72 hours' exposure to air, which indicated the absence of non-precipitated ferrous chloride.

The result of an analysis of the brown-colored residue material thus obtained was: Fe: 46.2 percent by weight; $SiO_2$: 20.9 percent by weight; $CO_2$ 2.6 percent by weight: $Cl^-$; less than 0.1 percent by weight; Na: 0.6 percent by weight.

FIG. P shows in graphic form the change of the pH-value during the precipitation carried out in Example XXVIII. In this figure, the pH-value is plotted along the vertical axis and the treatment time in minutes and the molar ration between $Na_2CO_3$ added and divalent iron present are plotted along the horizontal axis. The addition of the sodium carbonate solution started at point A, the precipitation started at point B and ended at point C. The increase of the pH-value during the precipitation averaged 0.08 units per minutes, the maximum being 0.37 units per minute.

An examination by X-ray diffraction did not show an identifiable pattern. From the broadening of the X-ray reflections followed an average particle size of 50 Ångstrom units. The resulting material could be dehydrated by calcination, and the oxide could subsequently be converted to metal by reduction with hydrogen.

Both the dehydrated oxide and the reduced metal compositions exhibited useful magnetic characteristics in accordance with this invention.

Study of the magnetic properties showed that the material was permanently magnetizable at ambient temperatures and was suitable for use in the production of magnetic impulse record making devices, such as tapes, by suitable incorporation in appropriate binders.

EXAMPLE XXIX

Preparation of a cobalt nickel alloy dispersed on silica

FIG. Q shows in graphic form the solubility of divalent iron, cobalt and nickel in ammonia-containing aqueous solution with variation of pH.

As appears from FIG. Q, the solubility of cobalt as a function of the pH-value in an ammonia-containing solution passes through a minimum; the same applies to nickel, though in this case the minimum solubility is noticeably higher. In FIG. Q, the solubility in terms of mg per liter is plotted along the vertical axis and the pH-value of the solution along the horizontal axis. The solubility of divalent iron, on the other hand, does not show a definite minimum at varying pH-value above 7. In view of this, in the case of precipitation of cobalt and/or nickel it is extremely important that the pH-value of the suspension be adjusted as accurately as possible. This can be better achieved by the injection method than by the method in which the pH-value is increased in the presence of urea at elevated temperatures. In fact, it is difficult abruptly to stop a hydrolysis reaction by cooling a large quantity of liquid. Moreover, the solubility of ammonia increases considerably with decreasing temperature, so that the pH-value even has tendency to increase quickly as the suspension is being cooled.

For preparing a cobalt nickel alloy, 152.0 grams of $CO(NO_3)_2 \cdot 6H_2O$ and 82.0 grams of $Ni(NO_3)_2 \cdot 6 H_2O$ were dissolved in a suspension of 2.5 grams of silica ("Aerosil", specific surface of $200m^2/g$) in 2½ liters of water. By adding 1 N hydrochloric acid the pH of the suspension was adjusted to 2.8. Next the temperature of the suspension was raised to 91° C., after which, with vigorous agitation, a solution of 69.3 grams of $NH_4HCO_3$ and 60 ml of a 25 percent ammonia solution in ½ liter of water were injected below the surface of the suspension. The initial pH was 2.8, adjusted with HCl, and rose to 5.9 and then to 7.1 within 74 minutes of the addition. FIG. R shows in graphic form the variation in pH-value with time for the precipitation carried out in Example XXIX. In this figure, the pH-value of the solution is plotted along the vertical axis and the treatment time in minutes along the horizontal axis. The injection started at point A, the precipitation started at point B and ended at point C. The increase of the pH-value during the precipitation averaged 0.017 units per minutes, the maximum being 0.04 units per minute. The loaded silica had a violet color and settled very quickly. After decantation and filtration (the filtrate was clear), which proceeded very smoothly, and after washing, the filter residue was dried at 120° C. for 16 hours.

An X-ray examination of the dried material showed an unknown diffraction pattern; the broadening of the X-ray reflections indicated a particle size of approximately 150 Angstrom units.

Both the dehydrated oxide and the reduced metal compositions exhibited useful magnetic characteristics in accordance with this invention.

Study of the magnetic properties showed that the material was permanently magnetizable at ambient temperatures and was suitable for use in the production of magnetic impulse record making devices, such as tapes, by suitable incorporation in appropriate binders.

The material was subsequently pressed to cylindrical pellets with a diameter of 3 mm and a height of 2 mm, which were reduced in hydrogen for 68 hours at 400° C. After a column of approximately 20 cm height had been formed from the pellets in an inert atmosphere, they showed the hysteresis loops given in FIG. S. The maximum field strengths in the three cases shown were approximately 500, 1000 and 2000 oerstedts, respectively. The coercive force was about 500 oerstedts.

Further tests showed that by the above-mentioned process any required cobalt-nickel ratio can be obtained and that the coercive force can be adjusted to any value below 500 oerstedts by reducing the cobalt content. There is no objection in the presently preferred embodiment against precipitating iron along with the other elements, provided the iron is present in the solution in the divalent form. It should be added that the magnetization shown in FIG. S has only a relative significance.

EXAMPLE XXX

A suspension of supporting material, silica (25 grams), having a specific surface of 380 $m^2/l$, was prepared in 3 liters of distilled water and boiled to remove dissolved oxygen.

A solution was prepared containing iron (II) chloride (20 grams of the metal) in water (100 ml) and added to said suspension at 20° C., after which 26.3 g $Co(NO_3)_2 \cdot 6 H_2O$ was dissolved in said suspension. By means of nitric acid the pH was set at a value of 1.8.

The resulting suspension solution was then subjected to intensive stirring under nitrogen while a solution of oxygen free ammonium bicarbonate and ammonia (50 grams $NH_4HCO_3$ and 50 ml of ammonia (25 weight percent) in 500 ml of water) was injected at the rate of 500 ml per hour.

The initial value of the pH was 1.8, then rose to about 7 within 10 minutes of the addition.

The solid material was then allowed to settle and removed from the liquid, by filtration, and dried at 120° C. for 16 hours, in contact with air. The filtrate was completely colorless.

The dried residue had a light brown color, contained 29.6% by weight of iron, 7.3 by weight of cobalt and 31.2% by weight of $SiO_2$. The particle size of iron carbonate and an unknown compound, as determined by X-ray examination was about 40 A, and essentially uniform. The particle size as determined by electron-microscope investigation was about 20 A.

The resulting composition could be dehydrated by calcination and the oxide could be subsequently converted to the free metal by reduction with hydrogen. Both the dehydrated oxide and the reduced metal compositions exhibited useful magnetic characteristics in accordance with this invention.

Study of the magnetic properties showed that the material was permanently magnetizable at ambient temperatures and was suitable for use in the production of magnetic impulse record making devices, such as tapes, by suitable incorporation in appropriate binders.

After calcination for 42 hours at 900° C., the powder exhibited a magnetic moment of 65 emu/g ($Fe_2O_3 + \lambda CoO)_2$ the coercive force was 600 oe and the remanence 35%. After reduction for 16 hours at 500° C. and 46 hours at 600° C. in a flow of hydrogen the magnetic moment had increased to 218 emu/g (Fe+Co), the coercive force was 380 oe and the remanence 35%. On exposure to the air the powder was partly oxidized, which causes the magnetic moment to decrease to 103 emu/g (Fe+Co). Passivation by means of $N_2O$ lead to a powder that was stable in air, and showing a magnetic moment of 175 emu/g (Co+Fe), a coercive force of 660 oe and a remanence of 35%.

For use as the alkaline solution injected in the process of the invention, there is preferred an ammonium salt of a weak inorganic acid, or an alkali or alkaline earth metal salt of a weak inorganic acid no stronger than acetic acid, the alkaline solution being of such normality that its pH does not exceed about 12. Examples of suitable salts include ammonium carbonate, ammonium bicarbonate, sodium carbonate, sodium bicarbonate, potassium carbonate, potassium bicarbonate.

EXAMPLES ILLUSTRATING THE HOMOGENEOUS REDUCTION OF THE VALENCY OF THE METAL TO BE DEPOSITION PRECIPITATED

Example XXXI

Preparation of copper catalysts:

Example XXXIa

A solution of 38.0 grams of $Cu(NO_3)_2 \cdot 3 H_2O$ in 500 ml of water and a solution of 44.5 grams of potassium sodium tartrate, 90 grams of sodium hydrocarbonate and 22.5 grams of sodium carbonate in 500 ml of water were put together. The resulting deep-blue solution was made up to 1.5 liters, whereupon 10 grams of silica "AEROSIL 220 V" (manufacturer Degussa, specific surface area 200 sq.m.g$^{-1}$) were suspended in it. Finally, 31.0 grams of glucose were added to this suspension.

The temperature was raised to 74° C. in about 6 hours, whilst the suspension was thoroughly agitated. The suspension was kept at this temperature for 20 hours, during which period the pH increased from 8.0 to 8.3. Finally, the suspension, which in the meantime had turned yellow, was cooled to room temperature with stirring. It was found that the suspension could be very easily filtered. The filter residue had an ochre color and contained a small quantity of an orange material which had deposited on the wall of the glass reaction vessel during the precipitation process. The filtrate had a pale-green color, which resulted from the yellow color of partially decomposed glucose and a very small quantity of blue non-reduced cupric tartrate.

After drying at 120° C. the X-ray diffraction pattern indicated the presence of cuprous oxide; the broadening of the reflections indiated the presence of particles of 110 Angstrom units. An electron-microscopic investigation of the dried precipitate showed that it contained very little cuprous oxide particles of larger dimensions (approximately 100 Angstrom units). These strongly agglomerated particles, which caused the broadening of the X-ray reflections, were those that had deposited on the glass wall. The reaminder of the preparation consisted of the carrier, homogeneously coated with extremely fine cuprous oxide particles measuring approximately 20 Angstrom units.

EXAMPLE XXXIb

Solutions of 38.0 grams of $Cu(NO_3)_2 \cdot 3 H_2O$ in 500 ml of water and of 44.5 grams of potassium sodium tartrate, 90 grams of sodium hydrocarbonate and 22.5 grams of sodium carbonate in 500 ml of water were put together. In the resulting deep-blue solution, diluted to 1.5 liters, were suspended 10 grams of silica "AEROSIL 200 V" (manufacturer Degussa, specific surface area 200 sq.m.g$^{-1}$). The pH value of the suspension was 7.8. Next, a solution of 11.1 grams of hydroxylamine hydrochloride in 500 ml of water, whose pH value had been previously adjusted to 7.0 with sodium hydroxide, was injected, with thorough stirring, into the suspension at a temperature of 35° C., in a period of 1½ hours. During the injection, the color of the suspension changed from blue via green to yellow. When the injection was finished, the suspension was stirred for another 30 minutes and then filtered off. The precipitate could only slowly be filtered; it had a yellowish red color.

After drying at 120° C., the X-ray diffraction pattern indicated the presence of cuprous oxide and a small quantity of cupric oxide. The reflections of the cuprous oxide were broadened; the broadening of the lines indicated a size of 110 Angstrom units. An investigation under the electron microscope showed that the carrier was homogeneously coated with cuprous oxide particles with an average size of approximately 70 Angstrom units.

EXAMPLE XXXII

Preparation of palladium catalysts.

5 grams of pallaidum chloride was dissolved in 400 ml. of water. The solution became turbid owing to hydrolysis of the palladium. Next, 11.9 grams of potassium-sodium tartrate was added and the solution was boiled until clear. The pH value of the solution was 7. In this solution were suspended 2 grams of silica "AEROSIL 200 V" (manufacturer Degussa, specific surface area 200 sq.m.g$^{-1}$), whereupon 6 grams of glucose was added. The suspension was heated to 90° C. for 4 hours whilst being thoroughly stirred; the AEROSIL took on a black color. The loaded AEROSIL, which settled down quickly, was subsequently readily filtered off and washed out.

After drying at 120° C. for 20 hours, the X-ray diffraction pattern indicated the presence of metallic palladium. The broadening of the X-ray reflections indicated an average particle size of approximately 60 Angstrom units.

EXAMPLE XXXIII

Preparation of a platinum catalyst.

2.64 grams of $H_2PtCl_6 \cdot 6 H_2O$ was dissolved in 2 liters of water in which 2 grams of $NH_3$ and 86 grams of $NH_4NO_3$ had been dissolved previously. The yellow precipitate formed intermediately was dissolved by heating at 70° C. for 16 hours. The pH value of the resulting clear and colorless solution was 8.5. After the solution had been cooled the room temperature, 2 grams of glucose and 10 grams of silica "AEROSIL 200 V" (manufacturer Degussa, specific surface area 200 sq.m.g$^{-1}$) were added. Next, the suspension was heated at a constant temperature of 70° C. for 150 hours whilst being thoroughly stirred. The brown precipitate was filtered off; no platinum could be demonstrated in the filtrate. Finally, the filter residue was dried at 120° C. for 16 hours.

The X-ray diffraction pattern showed only a few strongly broadened bands. It did not permit to draw any conclusions about the structure of the precipitated platinum. The broadening of the reflections indicated the presence of extremely small particles of approximately 10 Ångstrom units. In an electronmicroscopical investigation, too, only extremely small particles could be distinguished.

EXAMPLE XXXIV

Preparation of a silver catalyst.

3.14 grams of AgNo₃ was dissolved in 2 liters of an ammonia solution in which subsequently 10 grams of "AEROSIL 380" (manufacturer Degussa, specific surface area 400 sq.m.g$^{-1}$) was suspended. With thorough stirring at room temperature 2 ml. of an 80 percent solution of hydrazine was injected into this suspension in a period of 40 minutes, during which period the pH of the solution remained within the limits of 7.5 and 8.0. At the end of the injection it was found that complete precipitation had taken place. The precipitate was filtered off and washed out. The filtrate contained no silver.

After drying at 120° C. the X-ray diffraction pattern indicated the presence of metallic silver. From the broadening of the reflections followed a particle size of 160 Ångstrom units. An electron microphotograph showed that some larger particles of approximately 500 Ångstrom units were present, besides many small particles of approximately 100 Ångstrom units.

Injection of hydrazine at higher temperatures up to 100° C. results in smaller dimensions of the silver particles and a precipitate which can be more easily filtered off.

EXAMPLE XXXV

Preparation of a molybdenum catalyst.

3 grams of $(NH_4)_6Mo_7O_{24} \cdot 4 H_2O$ was dissolved in 150 ml. of water; the pH of the solution, which originally was approximately 6, was adjusted to 8.7 with ammonia. In this solution was suspended 1 gram of "AEROSIL 130 V" (manufacturer Degussa, specific surface area 175 sq.m.g$^{-1}$). 3 grams of hydrazine in 50 ml. of water was neutralized with acetic acid till the pH value of the solution was 8. Next, the hydrazine solution was injected into the ammonium molybdate suspension, with thorough stirring, whereupon the temperature of the suspension was slowly raised, with intensive stirring. At about 60° C. the AEROSIL rapidly took on a brown color; at 100° C. a dark-brown precipitate was obtained, which quickly settled. The precipitate could be readily filtered off and was dried at 120° C. The resulting mixture contained $MoO_3$ and $MoO_2$, as was proved by the X-ray diffraction pattern, the molybdenum oxides being homogeneously distributed on the surface of the carrier.

EXAMPLE XXXVI

Structure of a nickel-on-silica catalyst prepared According to the method of the invention A nickel-on-silica catalyst was prepared according to the method described in Example 1. Before reduction, this catalyst contained 37.2% of nickel, and after reduction for 50 hours at 370° C. in flowing hydrogen, the nickel content was 49.5%, the remainder being silica.

X-ray line broadening pointed to a mean particle size of 23A for the nickel particles, and the accessible nickel surface area (as measured by hydrogen adsorption) was 186 m² per g of nickel, which corresponds to a mean particle size of 36A.

FIG. V-1 is an electron micrograph of an ultrathin section of the catalyst after drying at 120° C. The magnification is 128,000 × and 1 mm corresponds to 0.0078μ or 78A. As can be seen from the micrograph the nickel compound is deposited as a continuous layer over the support. FIG. V-2 is an electron micrograph of the reduced catalyst. From this micrograph it is evident that the continuous nickel hydroxide or nickel oxide layer is broken up into small nickel particles. Owing to the discontinuous layer of nickel particles, the micrograph of the reduced catalyst displays a grainy appearance.

EXAMPLES ILLUSTRATING THE IN SITU GENERATION OF THE SUPPORTING MATERIAL

EXAMPLE XXXVII

Prepration of a cobalt-nickel alloy dispersed on silica 152 grams of $Co(NO_3)_2 \cdot 6 H_2O$ and 82 grams of $Ni(NO_3)_2 \cdot 6 H_2O$ were dissolved in 2 liters of distilled water. 45 ml of 1N NCl were added to this solution. The temperature of the solution was raised to 90° C., whereupon 25 ml of a potassium silicate solution, containing 2.5 grams of $SiO_2$, was injected into the agitated solution in 20 minutes' time. At the end of the injection the pH of the suspension thus obtained was 2.85. Next, a solution of 69.3 grams of $NH_4NCO_3$ and 60 ml of a 25 percent ammonia solution in 500 ml of water were injected into the thoroughly agitated suspension at the same temperature, in 50 minutes' time. The injection was stopped when the pH had reached a value of 7.25. The violet precipitate could be readily filtered off; the filtrate (a total of 3 liters, including the wash water) contained 51 mg of Co per liter and 409 mg of Ni per liter.

After drying for 16 hours at 120° C. the material was pressed to pellets with a diameter of 2.8 mm and a height of 2 mm. These pellets were reduced in a stream of hydrogen at 400° C. for 68 hours. Next, a column of approximately 20 cm length was formed from the pellets in an inert atmosphere and the hysteresis loop of said column was determined, which had a shape as shown in FIG. T. The coercive force was 370 oerstedts. The magnetization shown in FIG. T on the vertical axis has only a relative significance.

EXAMPLE XXXVIII

Preparation of a cobalt-iron oxide dispersed on silica 7.3 grams of $Co(NO_3)_2 \cdot 6 H_2O$, 60 grams of urea and 40 grams of ammonium nitrate were dissolved in 2 liters of distilled water. The solution was boiled to drive out the dissolved oxygen and cooled in a nitrogen atmosphere. After the pH value of the solution had been adjusted to 1.5 with nitric acid, 216 ml of an $FeCl_2$ solution, containing 25.5 grams of iron, were added, whereupon 150 ml of a potassium silicate solution, containing 3 grams of $SiO_2$, were injected into the agitated solution in 10 minutes' time. The pH value of the suspension thus obtained was 1.6. Next, the suspension was heated to 100° C. with thorough stirring; while the temperature rose from 50° C. to 90° C., the pH increased to 5. The color of the suspension changed from light red through brown and grey to deep black. After heating at 100° C. for 28 hours the precipitation was found to be complete. The precipitate could be readily filtered and washed; the filtrate, which had a pH of 5.3, did not contain any Fe or Co.

After drying for 16 hours at 120° C. the material was pressed to pellets with a diameter of 2.8 mm and a height of 2 mm. A column of approximately 20 cm length was made from these pellets, and the hysteresis loop of the column was determined, which had a shape as shown in FIG. U. The coercive force was 250 oerstedts. The magnetization shown in FIG. U on the vertical axis has only a relative significance.

EXAMPLE XXXIX

The same process was carried out as described in Example XXXVIII, except that instead of injecting the potassium silicate solution, 3 grams of silica "AEROSIL 380" (manufacturer Degussa, specific surface area 380 m²g⁻¹) was suspended in the solution. The hystersis loop of this material, determined in the same way as in Example XXXVIII, was identical with that shown in FIG. U.

The powder materials prepared according to Examples XXXVIII and XXXIX were mixed with a solution of 20 percent by weight of polyurethane in dimethyl formamide, and the mixtures were spread on polyester film. The amount of ferromagnetic powder contained in the coating was 60 percent by weight.

The powder prepared according to Example XXXVIII with injection of potassium silicate proved to given an exceptionally smooth and wear-resistant layer. With the preparation made according to Example XXXIX the layer applied in the same way had a much rougher surface.

EXAMPLES ILLUSTRATING DEPOSITION PRECIPITATION BY THE DECOMPLEXATION OF METAL IONS

EXAMPLE XL

Preparation of an iron(III) oxide-on-silica catalyst system 48 grams of $FeCl_3 \cdot 6 H_2O$ and 66 g of "KOMPLEXON III" (the disodium salt of ethylene diamino tetracetic acid) were dissolved in about 1.5 liters of water. Thereafter, 18 g of sodium hydroxide and 11.4 ml of glacial acetic acid were added by way of buffer, and next 10 g of silica — "AEROSIL 200" (manufactured by Degussa, specific surface area 204 m²g⁻¹) AEROSIL is a trade name for a silica preparation obtained by flame hydrolysis of silicon tetrachloride — was suspended in the solution. The color of the suspension was yellowish brown, the pH value was 4.6. Next, the temperature of the suspension was raised to 70° C., after which a 30% hydrogen peroxide solution was injected by means of a plunger pump under the liquid level into the vigorously agitated suspension, at the rate of approximately 200 ml/h. After about 300 ml of hydrogen peroxide had been injected, the pump was stopped; the pH value had risen to 5.6 and the suspension had turned brown. Thereafter the loaded carrier material was isolated by filtration and washed. The filtrate has a light yellow color. The filter residue was dried for 18 hours at 120° C.

The X-ray diffraction pattern of the dried material showed three very broad unidentifiable bands, in addition to the lines characteristic of sodium chloride. The broadening of the reflections indicated that the particle size was about 10 A units. This was confirmed upon examination of the material in the electron microscope. These extremely small particles were found to be very homogeneously distributed over the carrier material.

EXAMPLE XLI

Preparation of a silver-on-silica catalyst 81.8 g of "KOMPLEXON III" (the disodium salt of ethylene diamino tetracetic acid) and 17.8 g of sodium hydroxide were dissolved in 1 liter of water. To this solution there was slowly added a solution of 34.0 g of silver nitrate in 300 ml of water. An intermediary yellowish white precipitate dissolved slowly, and a clear yellow solution resulted. In about 650 ml of this solution 40 g of silica — "AEROSIL 200" (made by Degussa, specific surface area 204 m²g⁻¹) — was then suspended, after which the volume was made up to 1 liter by dilution with water. At room temperature, 15 ml of a 30% hydrogen peroxide solution was injected under the liquid surface of the vigorously agitated suspension in 10 minutes time. The suspension immediately lost its color, and after 1 hour of stirring at room temperature it assumed a grey color. After a total agitation period of 3 hours, at room temperature, the suspension was finally heated at 100° C. for 40 minutes, with vigorous stirring. Not until in the heating stage did the oxidation of the KOMPLEXON proceed at a preceptible rate; the color of the suspension changed from grey through pink to greenish brown. Thereafter the loaded carrier material was isolated by filtration. The filtrate had a light yellow color, it did not contain silver. After washing with ethyl alcohol, the filter residue was dried at 120° C. for 16 hours.

The dried material showed the X-ray diffraction pattern of metallic silver. It contained 0.7 weight percent of carbon, originating from the KOMPLEXON. The broadening of the reflections was indicative of a particle size of 170 Å units. Examination in the electron microscope showed that, in addition to some larger particles, small particles of about 50 Å were homogeneously distributed over the carrier material.

EXAMPLE XLII

Preparation of copper-on-silica catalysts a. Oxidation by means of sodium hypochlorite 46.0 of $Cu(NO_3)_2 \cdot 3 H_2O$, 70.6 g of "KOMPLEXON III" (the disodium salt of ethylene diamino tetracetic acid), and 15.4 g of sodium hydroxide were dissolved in 500 ml of water. In this solution 8 g of silica — "AEROSIL 200" (made by Degussa, specific surface area 204 m²g⁻¹) — was suspended. To the suspension there was added 2 liters containing 10 g of a sodium hypochlorite solution were added which after an interval of time resulted in a violent gas evolution in the suspension. After this reaction has spent itself (the temperature of the suspension having meanwhile risen to 60° C.) the loaded carrier material was isolated by filtration and washed. The filtrate was light blue in color and still contained copper.

After drying at 120° C. for 72 hours the residue contained 32.4% weight of copper and 41.6% weight of silica. The material showed the X-ray diffraction pattern of cupric oxide, of which only the two strongest lines were present. Since each of the reflections was composed of two lines lying very close together, determination of the particle size from the broadening of the reflections was not feasible. A study of the catalyst in the electron microscope showed that, besides some larger ones, particles having sizes up to about 100 A, were homogeneously distributed over the carrier material.

b. Oxidation by means of hydrogen peroxide

To a suspension of 400 mg of silica -- "AEROSIL 130 V" (made by degussa, specific surface area approximately 140 m²g⁻¹) -- in 50 ml of a solution of the copper -- ethylene diamino tetracetic-complex, containing 397 g of copper, there was added 50 ml of a 30% hydrogen peroxide solution. Thereafter the suspension, in the form of a layer of only 2 cm thickness, was left at room temperature, with agitation. After 27 minutes a strong evolution of gas occurred, and the temperature of the suspension rose to about 90° C. The suspension assumed a brownish black color. After about 30 minutes the gas evolution stopped and the loaded carrier material was isolated by filtration and washed. In the filtrate 60.8 mg of copper has been left. After drying at 120° C. for 16 hours a greenish-black material was obtained.

As in the case of process "a" of this Example, the X-ray diffraction pattern, which was characteristic of copper (II) oxide, repeatedly showed two broadened lines side by side, so that it was impossible to determine the particle size. By electron microscope examination the preparation proved to consist exclusively of particles smaller than 120 A, these particles showing some agglomeration on the carrier material.

In these last three Examples, simple salts of iron (ferric chloride), silver (nitrate) and copper (nitrate) typify the compounds containing active metal elements which may be used in the process. Other metals which may be similarly precipitated include nickel, rhuthenium, rhodium, palladium, rhenium, osmium, iridium, platinum, molybdenum, tungsten, antimony, bismuth and tin.

EXAMPLE XLIII

Preparation of magnetic material containing iron-cobalt

The material was precipitated according to the method described in Example XX; the quantities used were $Co(NO_3)_2 \cdot 6$ aq 7.5 g
$FeCl_2$ solution containing 7.5 g of iron
urea 100 g
$NH_4NO_3$ 50 g
silica (Aerosil "380") 21 g After drying at 120° C. for 20 hours the composition of the material was
22.4% iron
6.7% cobalt and
51.9% silica The X-ray pattern of the dried material showed two bands pointing to spacings of 2.59 and 1.54 A; the broadening pointed to a mean diameter of 60 A. The magnification is 128,000x; one mm corresponding to $0.0078\mu$ or 78A. From the micrograph it is evident that very small iron-cobalt oxide particles are dispersed homogeneously over the surface of the support.

The material was calcined for 22 hours at 900° C. and subsequently reduced in flowing hydrogen at temperatures increasing from 200° C. to 830° C. for about 200 hours. FIG. Z represents a micrograph of the reduced material. The magnification is again 128,000 x, one mm corresponding to $0.0078\mu$ or 78 A.

Due to the high temperature, metal particles with dimensions ranging from 70 to about 150 A are obtained as can be seen in the micrograph. Since for iron alloys the upper limit for single-domain behavior is of the order of 500 A, it is apparent that the metal particles are well within the single-domain range.

EXAMPLES ILLUSTRATING THE PROCESS INJECTION OF A SOLUTION CONTAINING THE METAL IONS TO BE PRECIPITATED

In a number of cases it is required that the precipitation be carried out within a range of pH-values that does not include the value where precipitation is induced by increasing the hydroxyl ion concentration. This is because the requirement of a nucleating supporting surface can only be satisfied within a definite range of pH-values.

An instance for this is the precipitation of Fe(III) by a homogeneous and gradual increase in hydroxyl ion concentration. As explained above, the positively charged iron(III) oxide nuclei are repelled by the silica particles that are also positively charged at a pH-value of 2, where Fe(III) precipitates. However, if Fe(III) is introduced into a suspension wherein silica is negatively charged, the requirement of a nucleating surface is met again.

Consequently, according to this embodiment of the invention metal ions are introduced gradually into a suspension, the liquid phase of which is maintained in a condition where the metal ions form insoluble compounds and where the carrier material exhibits a nucleating surface, which implies that the nuclei of the metal component adhear to the carrier surface.

Since due to hydrolysis of the metal ions being introduced in the suspension, the pH-value of the suspension tends to decrease, simultaneous injection of hydroxyl ions or the presence of agents reacting with the hydroxyl ions set free, is required to maintain the pH-value of the suspension in the required range.

This embodiment of the invention is particularly useful if the component to be deposition-precipitated must contain different metal ions. Inasmuch as after deposition of one metal the carrier surface is generally completely covered, nucleation of a component of the second metal onto the modified carrier surface may be prevented. According to this embodiment, however, metal ions displaying a different solubility and not co-precipitating on increasing the pH-value of their solution can be simultaneously deposition-precipitated onto a carrier surface.

This process is illustrated in Examples XLIV; XLV, XLVI and XLVII which the preparation of a magnetic material containing cobalt-iron oxide particles is described as well as the preparation of these copper containing systems.

EXAMPLE XLIV

Preparation of a permanently magnetizable mass Containing Iron(III) and cobalt 25 g of AEROSIL (specific surface 375 m$^2$/g$^{-1}$) were suspended in 2 liters of water. The temperature was raised to 94° C. and the pH-value adjusted to 5.0 by means of ammonium-bicarbonate. Under vigorous agitation 500 ml of a somewhat acidulated solution containing 96.5 g FeCl$_3$ . 6H$_2$O was injected under the liquid level during a period of 60 minutes (0.003 gram ion per minute per liter suspension). By simultaneous injection of a solution of ammonia and ammonium carbonate the pH-value of the suspension was kept between 5.0 and 5.8. After the injection of the ferric chloride, the suspension was cooled to room temperature, and the pH-value was then brought to a value of 4 by means of nitric acid. At this pH-value Fe(III) is insoluble but Co is still soluble.

Now, 24.3 g of Co(NO$_3$)$_2$ . 6H$_2$O and 100 g of urea were added to the suspension. During vigorous agitation, the temperature of the solution was raised and kept at 100° C. for 17 hours. According to the principles of the invention a cobalt compound was precipitated onto the iron-loaded carrier material.

The loaded carrier material could rapidly be separated from the liquid by filtration; the filtrate was clear and colorless. The precipitate was washed and dried at 120° C. for 24 hours.

The composition of the mass obtained was 28.9% by weight Fe, 7.4% by weight Co and 31.0% by weight $SiO_2$.

Good mixing of the metal ions as oxide particles was provided by calcining the mass at 900° C. for 42 hours, and a cobalt-ferrite was formed as could be concluded from a magnetic moment of 40.5 grams per cm$^3$ per gram of the material obtained.

EXAMPLE XLV

Preparation of a catalyst containing copper and cobalt as catalytically active elements 38 g of AEROSIL (specific surface 130 m$^2$g$^{-1}$) were suspended in 2 liters of water. The temperature was raised for 80° C. and the pH-value adjusted to 8.5 by means of sodium hydroxide. Under vigorous agitation 600 ml of a solution containing 154 g. of $Cu(NO_3)_2$ . $3H_2O$ and 104 g of $Cu(NO_3)_2$ . $6H_2O$ were injected under the liquid level during a period of 90 minutes (0.004 gram ion metal per minute per liter suspension). Simultaneously, a solution of sodium hydroxide, containing a total of 80 g NaOH, was injected. Then the temperature of the suspension was raised to 100° C. and kept at this temperature for 1 hour. The pH was meanwhile decreased to a value of 7.9.

The light greenish-blue loaded carrier material could rapidly be separated from the liquid by filtration; the filtrate was clear and colorless. The mass obtained was washed and dried at 150° C. for 72 hours and had a black color.

The composition of the mass obtained was 31.4% by weight Cu, 16.3% by weight Co and 28.2% by weight of $SiO_2$. X-ray diffraction showed that there were particles of extremely small size deposited on the carrier.

EXAMPLE XLVI

Preparation of a Catalyst Mass Containing Copper and Chromium (III) As Catalytically Active Elements 50 g of AEROSIL (specific surface 130 m$^2$g$^{-1}$) were suspended in 2 liters of water. The temperature was raised for 70° C. and the pH-value adjusted to 8.5 with sodium hydroxide. Under vigorous agitation, 600 ml of a solution containing 61.7 g $Cr(NO_3)_3$ . $9H_2O$ and 113.2 of $Cu(NO_3)_2$ . $3H_2O$ and 10 ml of a 36% by weight hydrochloric acid solution were injected under the liquid level during a period of 90 minutes (0.0095 gram ion per minute per liter suspension). By simultaneous injection of a solution of sodium hydroxide, containing 80 g of NaOH the pH was maintained within a value of 8.5 ± 0.3. After injection the temperature of the suspension was raised to 100° C. and kept at this temperature for 15 minutes. The pH was meanwhile decreased to a value of 8.4.

The bright green loaded carrier material could rapidly be separated from the liquid by filtration. The filtrate was clear and colorless, while the residue was rather voluminous. The precipitate was washed with water having a pH-value of 8 and dried at 120° C. for 24 hours. The composition of the mass obtained was 28.8% by weight of Cu; 6.3% by weight of Cr and 33.4% by weight of $SiO_2$.

EXAMPLE XLVII

Preparation of a Catalyst Mass Containing Copper And Nickel As Catalytically Active Elements 38 g of AEROSIL (specific surface 130 m$^2$g$^{-1}$) were suspended in 2 liters of water. The temperature was raised for 70° C. and the pH-value adjusted to 8.5 with sodium hydroxide. Under vigorous agitation, 600 ml of a solution containing 154.3 g $Cu(NO_3)_2$. $6H_2O$ and 104.8 of $Ni(NO_3)_2$. $6H_2O$ were injected under the liquid level during a period of 90 minutes (0.005 gram ion metal per minute per liter suspension). By simultaneous injection of 600 ml of a solution of sodium hydroxide, containing 80 g of NaOH, the pH was maintained within a value of 8.5 ± 0.3. Towards the end of the injection procedure the color of the solid material changed from light blue into dark green. After the injection the temperature of the suspension was raised to 100° C. and kept at this temperature for 15 minutes. The pH was meanwhile decreased to a value of 6.5. The dark brown loaded carrier material could rapidly be separated from the liquid by filtration. The precipitate was washed and dried at 150° C. for 15 hours. The composition of the mass obtained was 30.1% by weight Cu, 15.7% by weight Ni and 26.3% by weight $SiO_2$. The X-ray diffraction pattern of a sample of this material showed a pattern of cupric oxide and two vague bands width d-values of 2.64 and 1.54 A. It could be concluded from the broadening of the reflections of the cupric oxide that the mean average size of the CuO particles was 140A.

EXAMPLES ILLUSTRATING THE PROCESS BY HOMOGENEOUS OXIDATION TO A HIGHER VALENCE STATE

The practice of this invention by homogeneous reduction technique has been illustrated above in Examples XXXI to XXXV. The following examples illustrate the process involving homogeneous oxidation technique. In both instances the process involves use of an appropriate redox agent, and the rate of reduction or oxidation may be controlled by controlling either the temperature or the rate of introduction of the redox agent.

EXAMPLE XLVIII

Preparation of a permanently magnetizable powder containing cobalt oxide and iron oxide 2.5 grams of the high-porosity silica known as "AEROSIL 380" (manufacturer Degussa, specific surface area 380 sq.m. g$^{-1}$) was suspended in a solution of 36.8 grams of $Co(NO_3)_2$. $5H_2O$ (containing 7.5 grams of cobalt), 80 grams of urea and 60 grams of $NH_4NO_3$ in 3 litres of water. The suspension was boiled to remove the dissolved oxygen.

After the suspension had been cooled to room temperature in a nitrogen atmosphere, the pH was adjusted to 2 with nitric acid; next 540 ml of a ferrous chloride solution, containing 40 grams of iron, was added. The suspension was then heated to 100° C. whilst being thoroughly stirred. The pH value of the suspension was recorded automatically; this value increased quickly to 5.2 and subsequently dropped to 4.8, which latter value was reached 132 minutes after the start of heating. After heating for 16 hours, the pH had increased again to 5.8 and a deep-black precipitate had formed on the carrier material. To precipitate the last residues of cobalt from the suspension, the pH of the suspension was increased to 7.3 by injecting a solution of $NH_4HCO_3$ and $NH_3$, whereupon the precipitate was filtered off. The filtration proceeded extremely fast and the filter residue could be readily washed out.

After drying at 120° C. the material showed an X-ray diffraction pattern analogous to that of magnetite ($Fe_3O_4$). The broadening of the lines indicated a particle size of 325 Angstrom units.

The powder dried at 120° C. was mixed with a solution of 20 percent by weight of polyurethane in dimethyl formamide and then spread on a polyester film. The amount of powder in the coating was 60 percent by weight. On the film thus obtained, the hysteresis loop was measured, which had the shape as shown in FIG. 1. The maximum field strength was 2000 oerstedts, the coercive force was approximately 800 oerstedts. The vertically plotted magnetization has only a qualitative significance. The hysteresis loop of a normal commercial recording tape based on $\gamma$-$Fe_2O_3$ in needle form is shown in FIG. 2 by way of comparison.

EXAMPLE XLIX

Preparation of a permanently magnetizable powder containing cobalt oxide and iron oxide 2.5 grams of the high-porosity silica known as "AEROSIL 380" (manufacturer Degussa, specific surface area approx. 380 sq.m. $g^{-1}$) was suspended in a solution of 130 grams of urea and 20 grams of $NH_4NO_3$ in 3 litres of water. The suspension was boiled to remove the dissolved oxygen, and cooled in a nitrogen atmosphere. Next, the pH value was adjusted to 2 with nitric acid. 24.3 grams of $Co(NO_3)_2$. 6 $H_2O$ (5 grams of cobalt) and 575 ml of a ferrous chloride solution, containing 42.5 grams of iron, were added, whereupon the thoroughly stirred suspension was heated to 100° C. After heating for 70 hours, a black precipitate had formed on the silica. This could be quickly filtered off and readily washed out; the filtrate contained very little iron.

After drying at 120° C., the powder showed an X-ray diffraction pattern analogous to that of magnetite ($Fe_3O_4$). The broadening of the lines indicated a particle size of 400 Angstrom units.

On a column of pellets pressed from the dried powder (diameter of pellets 3.2 mm, height approx. 2 mm) the hysteresis loop was measured, which had the shape shown in FIG. 3. Here, again, the vertically plotted magnetization has only a qualitative significance. It will be clearly seen that in this case the coercive force is lower, namely 330 oerstedts, than for the powder prepared according to example I which had a higher cobalt content. In the present powder the cobalt/iron ratio is 1:8.5, whereas for the powder of example I this ratio is 1:5.3. Any ratio of the weights of cobalt and iron can be easily obtained by the processes described in examples I and II. The ratio of weights is preferably adjusted to a value ranging between 1:10 and 1:4. With the usual powders based on $\gamma$-$Fe_2O_3$ in needle form it is not possible to select the magnetic hardness within such a wide range.

EXAMPLE L

Preparation of a permanently magnetizable powder containing nickel oxide and iron oxide 1.5 grams of the high-porosity silica known as "AEROSIL 380" (manufacturer Degussa, specific surface area approx. 380 sq.m. $g^{-1}$) was suspended in 3 litres of water in which 160 grams of urea and 40 grams of $NH_4NO_3$ had been dissolved. The suspension was boiled to remove the dissolved oxygen and cooled in a nitrogen atmosphere. Next the pH was adjusted to 2 with nitric acid. 50 grams of $Ni(NO_3)_2$. 6 $H_2O$ (10 grams of nickel) and 266 ml of a ferrous chloride solution, containing 20 grams of iron, were added, whereupon the suspension was heated whilst being thoroughly stirred. After the suspension had been heated to 100° C., the pH value increased in approx. 2 hours to 6.4, whereupon it gradually dropped, in approx. 16 hours, to 5.6. The colour of the suspension gradually changed from green to deep-black. Finally, the pH was increased to 6.2 by injecting ammonia. The black precipitate could be quickly filtered off and washed out.

EXAMPLE LI

Preparation of a cobalt-manganese ferrite by injection of $KMnO_4$

A suspension of 12.5 g of silica (AEROSIL, specific surface area 200 $m^2g^{-1}$) in a solution of 59.3 g of $Co(NO_3)_2$. 6 $H_2O$ in 24 litres of water was boiled to remove dissolved oxygen, and cooled under nitrogen. Thereafter, 1.613 litres of an acid iron(II) chloride solution, containing 200 g of iron, was added to the suspension. The suspension was heated to 85°-90° C., the pH setting at a value of 1.4.

By injection of 25% ammonia the pH of the hot suspension was raised to 5.6, after which a solution of 115.1 g of $KMnO_4$ in 2.3 litres of water was injected in 188 minutes. By means of simultaneous injection of 25% ammonia, the pH was meanwhile kept at 5.6. The amount of permanganate added was 1.62 × $16^{-4}$ moles/litre min., which caused the amount of iron(III) ions in the suspension to rise by 8.1 × $10^{-4}$ moles/l.min.

After the injection had been stopped, the ferrite-loaded carrier material was isolated by filtration, washed, and dried at 120° C. Analysis showed the material to have the following composition: iron 48.7% by weight, cobalt 2.9% wt, manganese 9.3% wt, silica 2.3% wt.

The magnetic moment and the coercive force of the material were determined by means of apparatus analogous to that described in Philips Technisch Tijdschrift 25 (1963), pp. 139–145. The magnetic moment was measured at a field strength of about 10,000 oe.

The magnetic moment of the material was 54 gauss $cm^3$ per gramme, the coercive force amounted to 315 oe.

EXAMPLE LII

Preparation of a cobalt ferrite by injection of $NaNO_2$

A suspension of 21 g of silica (AEROSIL, specific surface area 200 $m^2g^{-1}$) in a solution of 98.8 g of $Co(NO_3)_2$. 6 $H_2O$ in 24 litres of water was boiled to remove dissolved oxygen, and cooled under nitrogen. Thereafter, 3.225 litres of an acid iron(II) chloride solution, containing 400 g of iron, was added to the suspension. The suspension was heated at 90°-95° C., the pH value settling at 1.3.

By injecting 25% ammonia the pH of the hot suspension was raised to 5.5, after which 247 g of $NaNO_2$ dissolved in 1.5 litres of water was injected in 144 minutes. By simultaneous injection of 25% ammonia the pH value was kept constant. The amount of nitrite added to the suspension is 1 × $10^{-3}$ moles/l.min.; reaction of the nitrite ions effects a rise of the amount of iron(III) ions in the suspension of $3 \times 10^{-3}$ moles/l.min. About 60 min. after the start of the injection of the nitrite solution the pH value rose rather abruptly to 6.5. When this pH value had been reached, the injection of ammonia was stopped.

The carrier material loaded with cobalt ferrite was isolated by filtration, washed, and dried at 120° C. Analysis showed the material to have the following composition: iron 63.3% by weight, cobalt 3.6% wt, silica 2.5% wt.

The magnetic moment of the material was 82 gauss cm³ per gramme of powder; the coercive force was 300 oe.

EXAMPLE LIII

Preparation of a ferrite by injection of $NaNO_2$

A suspension of 21 g of silica (AEROSIL, specific surface area 200 m² g⁻¹) in 23 litres of water was boiled to remove dissolved oxygen, and cooled under nitrogen. Thereafter, 3.88 l of an acid iron(II) chloride solution, containing 400 g of iron, was added. The suspension was heated at 96° C., after which the pH was adjusted to 5.5 by means of 25% ammonia.

With simultaneous injection of 25% ammonia, 246 g of $NaNO_2$ dissolved in 1.5 l of water was injected in 144 min. After 72 min. the pH rose to 5.7, whereupon the ammonia injection was stopped. The amount of nitrite added to the suspension was $1 \times 10^{-3}$ moles/l.min.; reaction of nitrite effects an increase of the amount of iron(III) ions in the suspension of $3 \times 10^{-3}$ moles/l.min.

The carrier material loaded with iron oxide was isolated by filtration, washed, and dried at 120° C. Analysis showed the material to have the following composition: iron 67.5% by weight, silica 4.8% wt.

The magnetic moment of the material was 78 gauss cm³ per gramme of powder; the coercive force was 160 oe.

What is claimed is:

1. A process for the preparation of a particulate at least inchoately catalytically active composition affixed to the surfaces of a solid particulate supporting material which comprises the combination of steps of:
   (A) forming a body of a solution-suspension aqueous medium by admixing
      (1) a solution of at least one metal compound and wherein said metal is Bi(III), Co(II), Cr(III), Fe(II), Mo(VI), Ni(II), Sn(IV) or Pt(IV) which compound is:
         (a) substantially soluble in said aqueous medium within at least a range of pH value below a pre-determined pH value of less than about 7: and
         (b) said at least one metal is capable of forming an insoluble compound at a pH above said range; and
      wherein said solution of said compound contains up to 15% by weight of the metal ion of said metal compound; and
      (2) a finely divided stable particulate solid, nucleating surface providing supporting material which is $SiO_2$, $Al_2O_3$, or $TiO_2$ and which has a sedimentation rate sufficiently low to permit homogeneous distribution thereof in said solution under the agitated conditions during the process and to form a suspension under said agitated conditions in said solution; the particles thereof having a surface which, under the conditions of the process is a nucleating surface with respect to said insoluble compounds; and
   (b) initially controlling and adjusting the pH of said aqueous medium to a value within said pH range within which said compound is substantially soluble in said aqueous medium;
   (C) sufficiently vigorously agitating the resulting aqueous medium so that said suspension particles are homogeneously distributed throughout said body, along with said dissolved at least one metal compound; while also
   (D) increasing the total hydroxyl ion concentration within said agitated suspension-solution, wherein the total hydroxyl ion concentration is
      (a) at a level sufficiently high to initiate nucleation and deposition precipitation of said insoluble compound on and over the said surface of the said particulate supporting material itself, but
      (b) below that concentration at which the total hydroxide ion concentration and the total concentration of ions of said metal exceed the solubility product of that insoluble compound of step (A) (1) (b) in said suspension-solution and thus at a level insufficient to induce any substantial free nucleation of said insoluble compound within the solution phase per se and with rapid dilution and distribution of any local momentary incremental increase of hydroxyl-ion wherein the step of increasing the hydroxyl-ion concentration is effected
      by introducing a hydrolizable agent into said solution, which hydrolizable agent will, under the conditions of the process, hydrolize to form hydroxyl ions, and hydrolizing said agent to form said hydroxl ions during the process under controlled and gradual conditions; wherein the control of said hydrolysis is essentially effected by controlling the temperature of said solution at a level whereat the required and desired rate of hydrolysis, under the conditions of the process, take place, wherein said temperature can be up to 100° C., and
   (E) continuing increasing total hydroxyl-ion concentration as in step (D) until the desired amount of insoluble metal compound has been transferred from said solution to said supporting material, wherein the rate of said further increases in said total hydroxyl ion concentration is maintained substantially at the level of the rate of migration of said metal to the said surface of said supporting material; and thereafter separating said solid supporting materials, having said insoluble compound substantially homogeneously deposited thereon, from the remaining aqueous solution of the said aqueous medium.

2. The process of claim 1, wherein said solution contains 5 to 15% by weight of metal ion of said water-soluble salt.

3. The process of claim 1, wherein said hydrolizable agent is introduced into said solution-suspension in an amount of 1 to 10 times the theoretical quantity required to convert said water-soluble salt to said insoluble metal compound.

4. The process of claim 3, wherein said hydrolizable agent is urea, acetamide or hydrolizable derivatives thereof.

5. A process for the preparation of a particulate, at least inchoately catalytically active crystalline composition, affixed to the surfaces of a solid particulate supporting material which comprises the combination of steps of:
(A) forming a body of a solution-suspension aqueous by admixing:
  (1) a solution of at least one metal compound wherein said metal is Bi(III), Co(II), Cr(III), Fe(II), Mo(VI), Ni(II), Sn(IV) or Pt(IV), which compound is:
    (a) substantially soluble in said aqueous medium within at least a range of pH value below a pre-determined pH value of less than about 7; and
    (b) said at least one metal is capable of forming an insoluble compound at a pH above said range; and wherein said solution of said compound contains 5 to 15% by weight of the metal ion of said metal compound; and
  (2) a finely divided stable particulate solid, nucleating surface providing supporting material which is $SiO_2$, $Al_2O_3$, or $TiO_2$ and which has a sedimentation rate sufficiently low to permit homogeneous distribution thereof in said solution under the agitated conditions during the process and to form a suspension under said agitated conditions in said solution; the particles thereof having a surface which, under the conditions of the process is a nucleating surface with respect to said insoluble compounds; and
(B) initially controlling and adjusting the pH of said aqueous medium to a value within said pH range within which said compound is substantially soluble in said aqueous medium;
(C) sufficiently vigorously agitating the resulting aqueous medium so that said suspension particles are homogeneously distributed throughout said body, along with said dissolved at least one metal compound; while also
(D) increasing the total hydroxyl ion concentration within said agitated suspension-solution wherein the total hydroxyl ion concentration is
  (a) at a level sufficiently high to initiate nucleation and deposition precipitation of said insoluble compound on and over the said surface of the said particulate supporting material itself, but
  (b) below that concentration at which the total hydroxide ion concentration and the total concentration of ions of said metal exceed the solubility product of that insoluble compound, of step (A) (1) (b), in said suspension-solution and thus at a level insufficient to induce any substantial free nucleation of said insoluble compound within the solution phase per se and with rapid dilution and distribution of any local momentary incremental increase of hydroxyl-ion wherein the step of increasing the hydroxyl-ion concentration is effected by introducing a hydrolizable agent into said solution, in an amount of 1 to 10 times the theoretical quantity required to convert said metal compound to said insoluble compound which hydrolizable agent is urea, acetamide or hydrolyzable derivatives thereof and will, under the conditions of the process, hydrolyze to form hydroxyl ions, and hydrolizing said agent to form said hydroxyl ions during the process under controlled and gradual conditions; wherein the control of said hydrolysis is essentially effected by controlling the temperature of said solution at a level whereat the required and desired rate of hydrolysis, under the conditions of the process, take place, wherein said temperature can be upto 100° C., and
(E) continuing increasing total hydroxyl-ion concentration until the desired amount of insoluble metal compound has been transferred from said solution to said supporting material, wherein the rate of said further increases in said total hydroxyl ion concentration being maintained substantially at the level of the rate of migration of said metal to the said surface of said supporting material; and thereafter separating said solid supporting materials, having said insoluble compound substantially homogeneously deposited thereon, from the remaining aqueous solution of said aqueous medium.

* * * * *